Dec. 21, 1965   A. V. SCOLLARD ETAL   3,224,160
EGG PACKING APPARATUS
Original Filed Feb. 14, 1961   49 Sheets-Sheet 1

INVENTOR.
Alvoid V. Scollard
BY Alfred E. Comstock
Attorneys

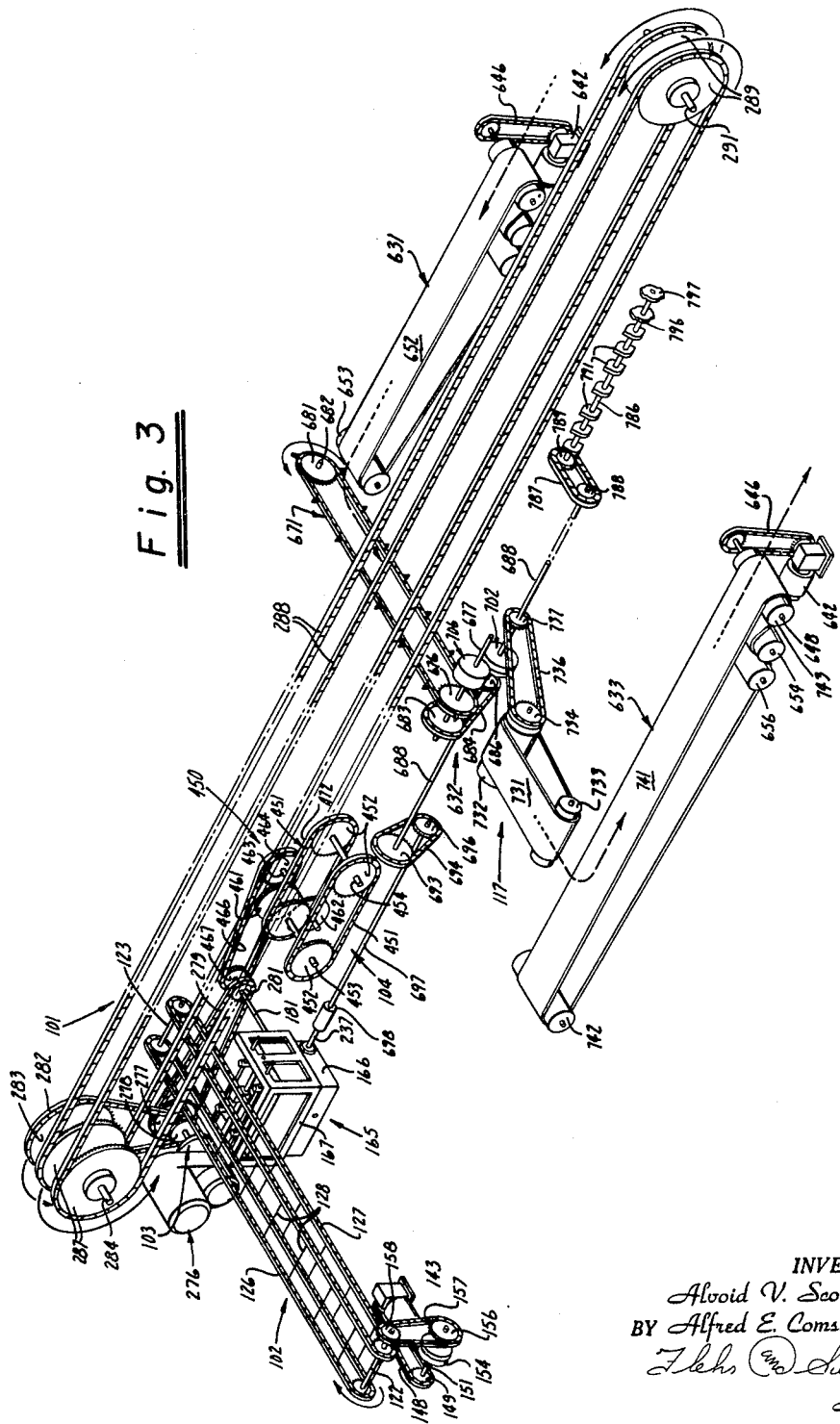

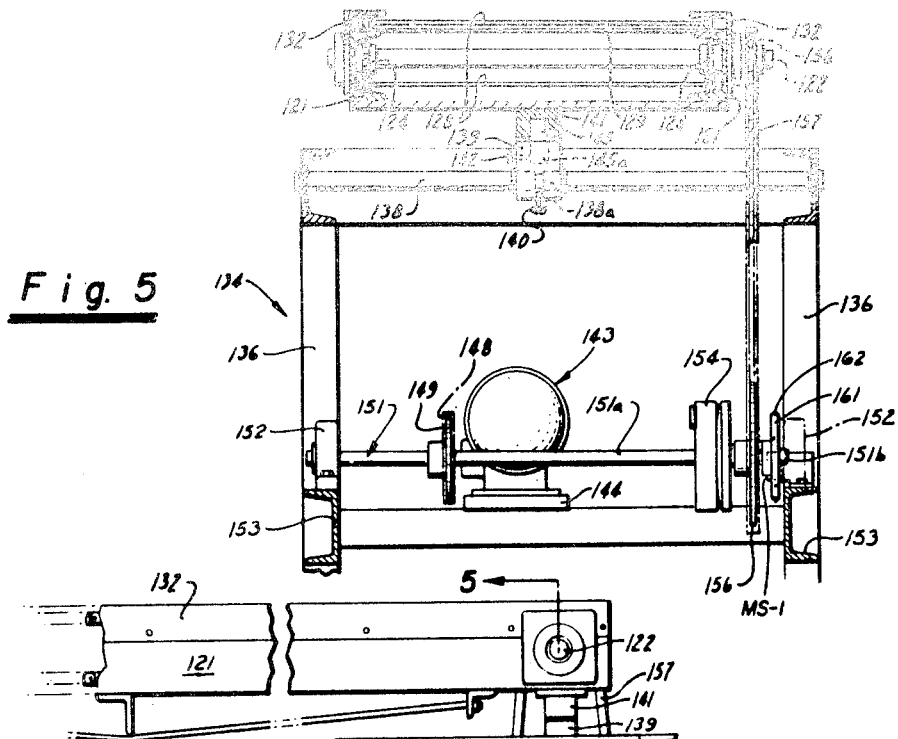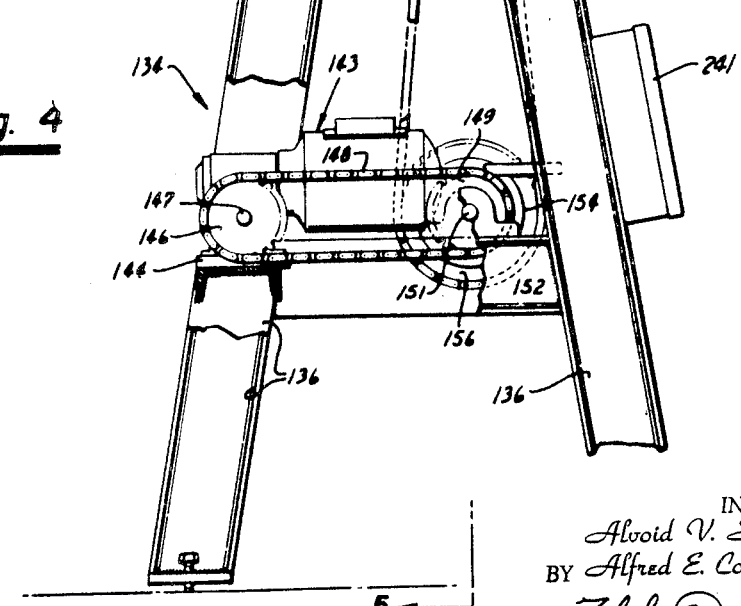

Dec. 21, 1965  A. V. SCOLLARD ETAL  3,224,160
EGG PACKING APPARATUS

Original Filed Feb. 14, 1961  49 Sheets-Sheet 4

INVENTOR.
Alvoid V. Scollard
BY Alfred E. Comstock

Attorneys

INVENTOR.
Alvoid V. Scollard
BY Alfred E. Comstock

Attorneys

INVENTOR.
Alvoid V. Scollard
BY Alfred E. Comstock
Fleh and Swain
Attorneys

Dec. 21, 1965   A. V. SCOLLARD ETAL   3,224,160
EGG PACKING APPARATUS
Original Filed Feb. 14, 1961   49 Sheets-Sheet 8
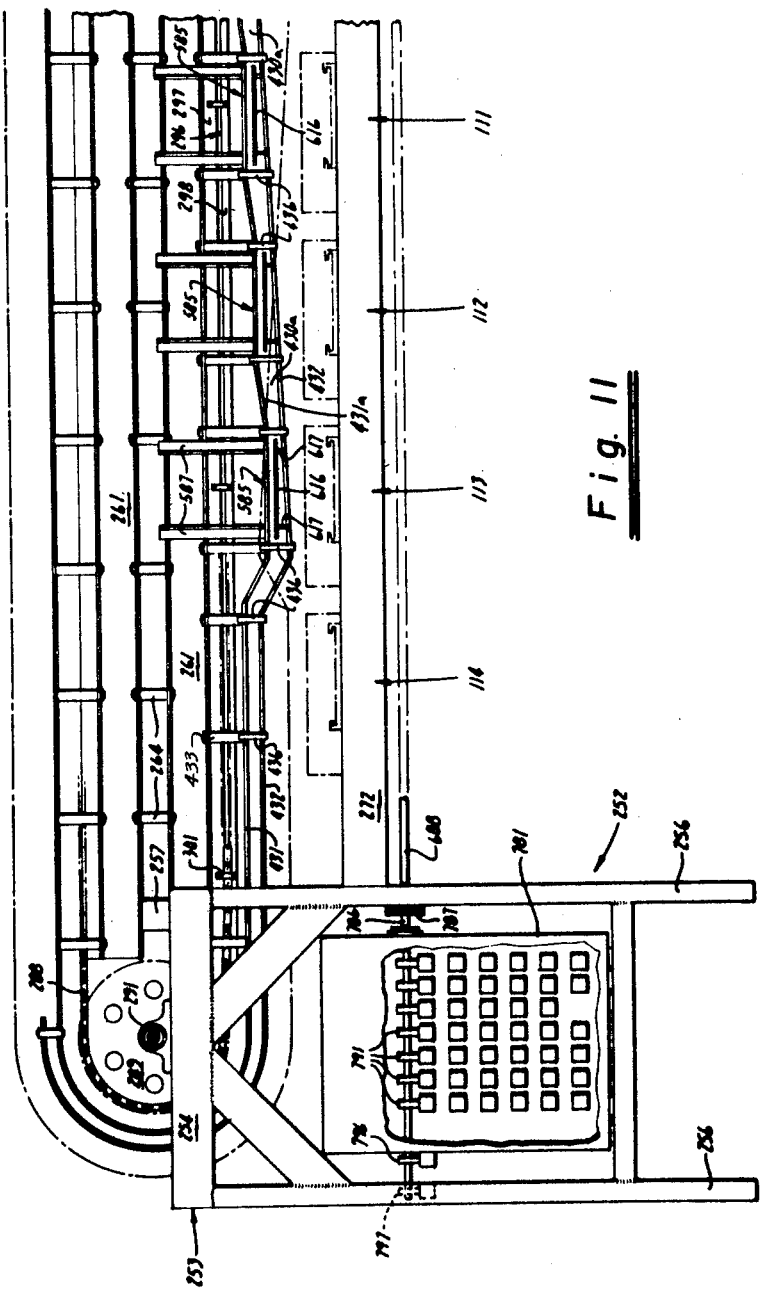
INVENTOR.
Alvoid V. Scollard
BY Alfred E. Comstock
Attorneys

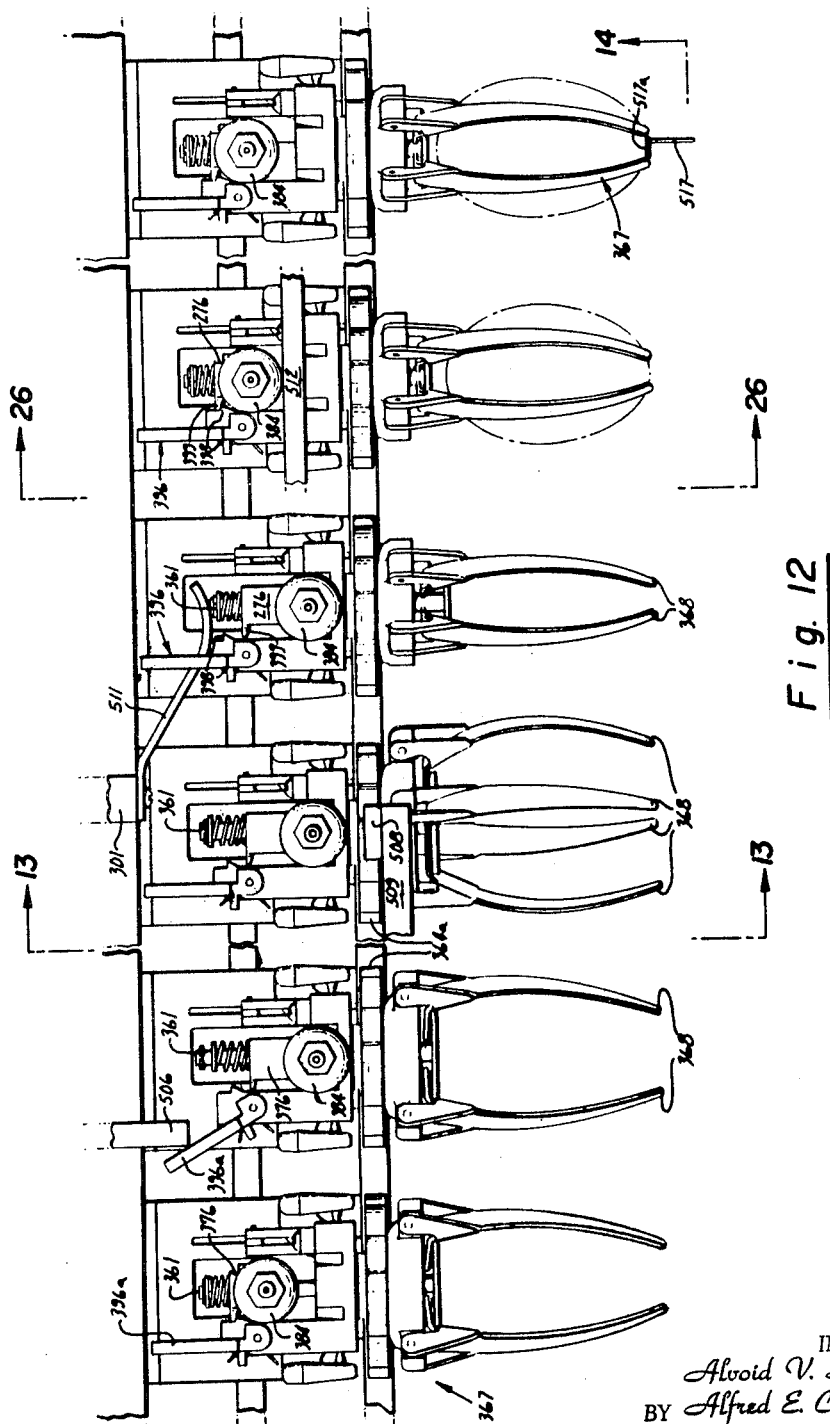
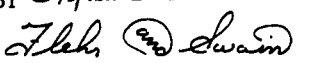

Dec. 21, 1965  A. V. SCOLLARD ETAL  3,224,160
EGG PACKING APPARATUS
Original Filed Feb. 14, 1961  49 Sheets-Sheet 10
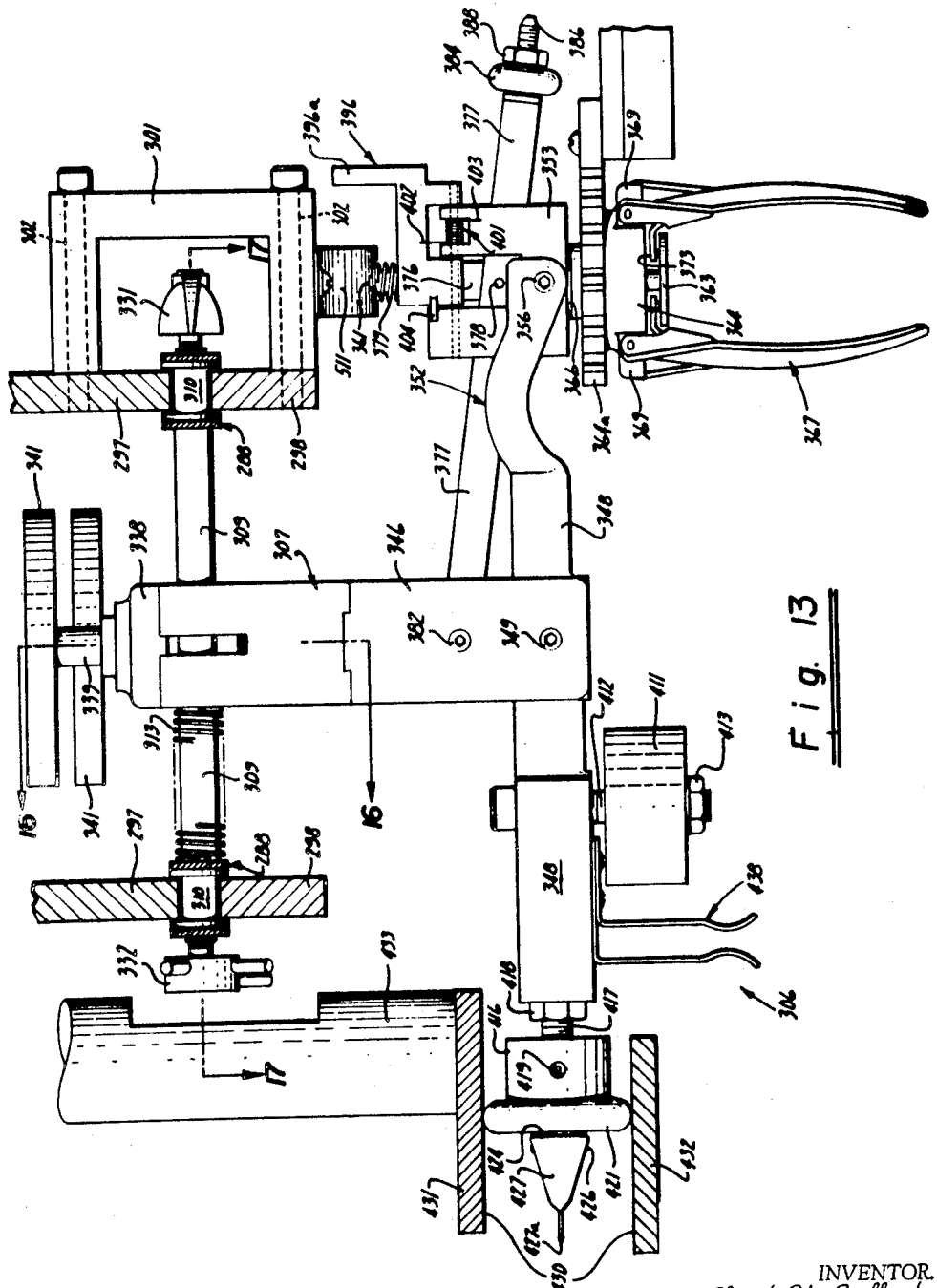
Fig. 13
INVENTOR.
Alvoid V. Scollard
BY Alfred E. Comstock
Attorneys

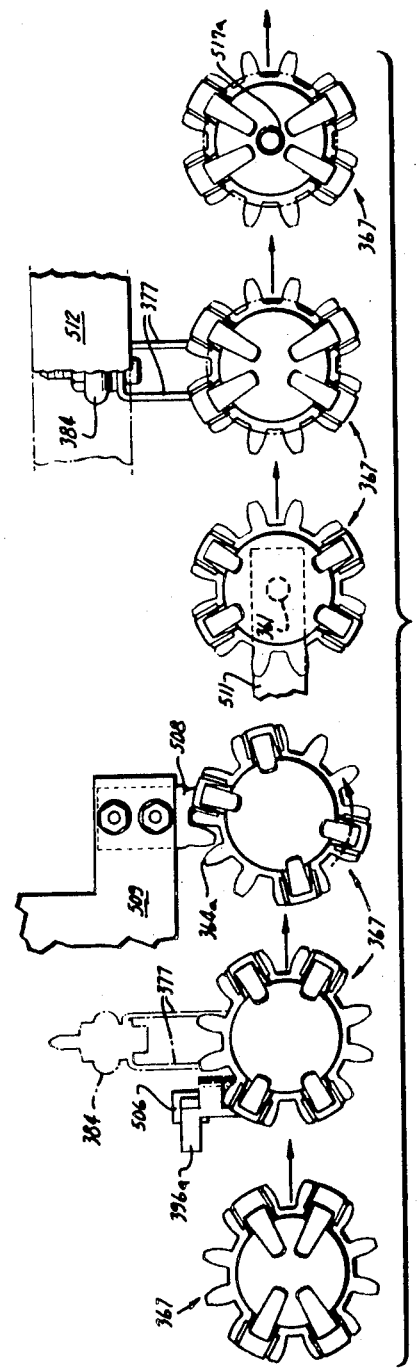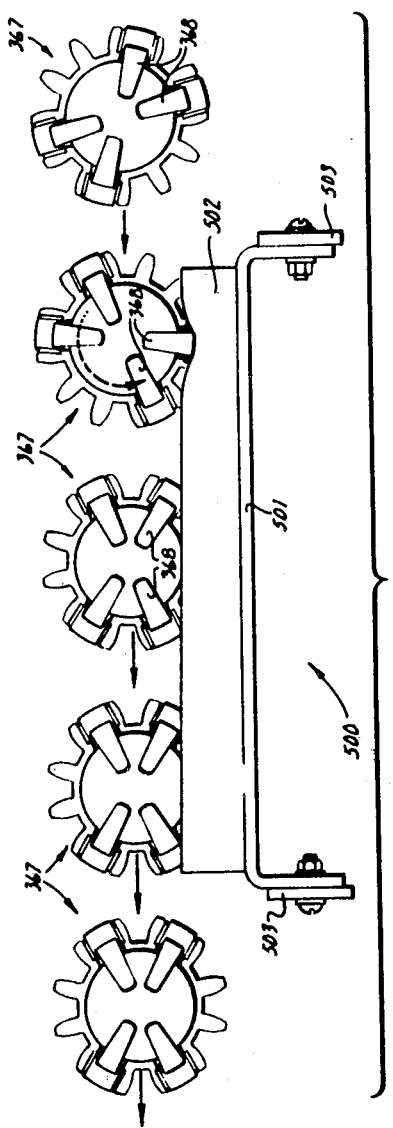

Dec. 21, 1965 A. V. SCOLLARD ETAL 3,224,160
EGG PACKING APPARATUS
Original Filed Feb. 14, 1961 49 Sheets-Sheet 12
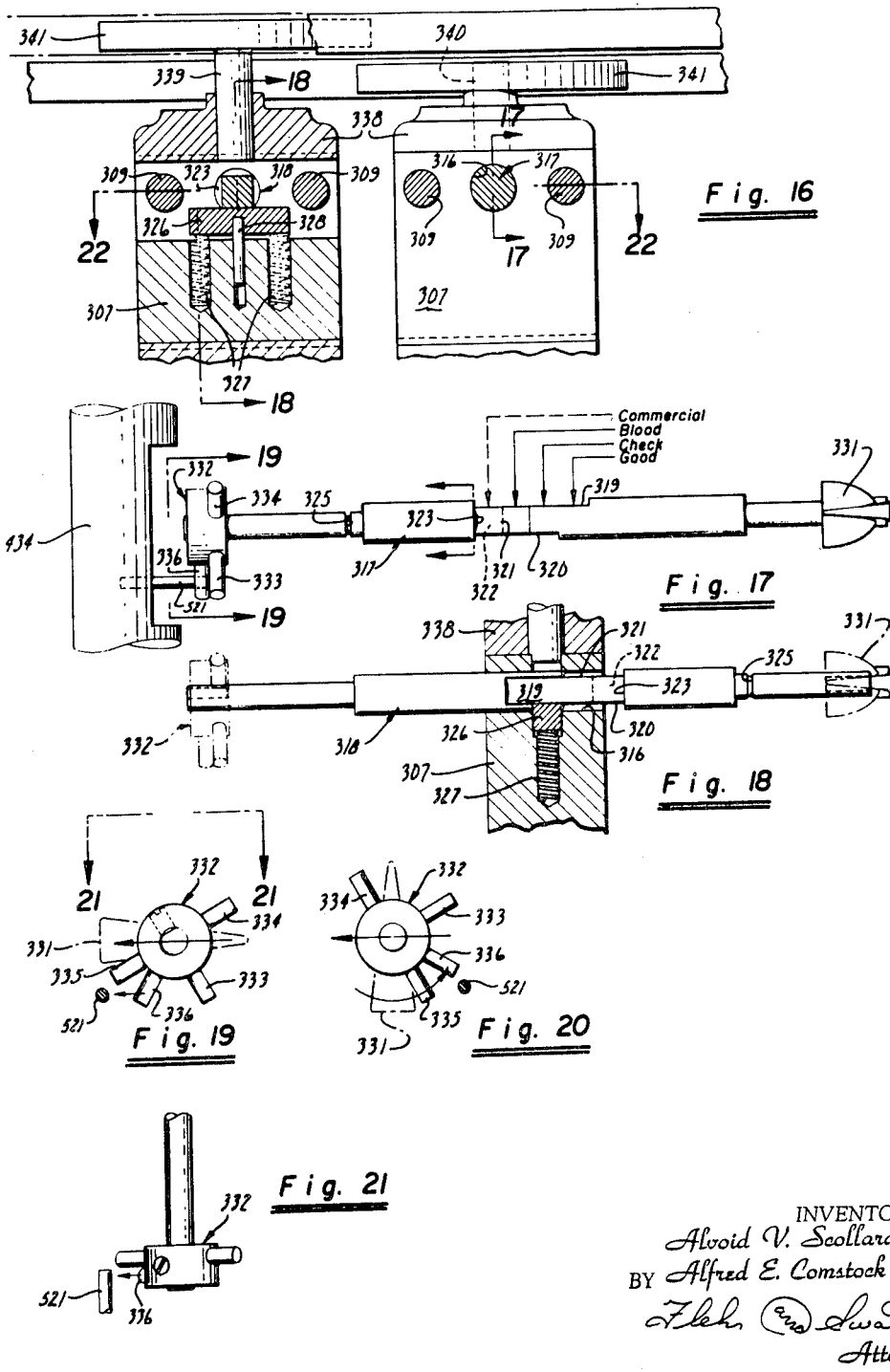
INVENTOR.
Alvoid V. Scollard
BY Alfred E. Comstock
Attorneys

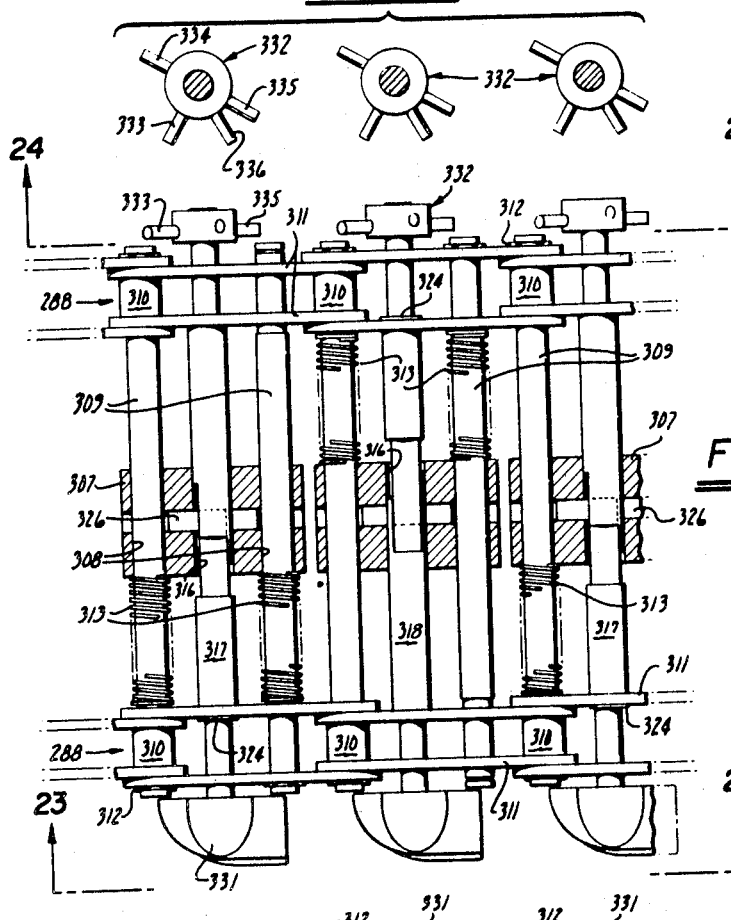
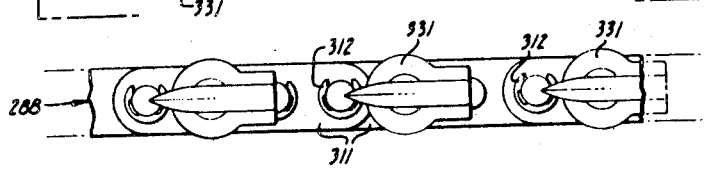

Dec. 21, 1965 A. V. SCOLLARD ETAL 3,224,160
EGG PACKING APPARATUS
Original Filed Feb. 14, 1961 49 Sheets-Sheet 14

INVENTOR.
Alvoid V. Scollard
BY Alfred E. Comstock
Attorneys

Dec. 21, 1965    A. V. SCOLLARD ETAL    3,224,160
EGG PACKING APPARATUS
Original Filed Feb. 14, 1961    49 Sheets-Sheet 15
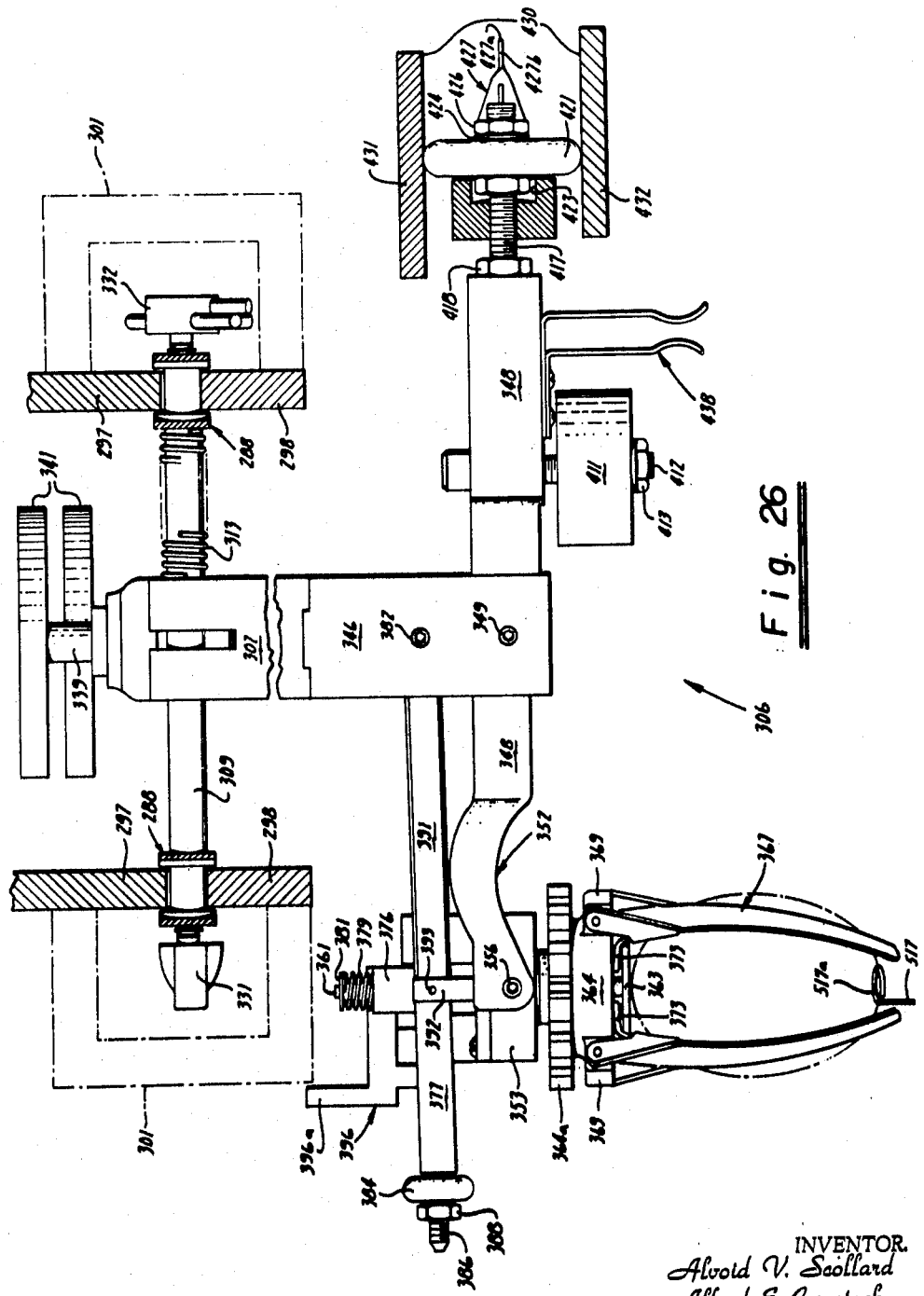
Fig. 26
INVENTOR.
Alvold V. Scollard
BY Alfred E. Comstock
Attorneys

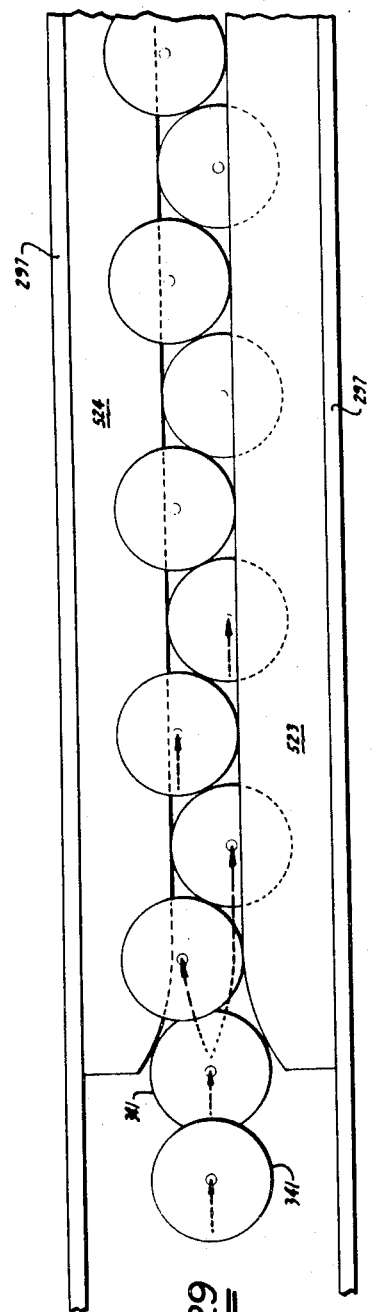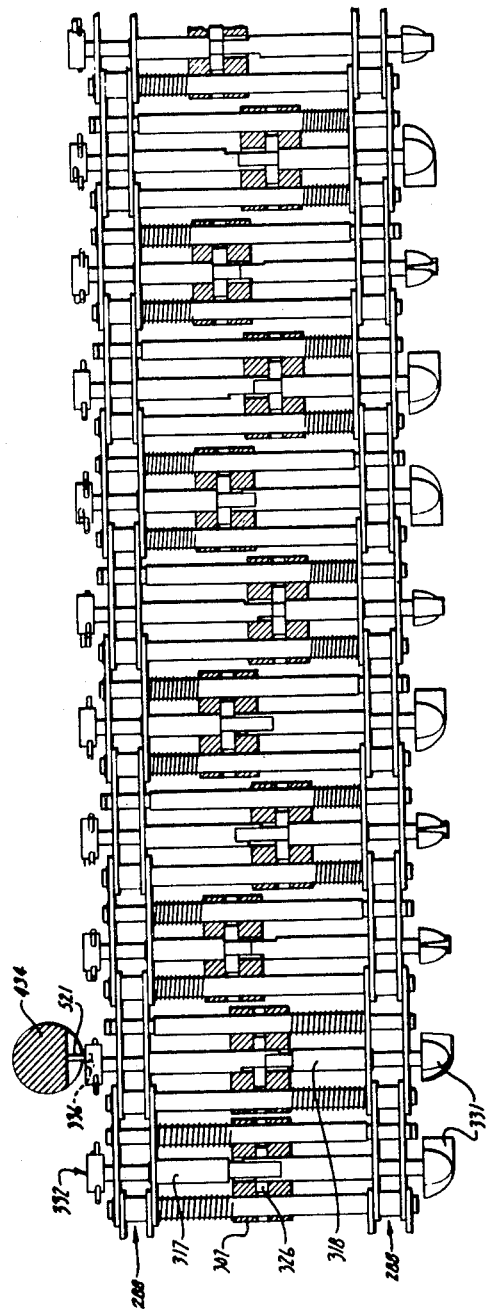

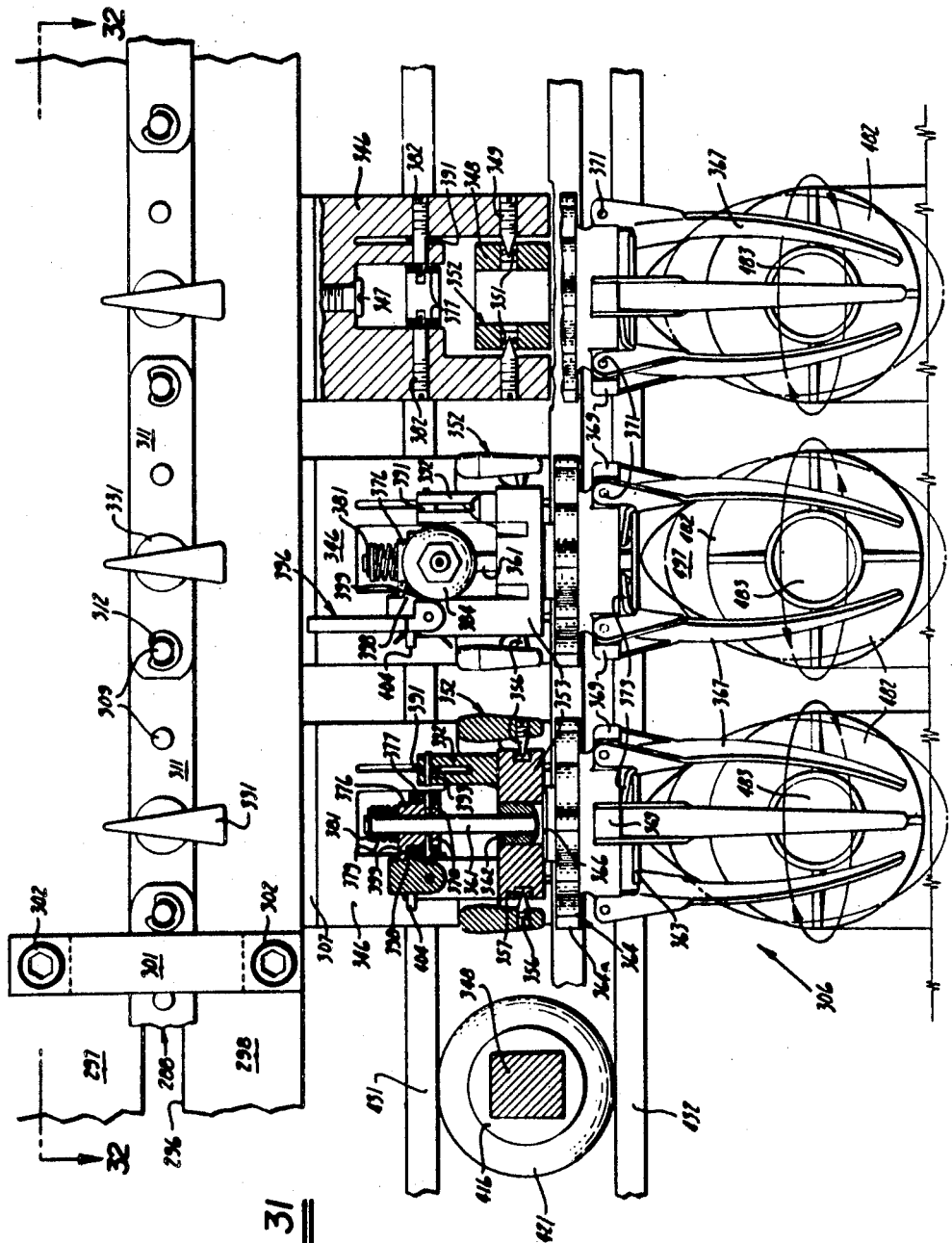

Dec. 21, 1965   A. V. SCOLLARD ETAL   3,224,160
EGG PACKING APPARATUS
Original Filed Feb. 14, 1961   49 Sheets-Sheet 21
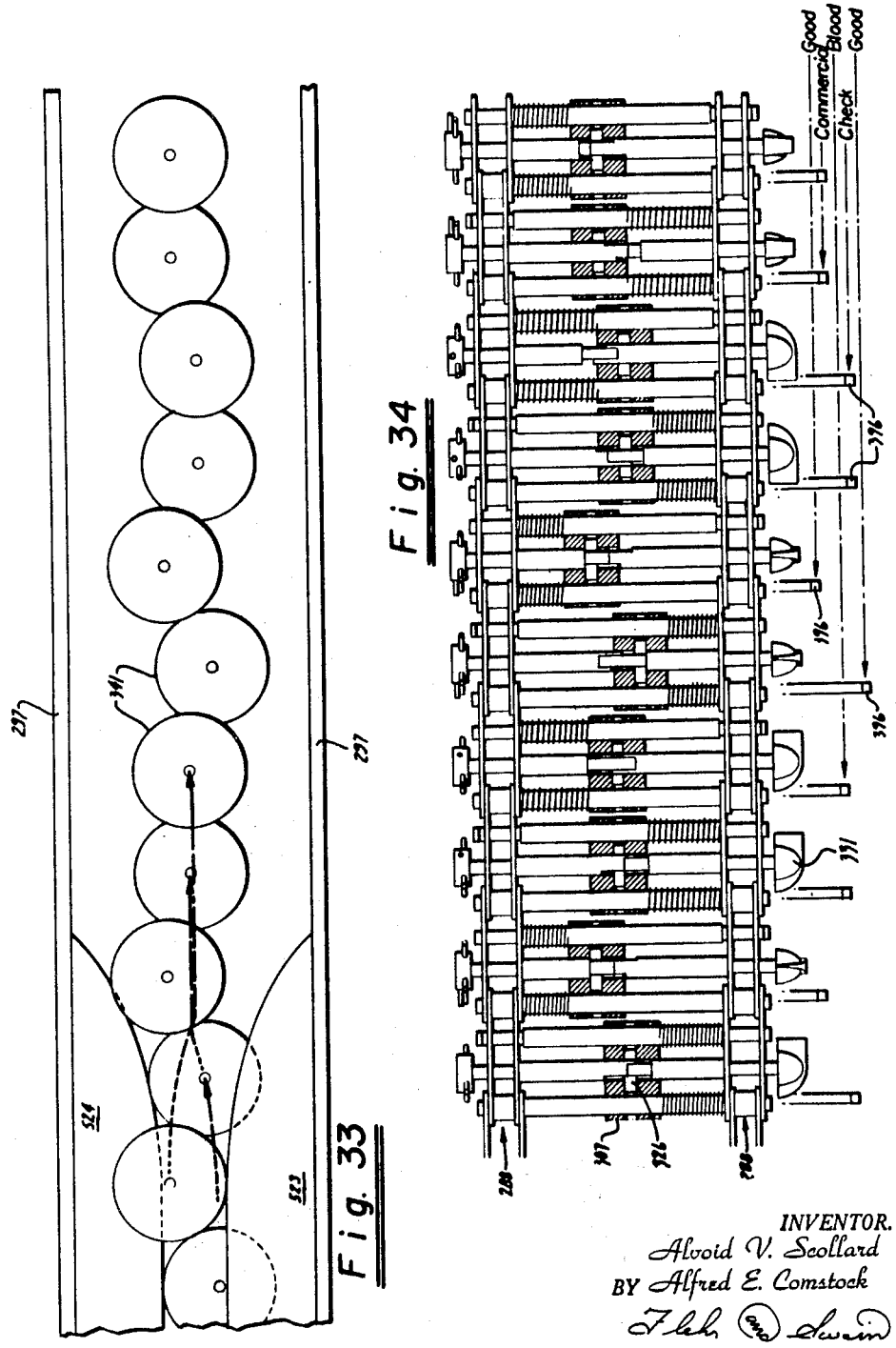
INVENTOR.
Alvoid V. Scollard
BY Alfred E. Comstock
Attorneys INVENTOR.
Alvoid V. Scollard
BY Alfred E. Comstock Attorneys Dec. 21, 1965   A. V. SCOLLARD ETAL   3,224,160
EGG PACKING APPARATUS
Original Filed Feb. 14, 1961   49 Sheets-Sheet 23
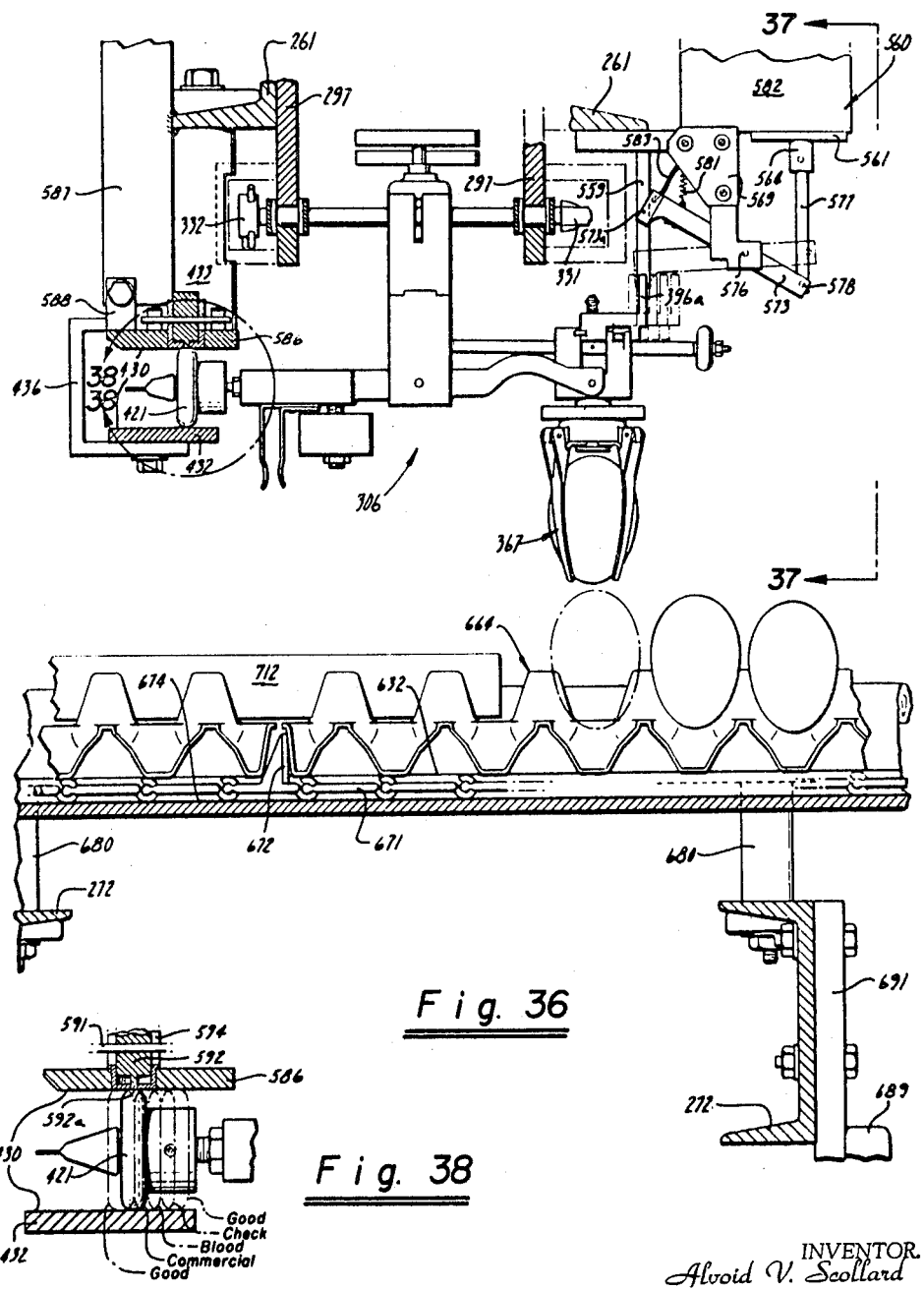
Fig. 36
Fig. 38
INVENTOR.
Alvoid V. Scollard
BY Alfred E. Comstock
Attorneys Dec. 21, 1965  A. V. SCOLLARD ETAL  3,224,160
EGG PACKING APPARATUS
Original Filed Feb. 14, 1961  49 Sheets-Sheet 24
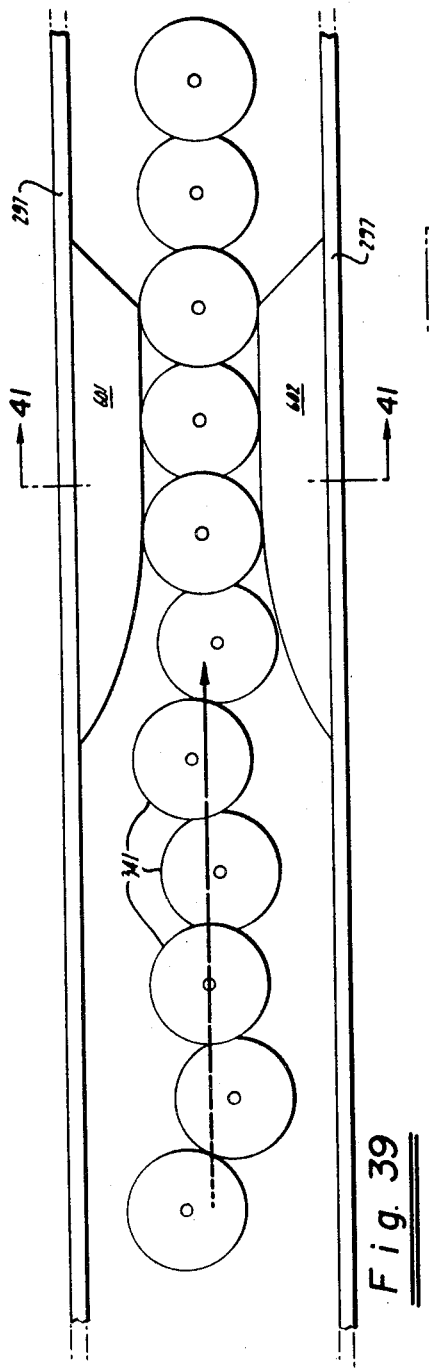
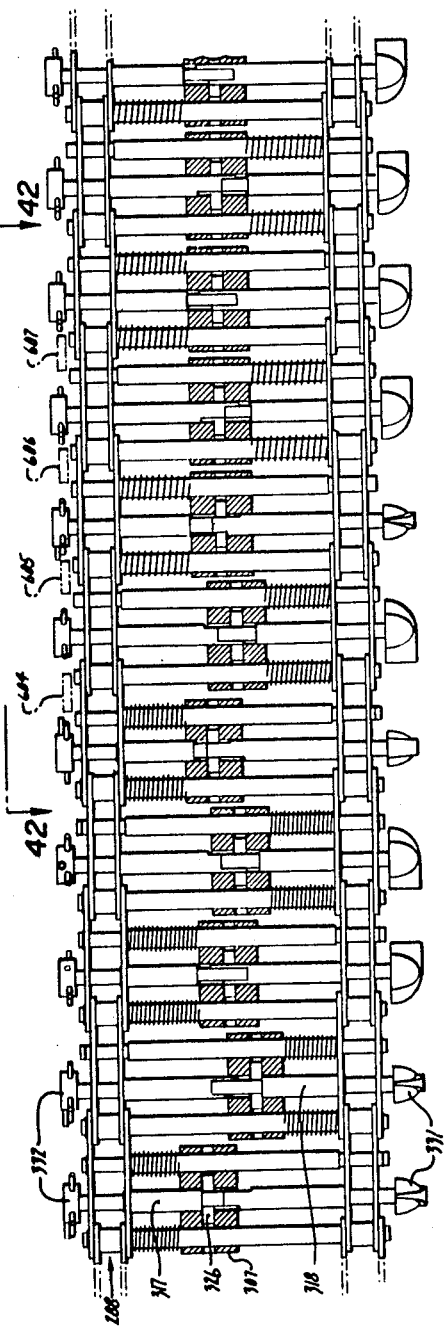
INVENTOR.
Alvoid V. Scollard
BY Alfred E. Comstock
Attorneys Dec. 21, 1965   A. V. SCOLLARD ETAL   3,224,160
EGG PACKING APPARATUS Original Filed Feb. 14, 1961   49 Sheets-Sheet 25

INVENTOR.
Alvoid V. Scollard
BY Alfred E. Comstock
Attorneys

INVENTOR.
Alvoid V. Scollard
BY Alfred E. Comstock
Attorneys

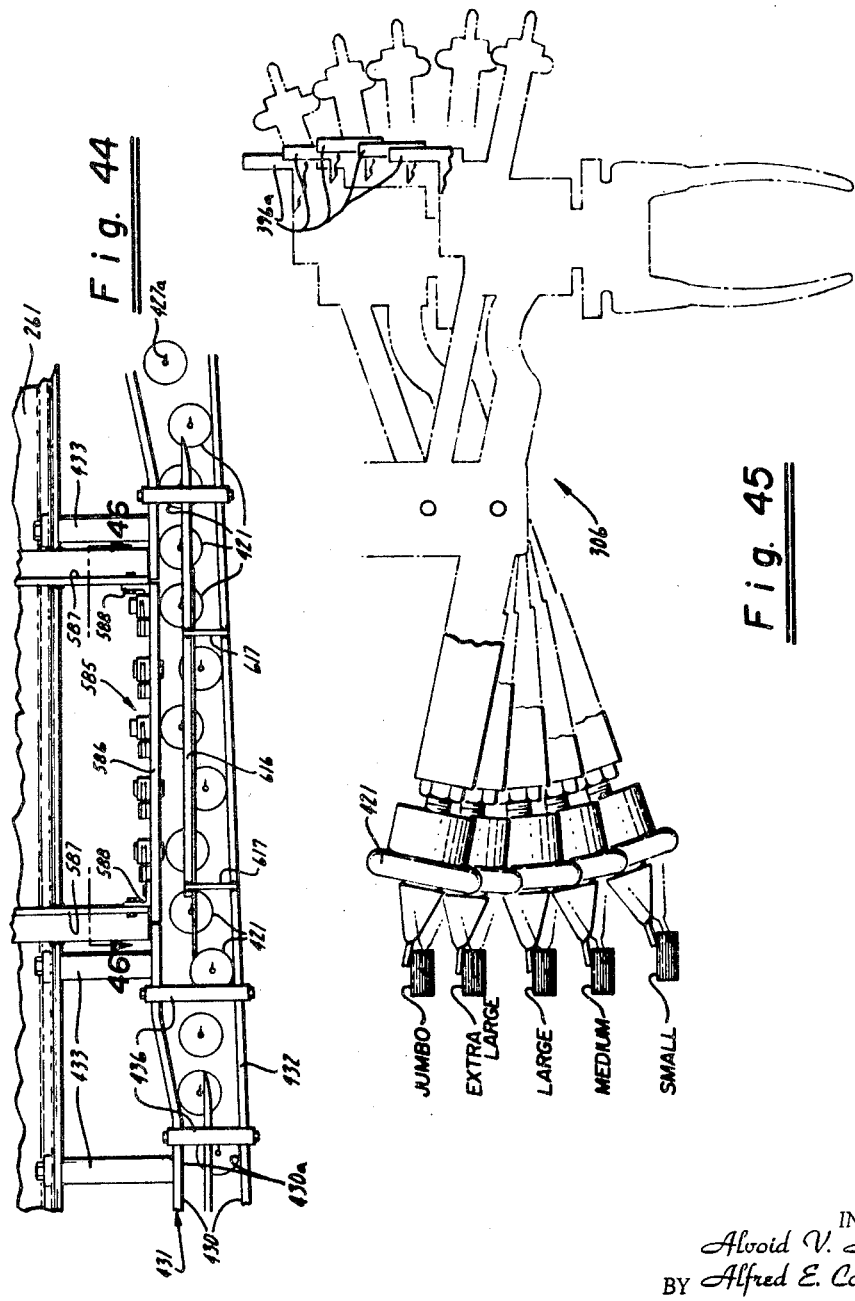

Dec. 21, 1965    A. V. SCOLLARD ETAL    3,224,160
EGG PACKING APPARATUS

Original Filed Feb. 14, 1961    49 Sheets-Sheet 28

*INVENTOR.*
*Alvoid V. Scollard*
BY *Alfred E. Comstock*

*Flehr and Swain*
*Attorneys*

Dec. 21, 1965   A. V. SCOLLARD ETAL   3,224,160
EGG PACKING APPARATUS
Original Filed Feb. 14, 1961   49 Sheets-Sheet 29
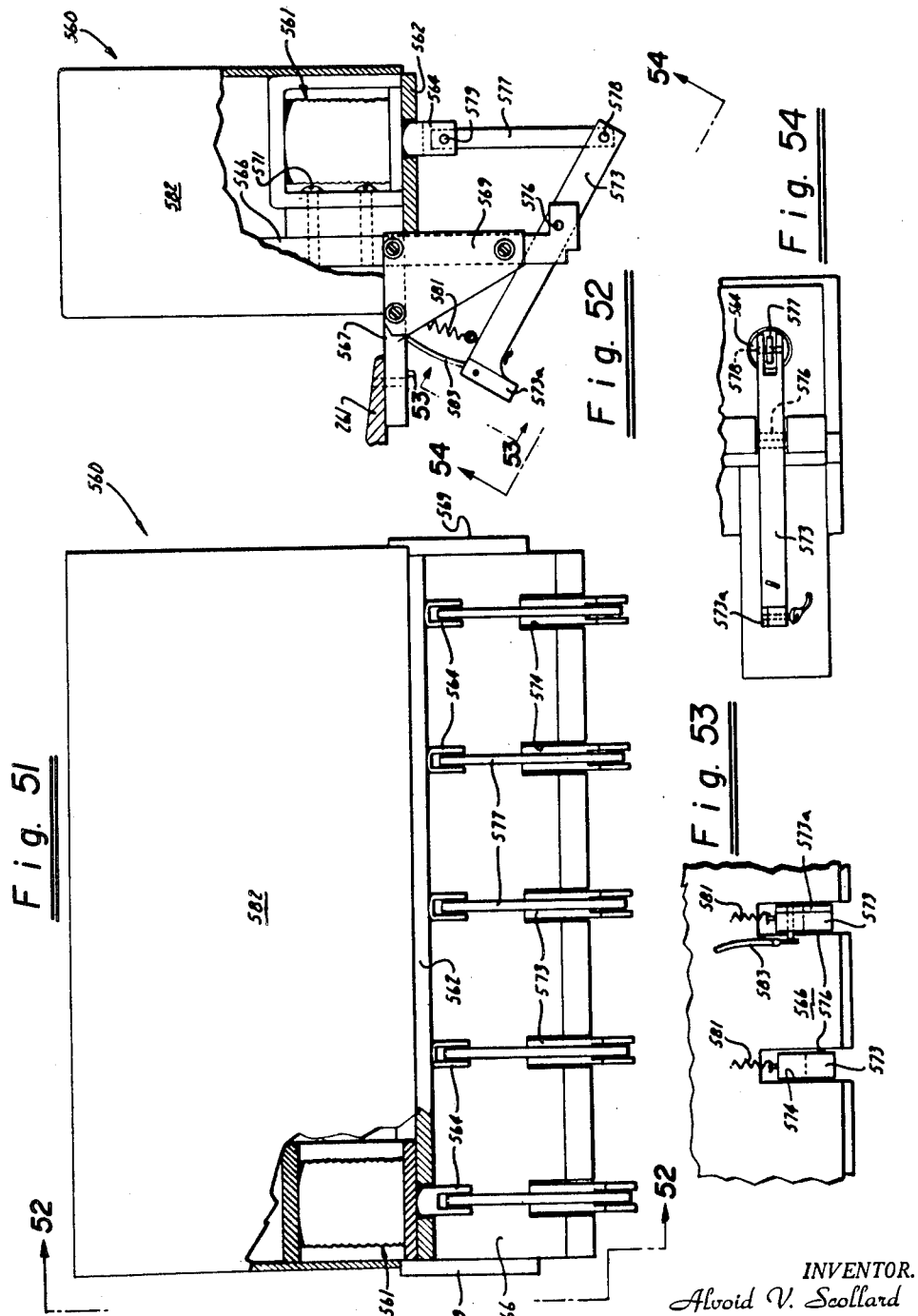
INVENTOR.
Alvoid V. Scollard
BY Alfred E. Comstock
Attorneys

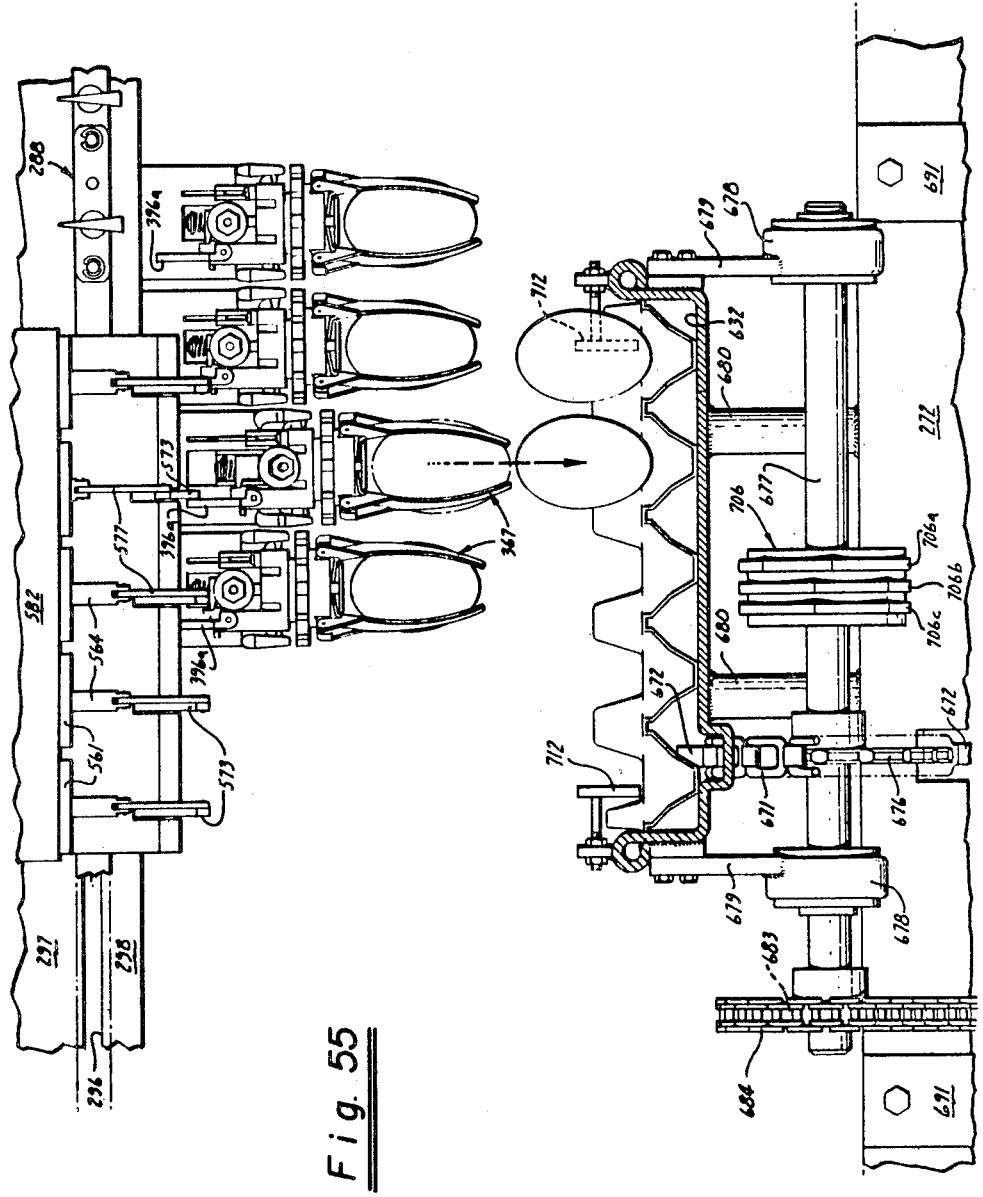

Dec. 21, 1965  A. V. SCOLLARD ETAL  3,224,160
EGG PACKING APPARATUS
Original Filed Feb. 14, 1961  49 Sheets-Sheet 31
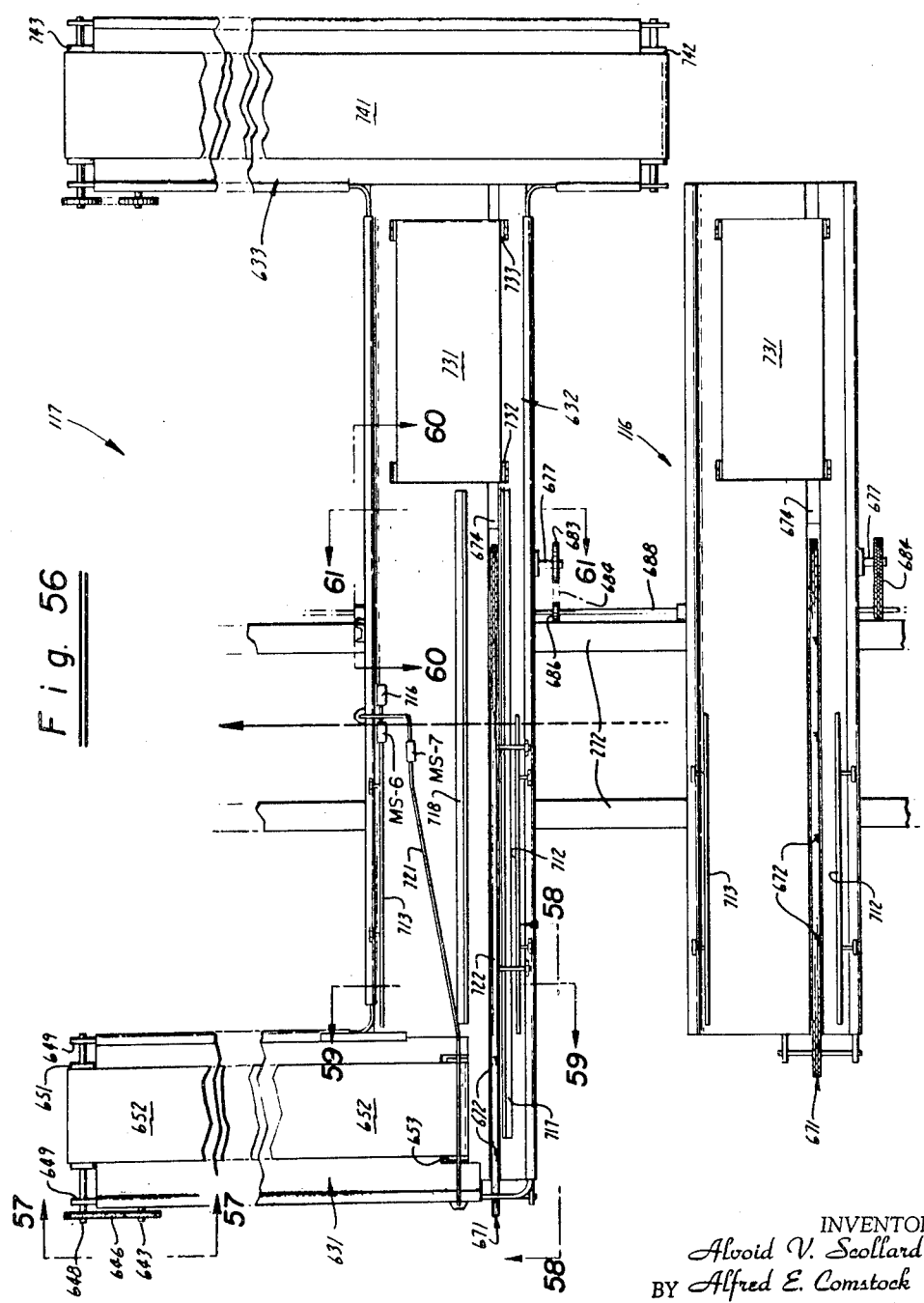
INVENTOR.
Alvoid V. Scollard
BY Alfred E. Comstock
Attorneys

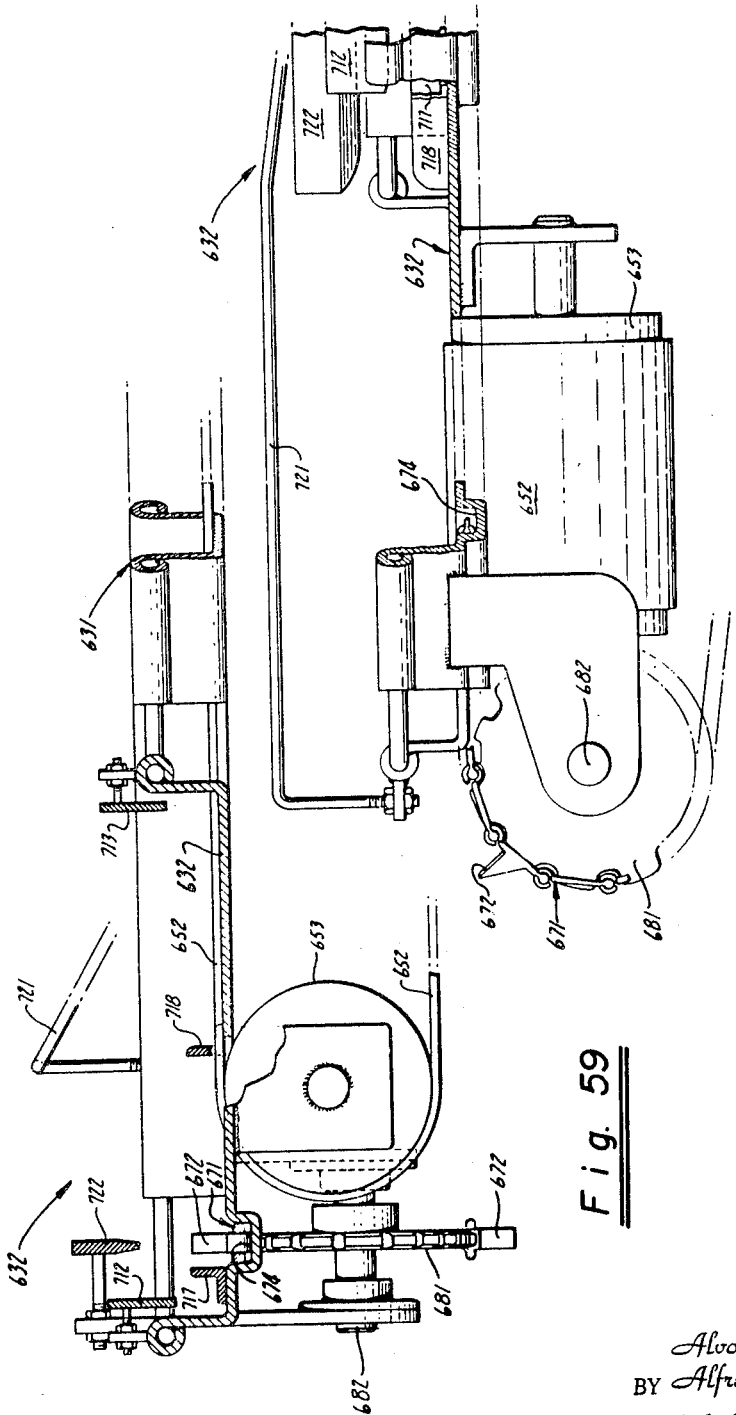

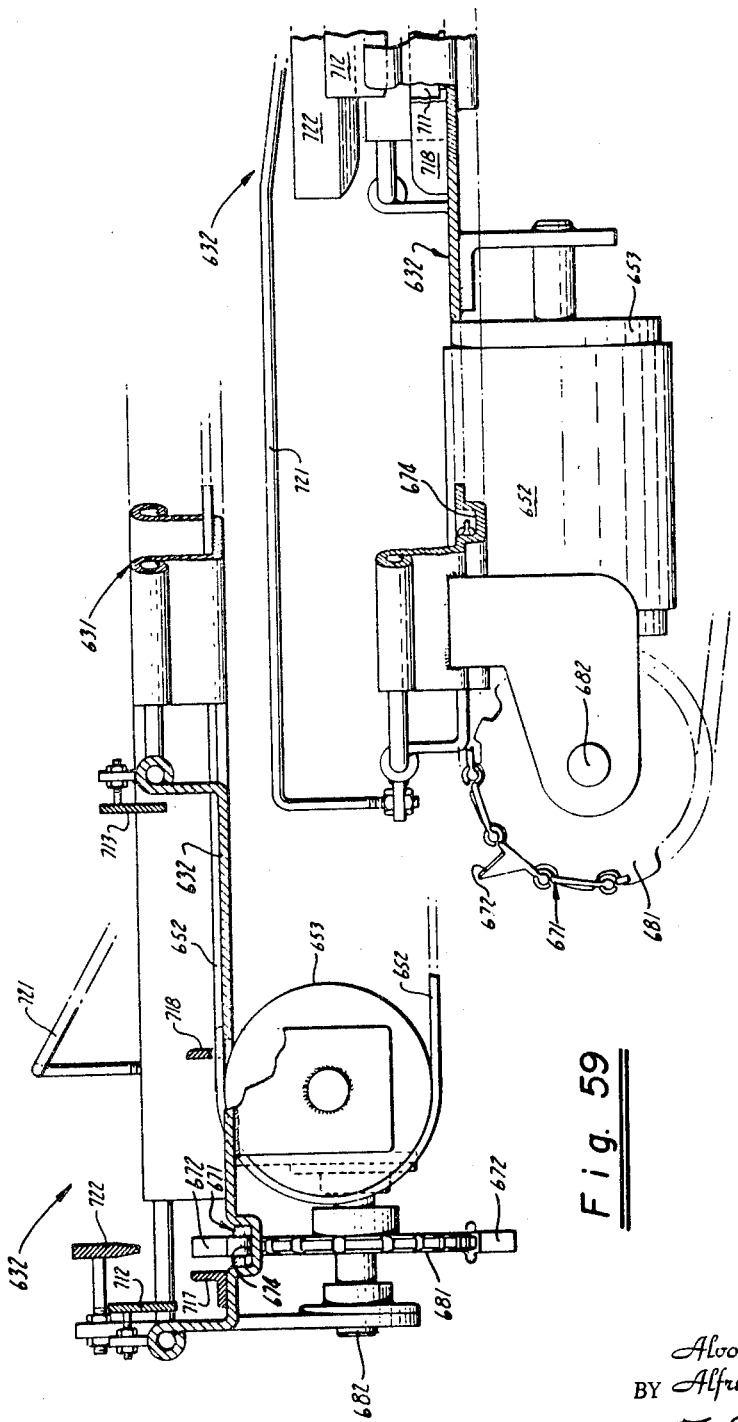

INVENTOR.
Alvoid V. Scollard
BY Alfred E. Comstock
Attorneys

Dec. 21, 1965  A. V. SCOLLARD ETAL  3,224,160
EGG PACKING APPARATUS
Original Filed Feb. 14, 1961  49 Sheets-Sheet 35
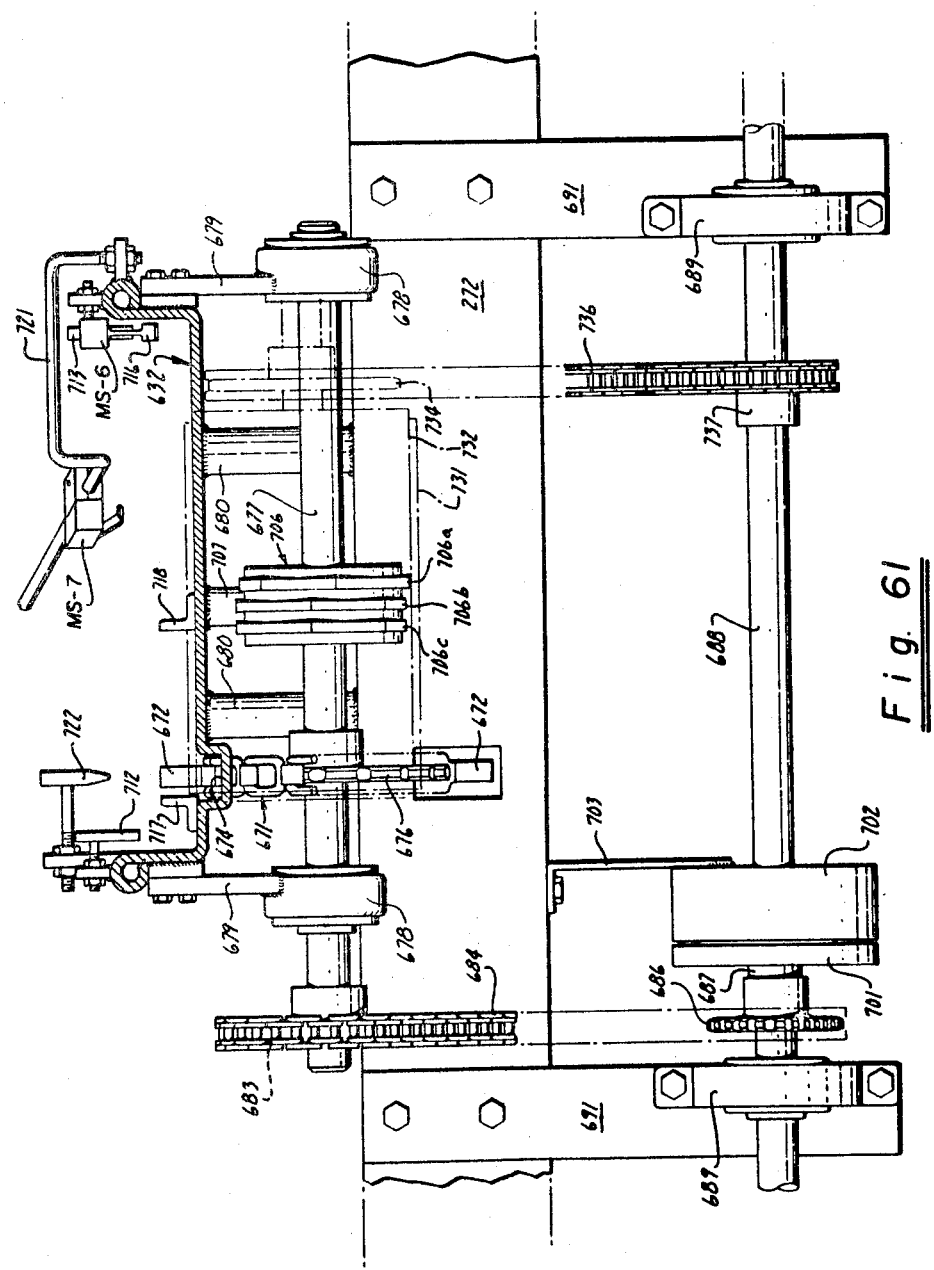
Fig. 61
INVENTOR.
Alvoid V. Scollard
BY Alfred E. Comstock
Attorneys Dec. 21, 1965   A. V. SCOLLARD ETAL   3,224,160
EGG PACKING APPARATUS
Original Filed Feb. 14, 1961   49 Sheets-Sheet 36
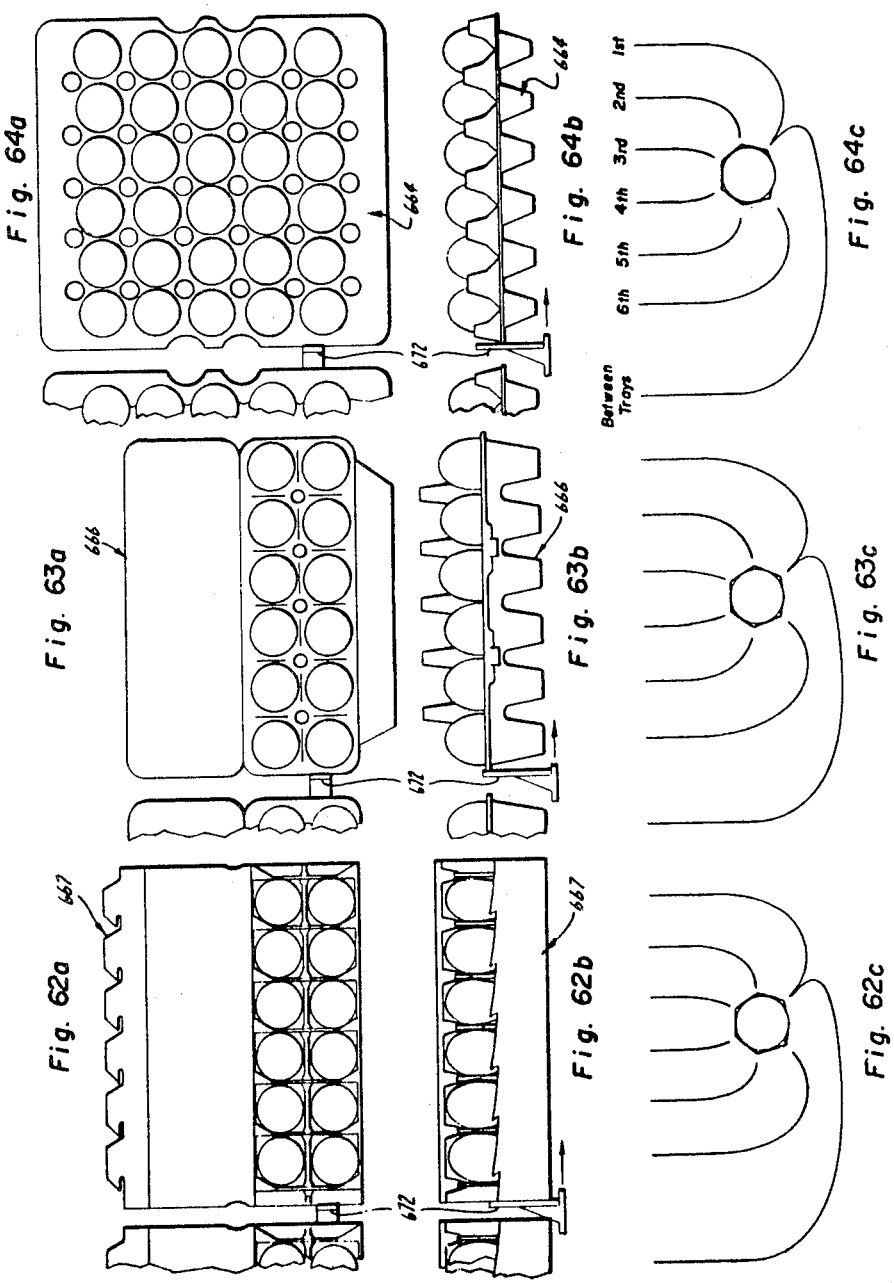
INVENTOR.
Alvoid V. Scollard
BY Alfred E. Comstock
Flehr Swain
Attorneys Dec. 21, 1965  A. V. SCOLLARD ETAL  3,224,160
EGG PACKING APPARATUS
Original Filed Feb. 14, 1961  49 Sheets-Sheet 38

INVENTOR.
Alvoid V. Scollard
BY Alfred E. Comstock

Attorneys

Dec. 21, 1965  A. V. SCOLLARD ETAL  3,224,160
EGG PACKING APPARATUS
Original Filed Feb. 14, 1961  49 Sheets-Sheet 43

INVENTOR.
Alvoid V. Scollard
BY Alfred E. Comstock
Attorneys

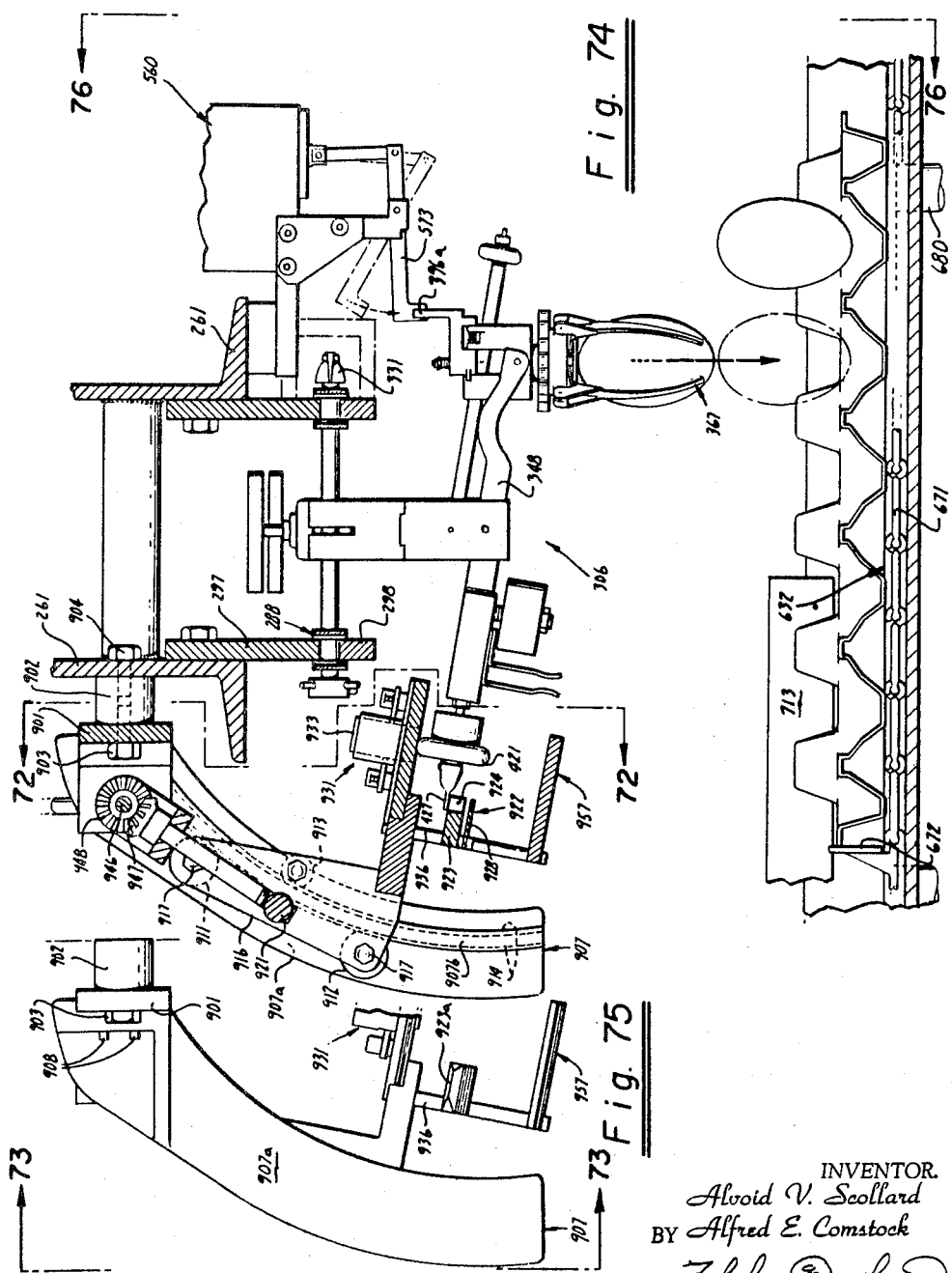

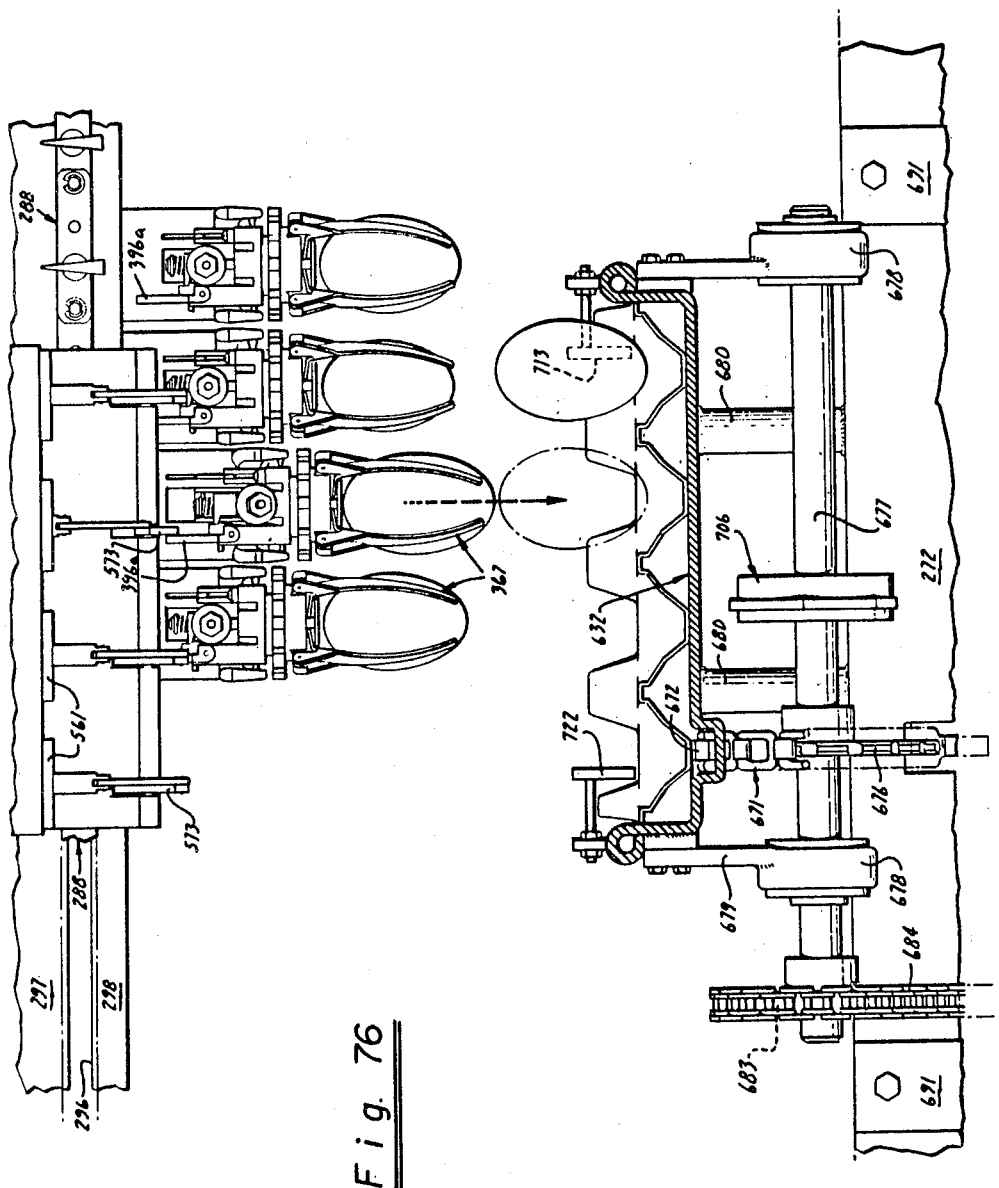

Dec. 21, 1965  A. V. SCOLLARD ETAL  3,224,160
EGG PACKING APPARATUS
Original Filed Feb. 14, 1961  49 Sheets-Sheet 46
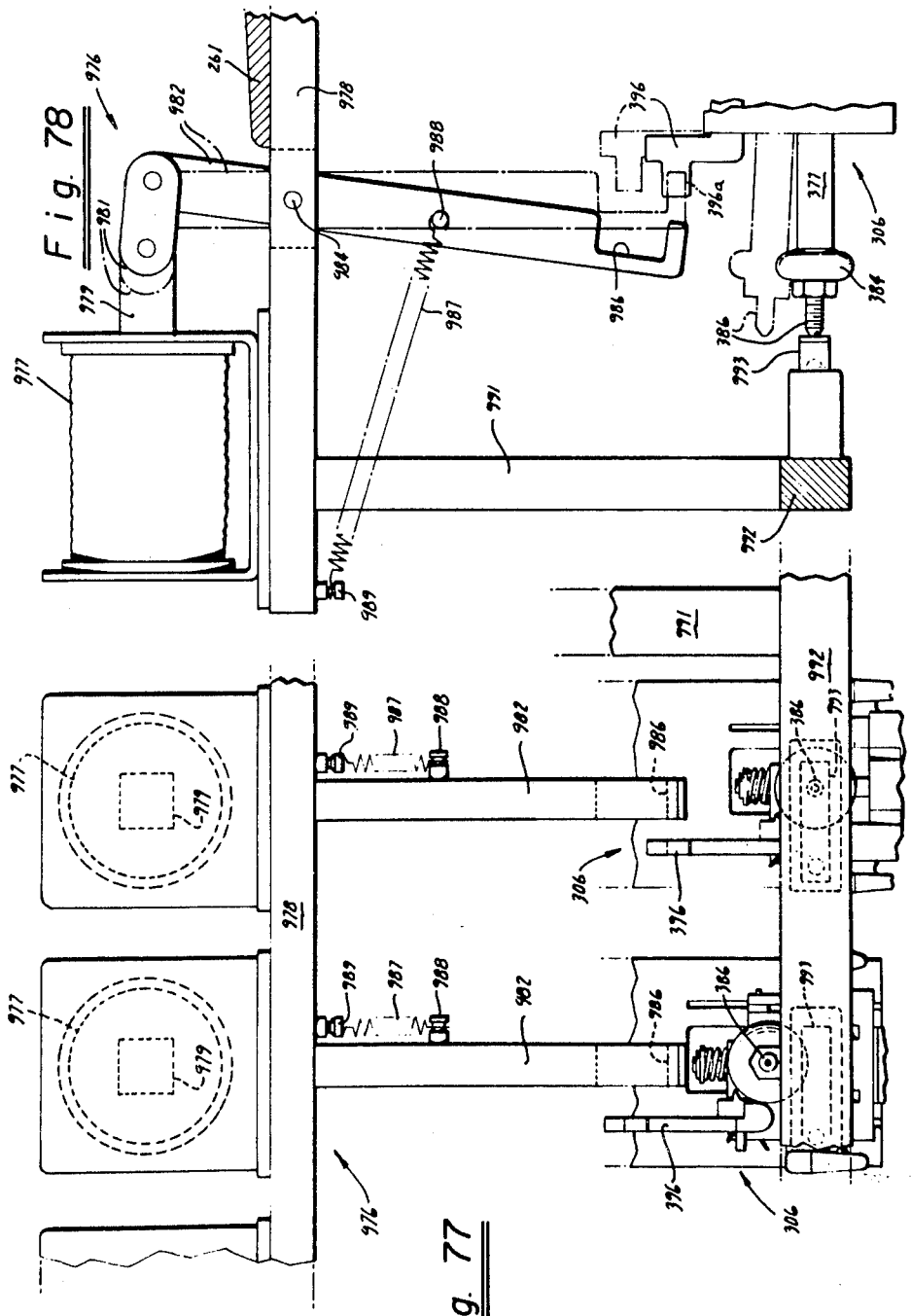
INVENTOR.
Alvoid V. Scollard
BY Alfred E. Comstock
Attorneys

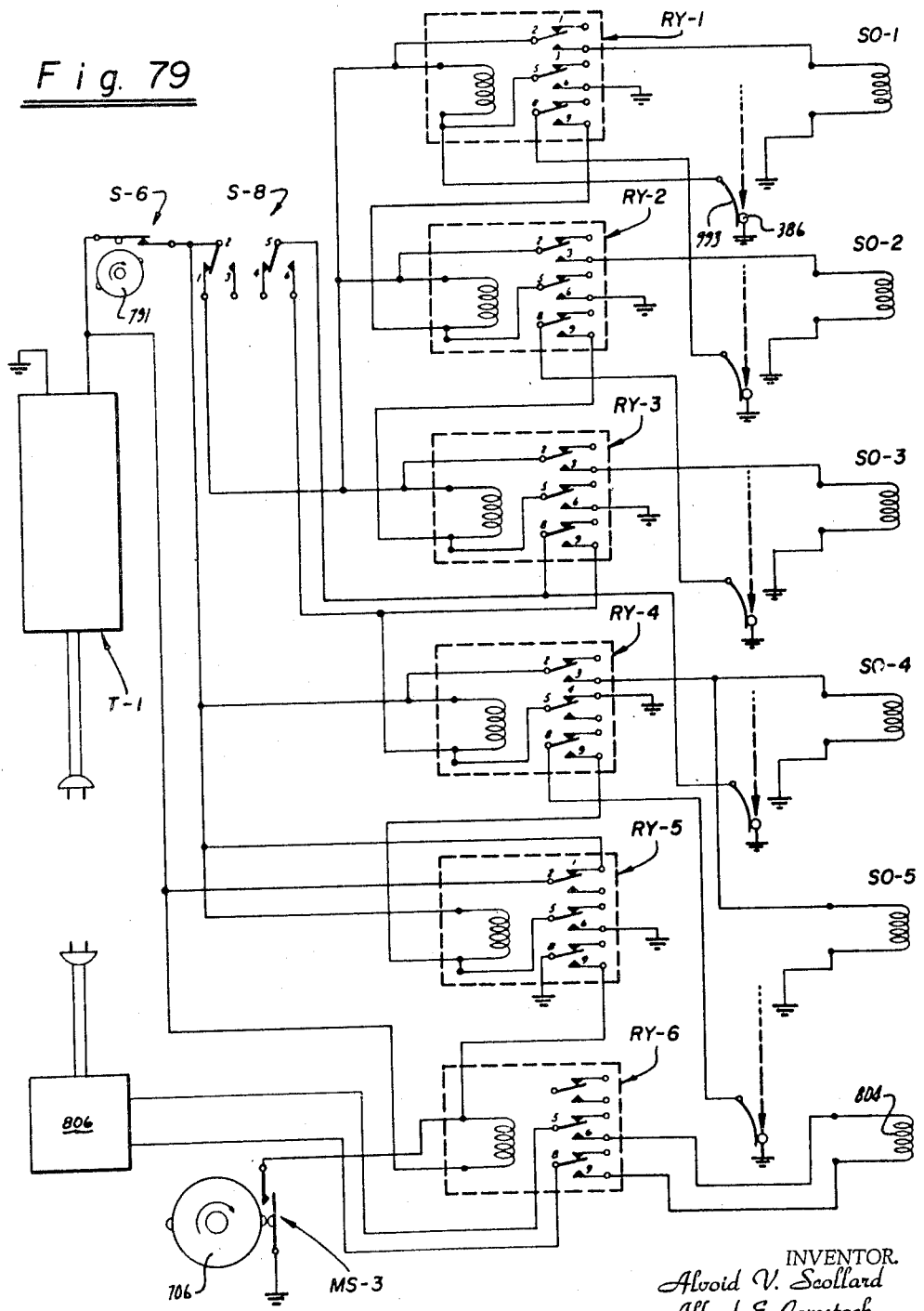

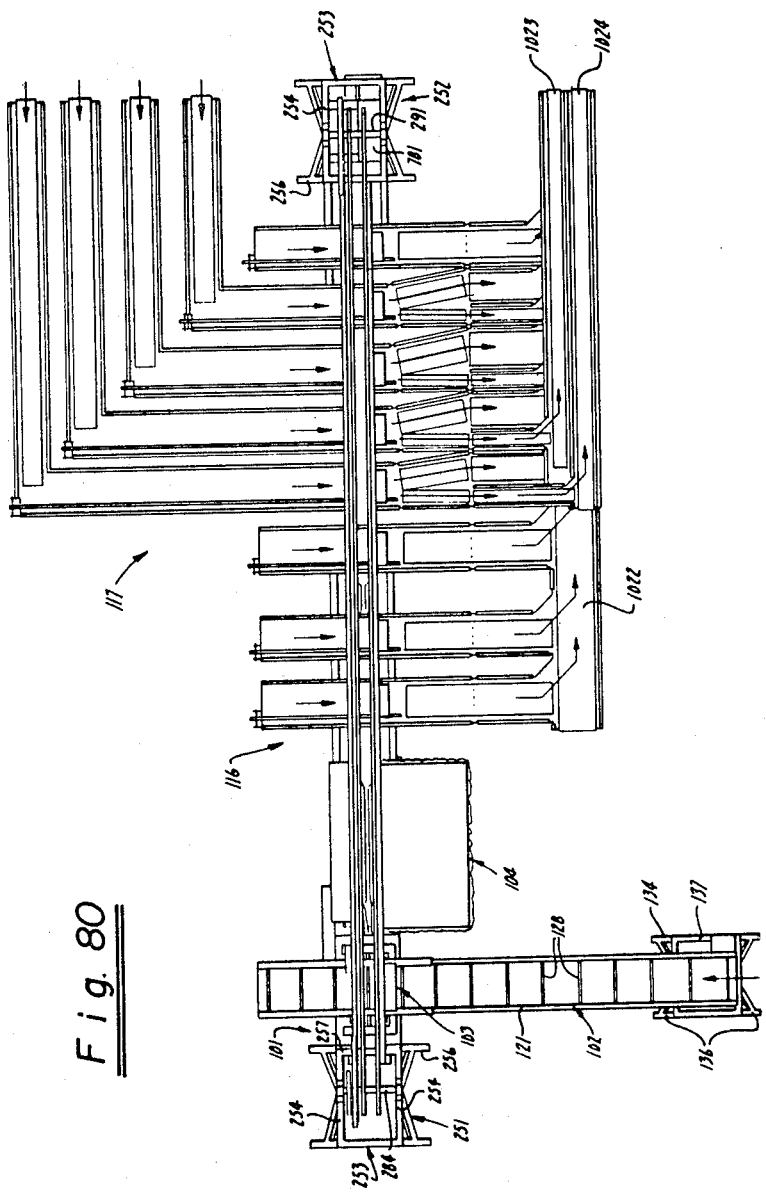

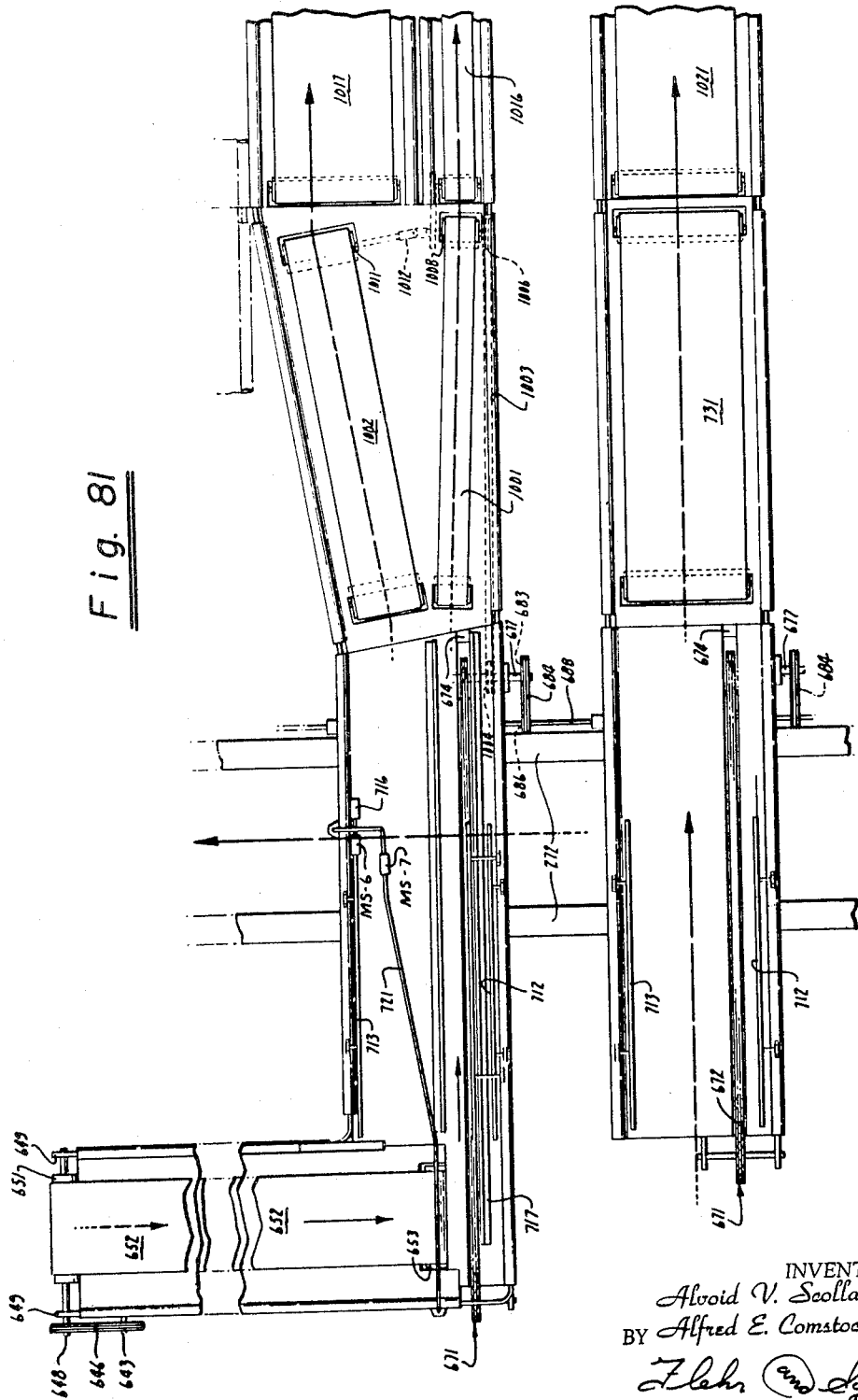

United States Patent Office 3,224,160
Patented Dec. 21, 1965

3,224,160
EGG PACKING APPARATUS
Alvoid V. Scollard, Orinda, and Alfred E. Comstock, Greenbrae, Calif., assignors to Safeway Stores, Incorporated, Oakland, Calif., a corporation of Maryland
Original application Feb. 14, 1961, Ser. No. 89,275. Divided and this application Mar. 13, 1962, Ser. No. 179,347
7 Claims. (Cl. 53—55)

This invention relates to handling and grading apparatus and more particularly to an egg handling and grading machine which will assist in the grading and packing of eggs in different quality and weight classifications.

As is well known to those skilled in the art of egg grading, eggs are commonly graded into six different weight classifications which are commonly called "jumbos"; "extra large"; "large"; "medium"; "small"; and "peewees." In addition to grading eggs by weight, it has been common to grade the eggs according to their quality by candling the eggs. Although machines and apparatus have been provided for automatically or semi-automatically grading eggs according to weight, it has been found to be very difficult to provide machines by which candling of the eggs can be accomplished rapidly and efficiently without handling the eggs. In addition, the machines or apparatus heretofore developed for this purpose have been unduly complicated and expensive, limiting their use to very large egg grading centers. There is, therefore, a need for a new and improved egg handling and grading apparatus which will overcome the above named disadvantages.

In general, it is an object of the present invention to provide an egg handling and grading machine which greatly facilitates the handling, grading and packing of eggs.

Another object of the invention is to provide an egg handling and grading machine of the above character in which the eggs can be packed automatically into different types of containers.

Another object of the invention is to provide an egg handling and grading machine of the above character in which automatic means is provided for feeding the egg receiving containers below the scale assemblies and removing the egg receiving containers after they have been filled.

Another object of the invention is to provide an egg handling and grading machine of the above character in which the apparatus for feeding the egg receiving cartons and for removing the egg receiving cartons is adapted for use with different types of egg receiving containers.

Another object of the invention is to provide an egg handling and grading machine of the above character which requires a minimum of personnel for its operation.

Another object of the invention is to provide an egg handling and grading apparatus of the above character which has a relatively high capacity and still is relatively economical to manufacture.

Another object of the invention is to provide an egg handling and grading apparatus of the above character which can be operated by relatively unskilled personnel.

Another object of the invention is to provide an egg handling and grading apparatus of the above character which is relatively compact and does not require a great amount of space.

Additional objects and features of the invention will appear from the following description in which the preferred embodiments have been set forth in detail in conjunction with the accompanying drawings.

Referring to the drawings:

FIGURE 3 is an isometric view, partially in schematic form, showing the various drive assemblies utilized in the egg handling and grading machine;

FIGURE 4 is a side elevational view of a portion of the in-feed conveyor;

FIGURE 5 is a cross-sectional view taken along the line 5—5 of FIGURE 4;

FIGURE 11 is a rear elevational view of the right-hand end of the egg handling and grading machine as shown in FIGURE 1;

FIGURE 12 is an enlarged detail view of the portion of our egg handling and grading apparatus enclosed within the line 12—12 of FIGURE 8;

FIGURE 13 is a cross-sectional view taken along the line 13—13 of FIGURE 12 showing one of the scale assemblies just before an egg is picked up by the scale assembly;

FIGURE 14 is a bottom plan view of the scale assemblies shown in FIGURE 12 looking along the line 14—14 of FIGURE 12;

FIGURE 15 is a top plan view of a portion of a plurality of scale assemblies looking along the line 15—15 of FIGURE 7;

FIGURE 16 is a cross-sectional view taken along the line 16—16 of FIGURE 12 showing portions of the scale assemblies;

FIGURE 17 is a cross-sectional view taken along the line 17—17 of FIGURE 16;

FIGURE 18 is a cross-sectional view taken along the line 18—18 of FIGURE 16;

FIGURE 19 is a cross-sectional view looking along the line 19—19 of FIGURE 17;

FIGURE 20 is a view similar to FIGURE 19 but showing the position of the selector shaft after it has passed the turning pin in the candling station.

FIGURE 21 is a view of a portion of the selector shaft looking along the line 21—21 of FIGURE 19;

FIGURE 22 is a cross-sectional plan view taken along the line 22—22 of FIGURE 16;

FIGURE 23 is a front elevational view looking along the line 23—23 of FIGURE 22.

FIGURE 24 is a rear elevational view in cross-section taken along the line 24—24 of FIGURE 2;

FIGURE 26 is a cross-sectional view taken along the line 26—26 of FIGURE 12 and shows the position of a scale assembly immediately after an egg has been picked up;

FIGURE 29 is a cross-sectional view taken along the line 29—29 of FIGURE 27 and shows the positions of the cam wheels entering and in the candling station;

FIGURE 30 is a cross-sectional view taken along the line 30—30 of FIGURE 27 and shows the positions of the selector shafts and mounting blocks of the scale assemblies entering and in the candling station;

FIGURE 31 is a front elevational view in cross-section taken along the line 31—31 of FIGURE 32 and particularly shows the construction of the scale assemblies and also shows the position of the scale beam assemblies while in the candling station;

FIGURE 33 is a view corresponding to FIGURE 29 and shows the positions of the cam wheels as they leave the candling station;

FIGURE 34 is a view similar to FIGURE 30 and shows the positions of the selector shafts and mounting blocks as the eggs leave the candling station;

FIGURE 36 is a cross-sectional view showing the position of the scale assembly in the commercial drop station;

FIGURE 38 is an enlarged detail view of the portion shown within the line 38—38 of FIGURE 37;

FIGURE 39 is a view similar to the view shown in FIGURE 33 showing the position of the cam wheels after the scale assemblies have passed through the commercial drop station;

FIGURE 40 is a view similar to FIGURE 34 showing the position of the blocks after the eggs have passed through the commercial drop station;

FIGURE 44 is a rear elevational view of a portion of the extra large station and shows the switch plate assembly and the splitter or slicer bar;

FIGURE 45 is a side elevational view of a scale assembly showing the complete range through which it may move and the weight range for each particular grade of eggs;

FIGURE 51 is a front elevational view of the solenoid assembly utilized at the extra large grading station taken along the line 51—51 of FIGURE 43;

FIGURE 52 is a side elevational view of the solenoid assembly taken along the line 52—52 of FIGURE 51;

FIGURE 53 is a view looking along the line 53—53 of FIGURE 52;

FIGURE 54 is a view looking along the line 54—54 of FIGURE 52;

FIGURE 55 is a front elevational view taken along the line 55—55 of FIGURE 43;

FIGURE 56 is a top plan view of the stub and main conveyor assemblies within the line 56—56 of FIGURE 1;

FIGURE 57 is a side elevational view looking along the line 56—56 of FIGURE 55;

FIGURE 58 is a side elevational view looking along the line 57—57 of FIGURE 55;

FIGURE 59 is a cross-sectional view taken along the line 58—58 of FIGURE 55;

FIGURE 61 is a cross-sectional view taken along the line 60—60 of FIGURE 55;

FIGURES 62A, 62B, 62C, 63A, 63B, 63C, 64A, 64B and 64C are diagrams showing the utilization of different types of egg receiving containers and how they are coordinated with the operation of the corresponding portions of the cam wheel utilized on the main conveyors;

FIGURE 74 is a cross-sectional view taken along the line 74—74 of FIGURE 73;

FIGURE 75 is a side elevational view taken along the line 75—75 of FIGURE 23;

FIGURE 76 is a front elevational view in cross-section taken along the line 76—76 of FIGURE 74;

FIGURE 77 is an alternative embodiment of a solenoid mechanism for use in our egg handling and grading machine;

FIGURE 78 is a side elevational view of the solenoid mechanism shown in FIGURE 77;

FIGURE 79 is a circuit diagram of the circuitry utilized with the solenoid mechanism shown in FIGURES 77 and 78;

FIGURE 80 is a top plan view of the egg handling and grading machine similar to the top plan view shown in FIGURE 2 with the exception that a modified conveyor system is utilized; and FIGURE 81 is a detailed view of two of the conveyors shown in FIGURE 80.

IN GENERAL

Figure 2:
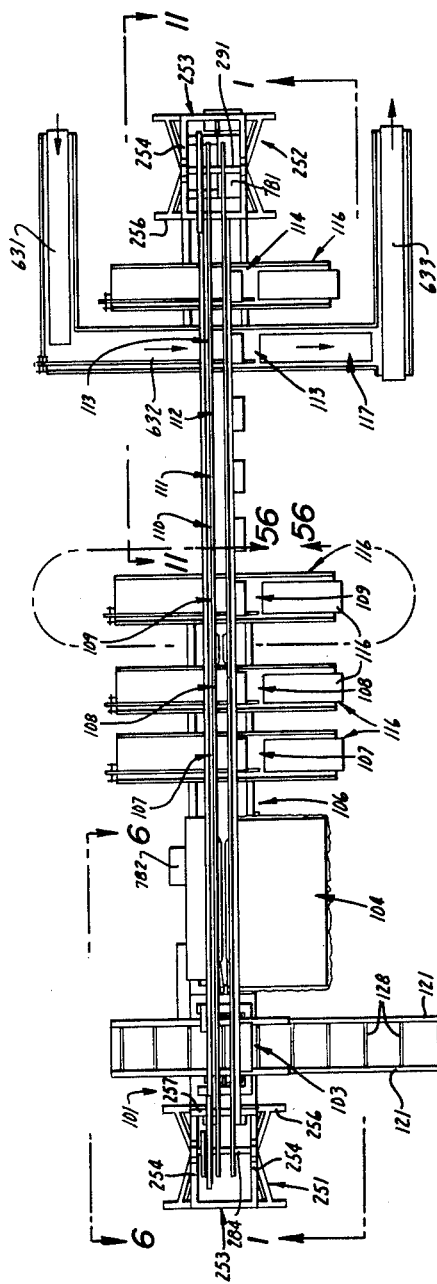
FIGURE 2 is a top plan view of the egg handling and grading machine shown in FIGURE 1.
Figure 1:
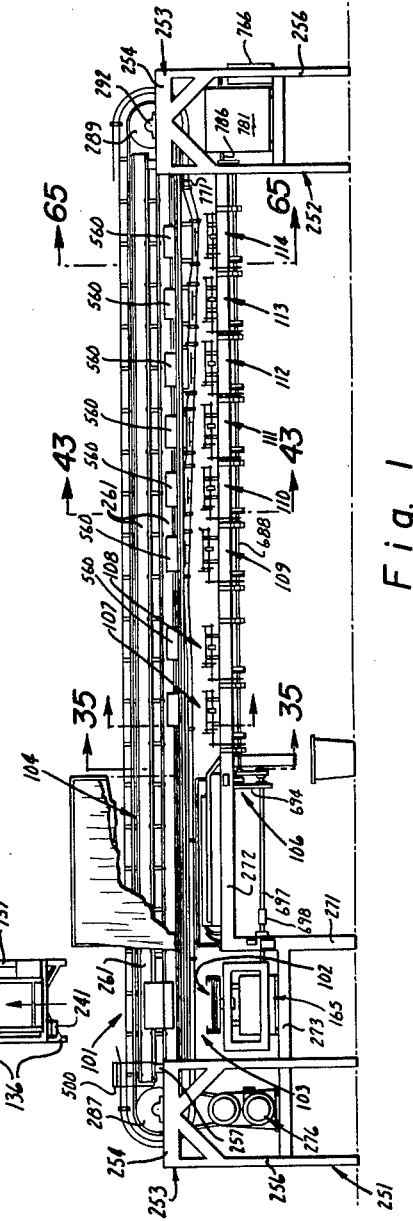
FIGURE 1 is a side elevational view of an egg handling and grading machine incorporating our invention partly in cross-section taken along the line 1—1 of FIGURE 2.

A general overall view of our egg handling and grading apparatus is shown in FIGURES 1 and 2. It consists of a continuously moving transport or conveyor assembly 101 to which eggs or other articles to be handled and graded are supplied by a feed-in conveyor 102. The eggs are picked up from the feed-in conveyor at an egg pick-up station 103. The eggs, after they have been picked up, travel into a candling station 104. The eggs, after they leave the candling station, pass into a blood drop station 106 and then to a check drop station 107 and a commercial drop station 108. The eggs are thereafter passed into six weight grading stations 109–114 which are arranged in any desired manner but preferably are arranged from large to small or small to large as, for example, they may be arranged as "jumbos," "extra large," "large," "medium," "small" and "peewee."

The eggs may be removed from the various stations in any suitable manner; for example, in the check, commercial, jumbo and peewee stations, the eggs may be removed by stub conveyors 116, whereas in the weight grading stations with a larger volume of eggs they can be removed with conveyor assemblies 117.

*Egg feed-in conveyor*

The egg feed-in conveyor is shown in detail in FIGURES 2, 4, 5, 7 and 8. The feed-in conveyor, as shown in these drawings, consists of spaced horizontal U-shaped channel members 121 lying in a substantially horizontal plane. A shaft 122 is rotatably mounted at one end of the channel members 121, and a shaft 123 is rotatably mounted at the other end of the channel members 121. Each of the shafts carries a pair of sprockets 124 disposed within the channel members 121. A pair of endless roller chains 126 and 127 pass over the sprockets and extend the length of the channel members 121. The endless roller chains 126 and 127 are provided with interconnecting rods 128 which extend transversely of the conveyor and are spaced apart a predetermined distance so that they are adapted to receive egg pallets or trays of a predetermined size as hereinafter described.

A top or floor plate 129 is mounted on the top portions of the channel members 121 and serves to provide a surface over which the upper run of the endless chains travel carrying with them the transverse pusher or advancing rods 128. A bottom plate 131 is secured to the bottom portions of the channel members 121 and serves to enclose the bottom runs of the endless chains of the conveyor. A pair of L-shaped protective members 132 is secured to the channel members 121 and overlies the upper runs of the endless chains as shown particularly in FIGURE 5. They serve as a protective covering over the chains to prevent the clothes of an operator from becoming entangled within the chain.

The feed-in conveyor is supported in any suitable manner in a generally horizontal plane and at any desired height. It, however, is generally desirable to support the conveyor at waist height to eliminate bending and stooping by the operator as he places trays on the conveyor as hereinafter described. The inlet or outlet end of the conveyor is supported by a framework 134 which consists of four inclined legs 136 upon which is mounted on a rectangular frame 137. A rod 138 is mounted on the rectangular frame 137 and extends in a direction transverse of the conveyor. A trunnion 139 is rotatably mounted on the rod 138 and has a swivel member 141 rotatably mounted thereon. The trunnion 139 permits rotation about a horizontal axis, whereas the swivel member 141 permits rotation about a vertical axis. The swivel member 141 is secured to the in-feed end of the conveyor and permits sidewise and up and down movement of the forward end of the conveyor as hereinafter described. A set screw 140 in the trunnion 139 engages a groove 138a in the rod 138 and prevents sidewise slipping of the trunnion 139 on the rod 138. Similarly, a set screw 142 in the trunnion 139 engages a groove 145a in a pin 145 fixed in the swivel member 141.

Figure 67:
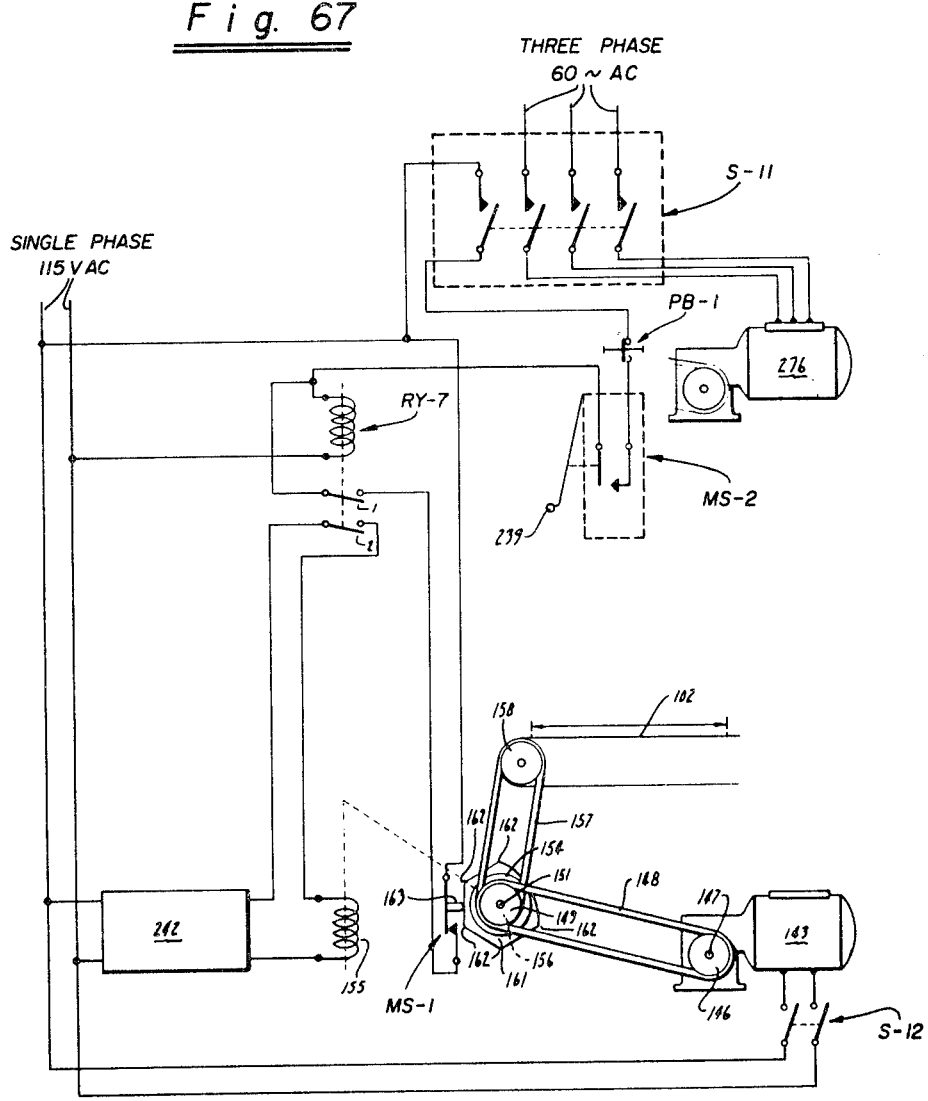
FIGURE 67 is a circuit diagram with certain portions of the apparatus schematically illustrated showing the operation of the egg in-feed conveyor.

Drive means for operating the conveyor is mounted on the framework 134 and consists of a gear motor 143 mounted upon a bed plate 144 secured between the legs 136 of the framework 134. A sprocket wheel 146 is mounted on the output shaft 147 of the gear motor 143 and drives a chain 148. The chain 148 drives a sprocket wheel 149 fixed to a shaft 151 rotatably mounted in pillow blocks 152 mounted on horizontal frame members 153 secured to the legs 136. The shaft 151 is comprised of two parts: 151a and 151b which are adapted to be interconnected by an electric clutch 154 of conventional construction which is provided with a coil 155 (see FIGURE 67). Shaft 151a, therefore, corresponds to a driving shaft, whereas shaft 151b corresponds to a driven shaft. A large sprocket wheel 156 is affixed on the shaft 151b and drives a chain 157. The chain 157 drives a smaller sprocket wheel 158 affixed to the shaft 122 and, therefore, serves to drive the conveyor comprised of the roller chains 126 and 127 and interconnecting advancing rods 128.

A cam wheel 161 is mounted on the outer end of the shaft 151b and is provided with a plurality of raised portions 162 spaced in a predetermined manner about the wheel to cause proper advancement of the conveyor as hereinafter described. A microswitch MS-1 is mounted on the frame 134 and is provided with an operating arm 163 that serves as a cam follower which engages the cam wheel 161.

Means is provided for mounting the other end of the feed-in conveyor 102 in the main frame 164 of the transport or conveyor assembly 101 to provide a path of movement for the conveyor at the egg pick-up station which is substantially triangular in form as hereinafter described. The means for moving the feed-in conveyor in this fashion at the pick-up station consists of a transfer gear assembly 165 disposed within a box or housing 166 which is mounted on the main frame 164. The transfer motion gear housing 166 is substantially rectangular in shape and has supported thereon in a manner hereinafter described a rectangular box-like frame 167. Four lift rods 168 extend vertically out of the transfer motion gear housing 166 adjacent the four top corners of the housing 166 and have affixed in the upper ends thereof a pair of horizontal rods 169 which are slidably mounted in sleeve bearings 171 provided in the side walls of the retangular box-like frame 167 (see FIGURE 8).

A horizontal tubular member 172 is affixed to the frame 167 between the pair of horizontal rods 169 and has rotatably mounted thereon a trunnion member 173. A swivel member 174 is rotatably mounted on the trunnion member for rotation about a substantially vertical axis and is affixed to the feed-in conveyor at a point underlying the pick-up station. This trunnion and swivel connection permits rotational movement of this portion of the feed-in conveyor about a vertical axis and about a horizontal axis in the same manner as the front end of the egg feed-in conveyor. A pair of pusher rods 176 extend horizontally from out of the sides of the transfer motion gear housing 166 and have rollers 178 mounted on the ends thereof which engage the side walls of the box-shaped frame 167.

Figure 9:
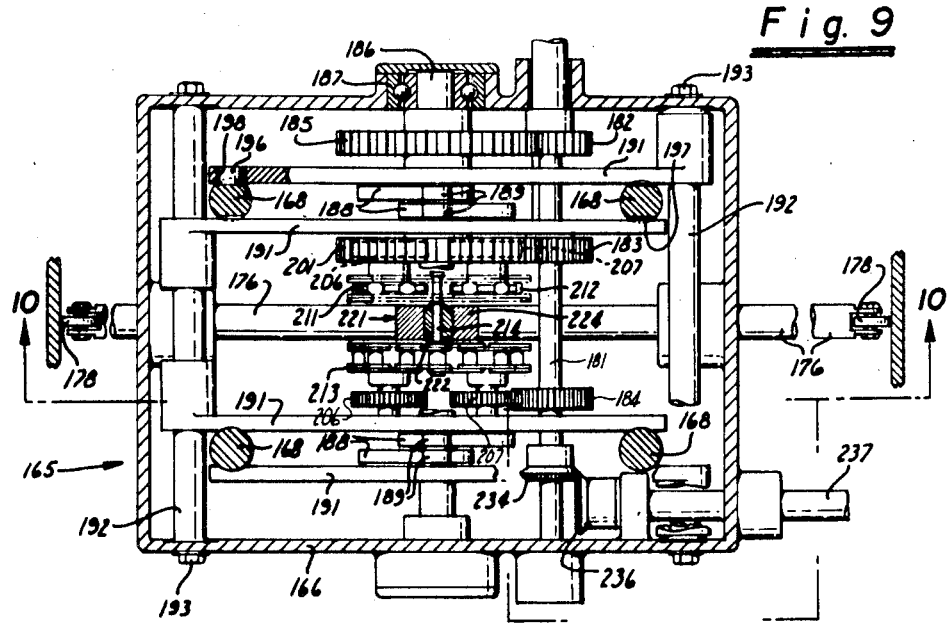
FIGURE 9 is a cross-sectional view taken along the line 9—9 of FIGURE 10 and particularly shows the arrangement of the transfer motion gear assembly utilized in the main drive mechanism.
Figure 10:
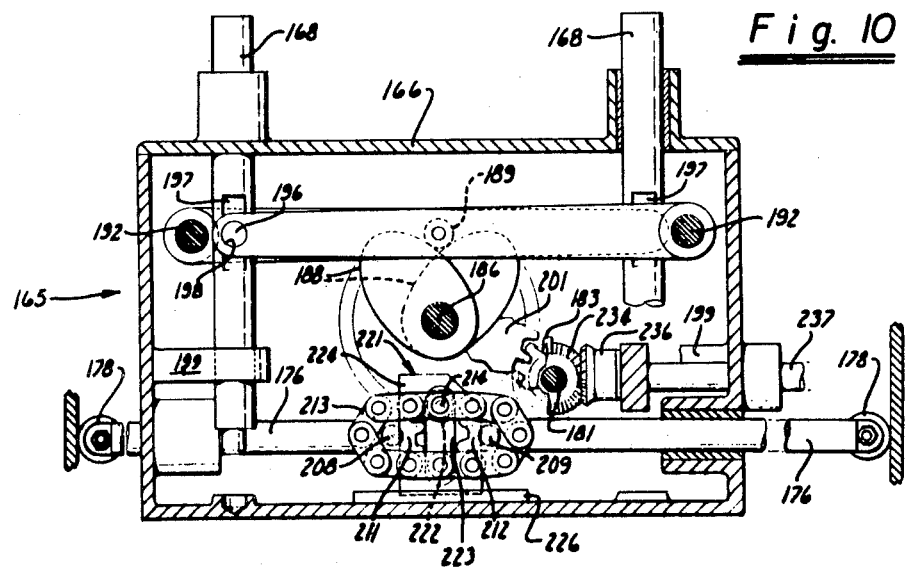
FIGURE 10 is a cross-sectional view taken along the line 10—10 of FIGURE 9.

The tranfer motion gear assembly 165 provided within the gear housing 166 for causing vertical movement of the vetrical rods 168 and horizontal movement of the pusher rods 176 is shown particularly in FIGURES 9 and 10. The transfer motion gear assembly is driven by a drive shaft 181 which extends through the gear housing 166 and is rotatably mounted in the side walls thereof. Spur gears 182, 183 and 184 are affixed to the shaft 181. Spur gear 182 drives a large spur gear 185 affixed to a shaft 186 extending across the transfer gear housing 166 parallel to the shaft 181 and rotatably mounted in the side walls of the housing by ball bearing assemblies 187. Four cams 188 are affixed to the shaft 186 and engage cam followers 189 provided intermediate the ends of rocker arms 191. The four rocker arms 191 are rotatably mounted in pairs on rods 192. The rods 192 extend across the housing 166 parallel to the shafts 181 and 186 and are affixed to the side walls of the housing by a suitable means such as cap screws 193. The other ends of the rocker arms 191 are pivotally connected to the vertical lift rods 168 in a suitable manner such as by means of a roller assembly 196 affixed to the lift rod on a flat 197 provided on the lift rod and journalled in a hole 198 provided in the rocker arm. The arrangement of the cams 188 is such that as the drive shaft 181 is rotated, the lift rods 168 are raised and lowered in unison to thereby raise and lower the frame 167.

The spur gears 183 and 184 operate means for extending and retracting the pusher rods 176. This means consists of spur gears 201 driven by gears 183 and 184 and which are affixed to the shaft 186. Each of the spur gears 201 drives a pair of small spur gears 206 and 207 affixed to shafts 208 and 209 rotatably mounted within the housing 166. It will be noted that the gearing arrangement is such that the gears 206 and 207 are driven in the same direction. Two pairs of sprocket wheels 211 and 212 are affixed to the shafts 208 and 209 and are driven thereby. An endless chain 213 interconnects each pair of sprocket wheels 211 and 212. The two chains 213 drive a connecting pin 214.

The pin 214 drives a Scotch yoke 221. The Scotch yoke 221 consists of a follower block 222 mounted on the pin 214 and slidably disposed within a vertical slot 223 provided in a larger block 224 slidably mounted for horizontal movement in a plate 226 affixed to the bottom wall of the gear housing 166. The pusher rods 176 are secured to the block 224. It is readily apparent that as the chains 213 travel in a counterclockwise direction as viewed in FIGURE 10, rectilinear motion in a horizontal direction will be imparted to the pusher rods 176 by the Scotch yoke 221 to first extend one pusher rod while retracting the other pusher rod and then extending the other pusher rod while retracting the first named pusher rod.

The lift rods 168 have their ends within the housing slidably mounted in supporting members 199 secured to the side walls of the tranfer gear housing 166 so that the movement of the rods 168 will be in a vertical direction.

Figure 8:
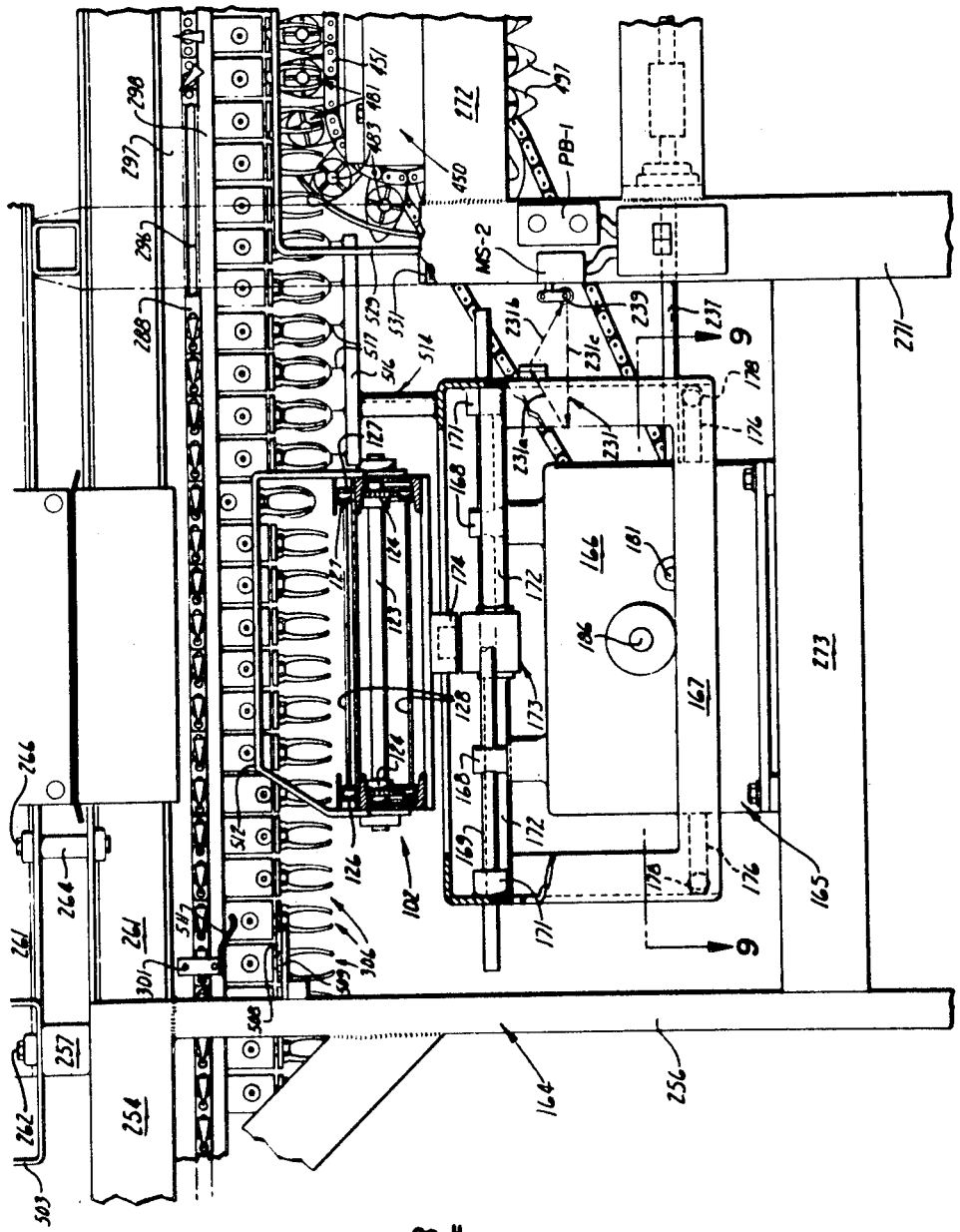
FIGURE 8 is a cross-sectional view taken along the line 8—8 of FIGURE 7 and particularly shows the egg pick-up station.

The transfer gear mechanism 165 is timed in such a manner that the motion produced on the pick-up end of the fed-in conveyor 102 is substantially triangular in shape as shown in the line diagrams 231 in FIGURE 8 as hereinbefore explained. In other words, there is a diagonal raising of the frame 167 as the frame 167 is raised by the lift rods 168 and as the frame 167 is moved to the right by the pusher bars 176 at a uniform rate as shown in portion 231a of line diagram 231. During the remainder of the motions, there is a diagonal lowering and a straight line return as shown in portions 231b and 231c, respectively, of the line diagram. The pusher rods 176 are always in engagement with opposite sides of the frame 167 as shown particularly in FIGURE 10 so that a smooth uniform motion is imparted to the feed-in conveyor.

The transfer motion gear housing 166 is also provided with means for driving other portions of our egg handling and grading apparatus and consists of a bevel gear 234 which is affixed to the shaft 181. Bevel gear 234 drives another bevel gear 236 affixed to a machine drive shaft 237 rotatably mounted in the housing 166 and extending out from the housing at right angles to the shafts 181 and 186.

A microswitch MS–2 is mounted on the main frame 164 and is provided with an operating arm 239 which is adapted to be engaged by the box-like frame 167 as the frame 167 is reciprocated back and forth for a purpose hereinafter described. A pushbutton PB–1 is also mounted on the main frame 164 to permit the egg feed-in conveyor to be stopped by the operator in the candling station as hereinafter described.

A control box 241 is mounted on the framework 134 at the far end of the egg feed-in conveyor. The control box 241 contains an on-off switch S–7 (see FIGURE 67) and a control 242 for the electric clutch 154.

*Main transport or conveyor assembly*

The main conveyor assembly consists of a main frame 164 which extends along the length of the main conveyor run. The main frame consists of a pair of four-legged stands 251 and 252 with the stand 251 being at one end, or the left end, of the main conveyor, and the stand 252 being at the other end, or the right end, of the main conveyor as viewed from FIGURE 1. The stands are formed of a substantial material such as channel iron so that they can support substantially all of the weight of the entire egg handling and grading apparatus. Each of the stands 251 and 252 is provided with a framework 253 lying in a generally horizontal plane. The framework 253 is comprised of a pair of side members 254 extending in a direction longitudinal of the main conveyor and secured to the four inclined legs 256 of the stand. The framework 253 also includes a cross member 257 mounted on top of the side members 254 and extending transversely of the main conveyor.

The main frame 164 also includes a bridge-type framework which is supported by the two stands 251 and 252 and provides a rigid support for the apparatus mounted between the two stands as hereinafter described. This bridge-type framework is comprised of four U-shaped channel members 261 which are arranged in two pairs of vertically spaced members lying in horizontal planes with each pair being spaced apart horizontally to thereby provide a rectangular-like arrangement extending between the two support stands 251 and 252. As shown particularly in FIGURE 7, the channels are arranged so that their flanges face outwardly. The top pair of channel members rest upon the cross members 257 of the stands 251 and 252 and have their lower flanges secured thereto by suitable means such as cap screws 262. The lower pair of channel members 261 have their upper flanges secured to the cross members 257 in a similar manner. A uniform vertical spacing is maintained between the upper and lower pairs of channel members by spacers 264 secured to the lower flanges of the upper channel members and the upper flanges of the lower channel members by cap screws 266. Means is also provided for maintaining the horizontal spacing between the pairs of channel members and consists of spacers 267 which are secured to the opposed channels by suitable means such as cap screws 268.

Figure 6:
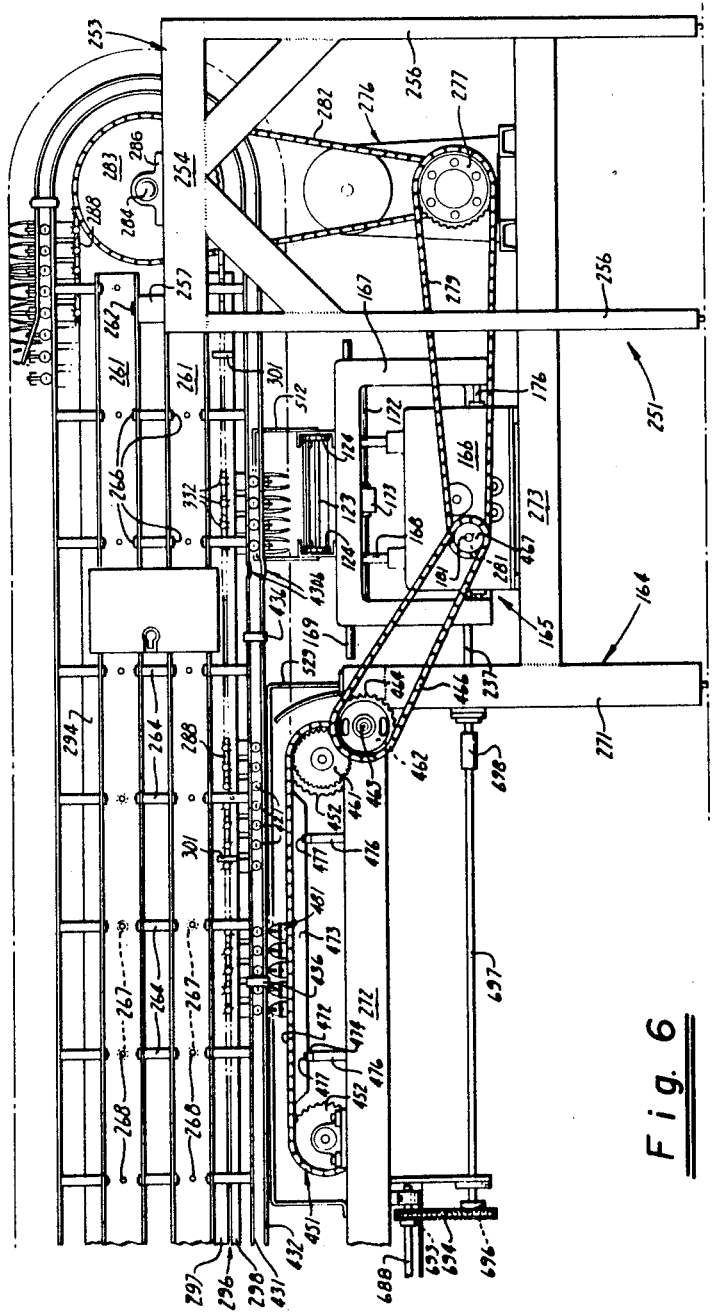
FIGURE 6 is an enlarged detail view of the rear side of the left-hand end of our egg handling and grading machine as viewed in FIGURE 1 and particularly shows portions of the drive mechanisms utilized.
Figure 7:
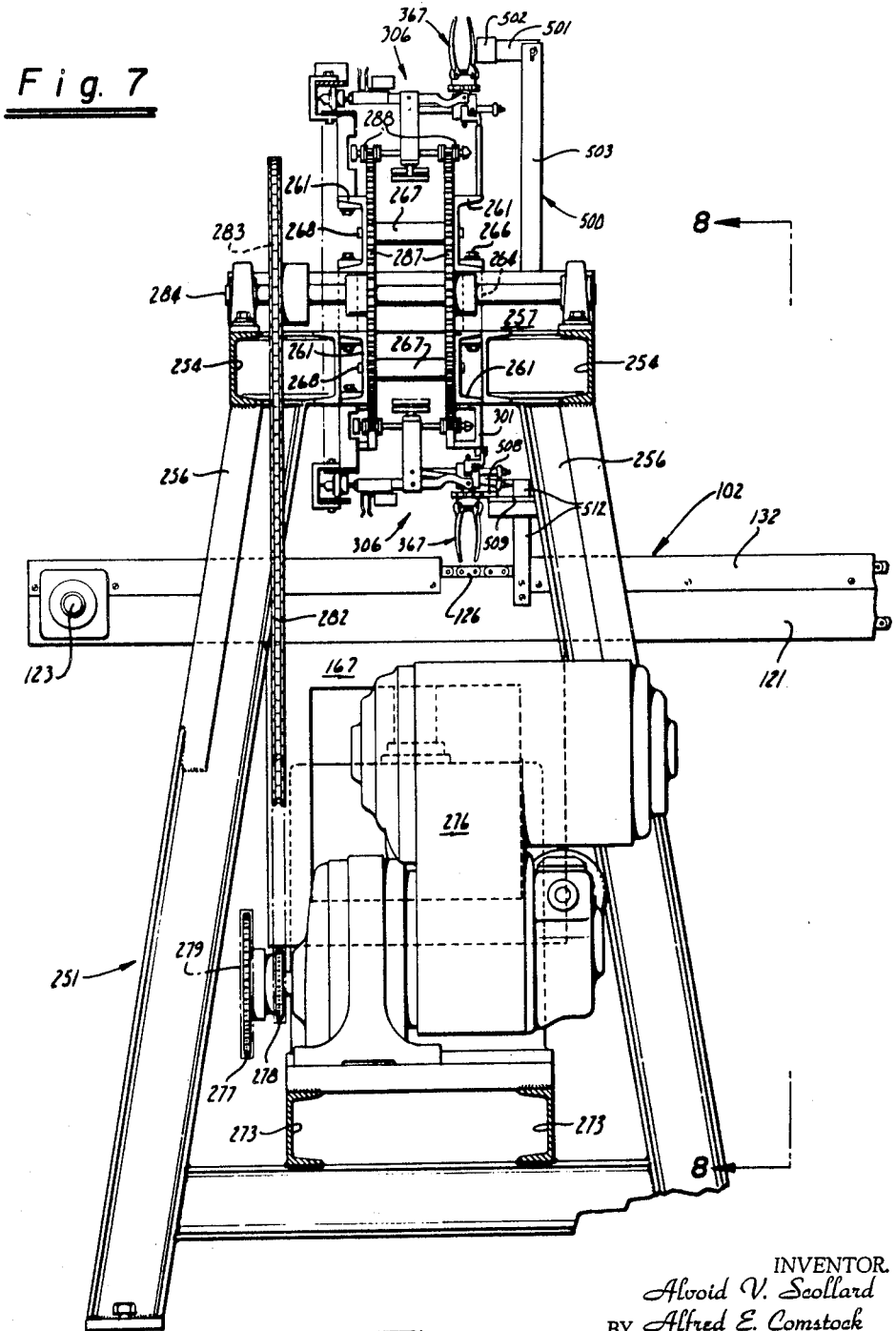
FIGURE 7 is an end elevational view of the left-hand end of our egg handling and grading machine as viewed in FIGURE 1 showing the main frame and the main drive mechanism.

The stand 251 is provided with an extension (see FIGURES 6 and 8) which consists of a pair of spaced vertical legs 271 which carry a pair of horizontally spaced U-shaped channel members 272 which lie in a horizontal plane parallel to the channel members 261. The other ends of the channel members 272 are secured to the stand 252. The channel members 272 are arranged so that their flanges face inwardly as shown. A pair of longitudinal members 273 are mounted between the legs 271 and the legs 256 of the stand 251 and provide a support for the transfer motion gear housing 166.

Drive means for the main conveyor is mounted in the stand 251. This drive means can take any suitable form and, as shown, may be a combination unit 276 consisting of a three phase 220 volt A.-C. motor which is provided with variable speed control. The output shaft of the combination unit 276 has fixed thereto a large sprocket wheel 277 and a small sprocket wheel 278. The large sprocket wheel 277 drives an endless chain 279 which drives a sprocket 281 (see FIGURE 3) connected to the main drive shaft 181 for the transfer motion gear assembly 165. The small sprocket wheel 278 drives an endless chain 282. The endless chain 282 serves as the drive for the main conveyor. It drives a large sprocket wheel 283 affixed to a shaft 284 rotatably mounted on top of the stand 251 by a pair of pillow blocks 286.

Figure 25:
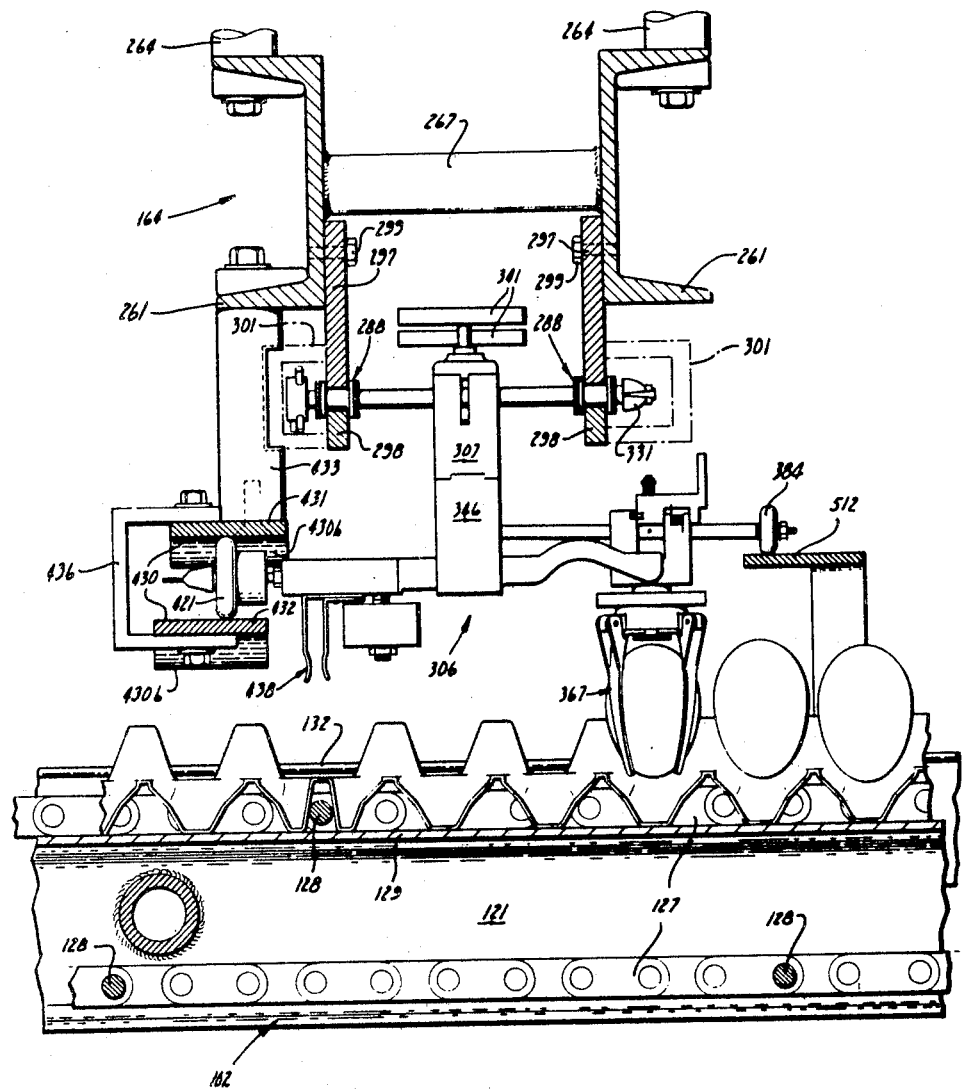
FIGURE 25 is a cross-sectional view taken along the line 25—25 of FIGURE 8 showing the egg pick-up station.

A pair of large spaced apart sprocket wheels 287 are affixed to the shaft 284 and drive a pair of long endless chains 288. The endless chains 288 travel over another pair of large sprocket wheels 289 affixed to a shaft 291 rotatably mounted upon the stand 252 by pillow blocks 292. The sprocket wheels 287 and 289 are positioned in such a manner that the chains travel in continuous endless parallel paths lying in substantially horizontal planes. The upper runs of the endless chains 288 are carried and guided by a pair of support guide members 294 which are affixed to the upper portions of the top pair of the channel members 261 by suitable means such as cap screws (not shown). The lower runs of the endless chains 288 ride in a slot 296 extending longitudinally of the conveyor which is formed by a pair of strap-like members 297 and 298. The member 297 is secured to the lower portion of the lower pair of channel members 261 by suitable means such as cap screws 299 (see FIGURE 25). The member 298 is supported on the member 297 to provide the slot 296 by C-shaped brackets 301 which are secured to the members 297 and 298 by cap screws 302 (see FIGURE 13).

*Scale assemblies*

A plurality of scale assemblies 306 are carried by the endless chains 288. Each of the scale assemblies consists of a mounting block 307 (see FIGURES 13 and 16) which is provided with a pair of bores 308 on opposite sides thereof which slidably receive a pair of guide rods 309 mounted in the endless chains 288. As will be noted particularly from FIGURE 22, the endless chains are completely filled with mounting blocks 307 disposed between the endless chains 288 and lie in relatively close proximity to each other. Each of these mounting blocks forms part of a separate scale assembly as hereinafter described.

As can be seen particularly from FIGURE 22, each of the endless chain 288 is comprised of spaced apart pairs of links 311 which are provided with four holes spaced along the length of the links. The two guide rods 309 for each of the mounting blocks 307 are mounted between the endless chains 288 in two of the holes in each link 311 in the pairs of links. One of the two guide rods serves as means for interconnecting the pairs of links. Spacers 310 are mounted on the guide rods 309 and serve to space the links 311. The guide rods extend transversely of the conveyor chains 288 and are fastened therein by snap rings 312.

Offset springs 313 are mounted on each of the guide rods 309 for yieldably urging the mounting blocks 307 in opposite directions. It will be noted that the offset springs 313 are mounted on opposite sides of every other mounting block so that the mounting blocks 307 will be offset in opposite directions for a purpose hereinafter described.

Each of the mounting blocks 307 is provided with a centrally disposed opening 316 (see FIGURE 16) in which is rotatably mounted a selector shaft 317 or a selector shaft 318. Two types of selector shafts are provided. One type of selector shaft is mounted in the blocks which are urged in one direction by the offset springs, and the other type of selector shaft is mounted in the blocks which are urged in the opposite direction by the offset springs. The first type of selector shaft will be designated as the selector shaft 317, whereas the second type will be designated as selector shaft 318.

Each of the selector shafts 317 and 318 is provided with four machined flat-sided notches 319, 320, 321 and 322 which are spaced longitudinally of the selector shaft from a shoulder 323 with 319 being the longest notch and 322 being the shortest notch. These notches are utilized in the selection operation in the candling station as hereinafter described. The notches 319–322 on selector shaft 317 extend to the right from shoulder 323 as viewed in FIGURE 17, whereas the same notches in selector shaft 318 extend to the left from shoulder 323 as viewed in FIGURE 18. In other words, the notches on one selector shaft are mirror images of the notches on the other selector shaft. The selector shafts 317 and 318 are rotatably secured in holes provided in the links 311 of the endless chains 288 by snap rings 324 mounted in grooves 325.

A lock bar 326 is provided in each of the mounting blocks 307 and is adapted to engage the notches 319–322 provided in the selector shaft carried by the mounting block. The lock bar 326 is yieldably urged upwardly into engagement with the selector shaft as shown particularly in FIGURE 16 by a pair of springs 327 seated within the mounting block and engaging opposite ends of the lock bar. The lock bar 326 is guided in its vertical movements by a pin 328 affixed in the latch bar and slidably mounted in the mounting block.

A selector knob 331 is mounted on one end of each of the selector shafts to facilitate rotation of the same. A circular member 332 is mounted on the other end of each of the selector shafts and each is provided with four radially extending pins 333, 334, 335 and 336 for rotating the selector shaft to predetermined positions as hereinafter described.

Another block 338 is mounted upon the mounting block 307 and carries a vertically disposed stub shaft upon which is mounted a cam wheel 341. The stub shaft is either a longer stub shaft 339 or a shorter stub shaft 340, so that every other cam wheel 341 is offset in the vertical direction as shown in FIGURES 13 and 16.

A scale beam mounting block 346 is detachably secured to the main mounting block 307 by suitable means such as a screw 347 (FIGURE 31). A scale beam 348 is pivotally mounted in the lower portion of the block 346 by a pair of pivots 349 threaded into the block 346 and seated in bearing members 351 provided in the scale beam 348. One end of the scale beam 348 is provided with a bifurcated end 352. A claw mounting block 353 is pivotally carried in the bifurcated end 352 by pivots 356 mounted in the bifurcated ends and engaging bearings 357 provided in the claw mounting block 353 (see FIGURE 31).

A depressor rod 361 is slidably and rotatably mounted in the claw mounting block 353. It is mounted in the block 353 in a suitable manner such as by bushing 362. The bushing 362 is an integral part of a gear member 364 which is rotatably carried in the mounting block 353. The gear member 364 is provided with a plurality of teeth 364a which are adapted to engage racks as hereinafter described. A member 366 of suitable material such as Teflon is provided between the gear member 364 and the mounting block 353 to ensure ease of rotation of the gear member. The gear member 364 can also be provided with a bearing (not shown) of suitable material such as brass to ensure ease of rotation on the depressor rod 361. The depressor rod 361 is provided with a disk on its lower end for a purpose hereinafter described.

A claw assembly 367 is carried by the gear member 364. It consists of four claws which are pivotally mounted on projecting portion 369 projecting outwardly in a radial direction from the gear member by suitable means such as pins 371. The claws 368, as can be seen from the drawings, are slightly tapered and are provided with rounded ends. They depend in a downward direction and curve inwardly. It also will be noted that the claws 368 are mounted so that they are not equally spaced about the periphery of the gear member 364 but rather they are mounted in spaced opposing pairs so that there is a substantially greater space between the pairs than there is between the claws which comprise each pair.

Each of the claws is provided with an extension 373 which extends inwardly at generally right angles to the general downward directions of the claws. As can be seen from FIGURE 31, this extension of each of the claws overlies the disk 363 carried by the depressor rod 361. Means is provided for yieldably urging the depressor rods and the disk in an upward direction and for locking the claw assembly 367 in a closed or locked position. This means consists of a block 376 slidably mounted on the depressor rod 361 and which is also pivotally connected to a latch lever 377 by pins 378. A spring 379 is mounted on the depressor rod and has one end which engages the latch block 376 and the other end which engages a snap ring 381 provided at the top end of the depressor rod. The latch lever 377 is pivotally mounted within the scale beam mounting block 346 by pivots 382 threaded into the mounting block 346 and engaging opposite sides of the latch member 377 as shown in FIGURE 31.

A small weight 384 in the form of an annulus is mounted on the outer end of the latch lever 377 by means of the screw 386 threaded into the latch lever 377 and held in place by a nut 388 threaded onto the screw.

Figure 32:
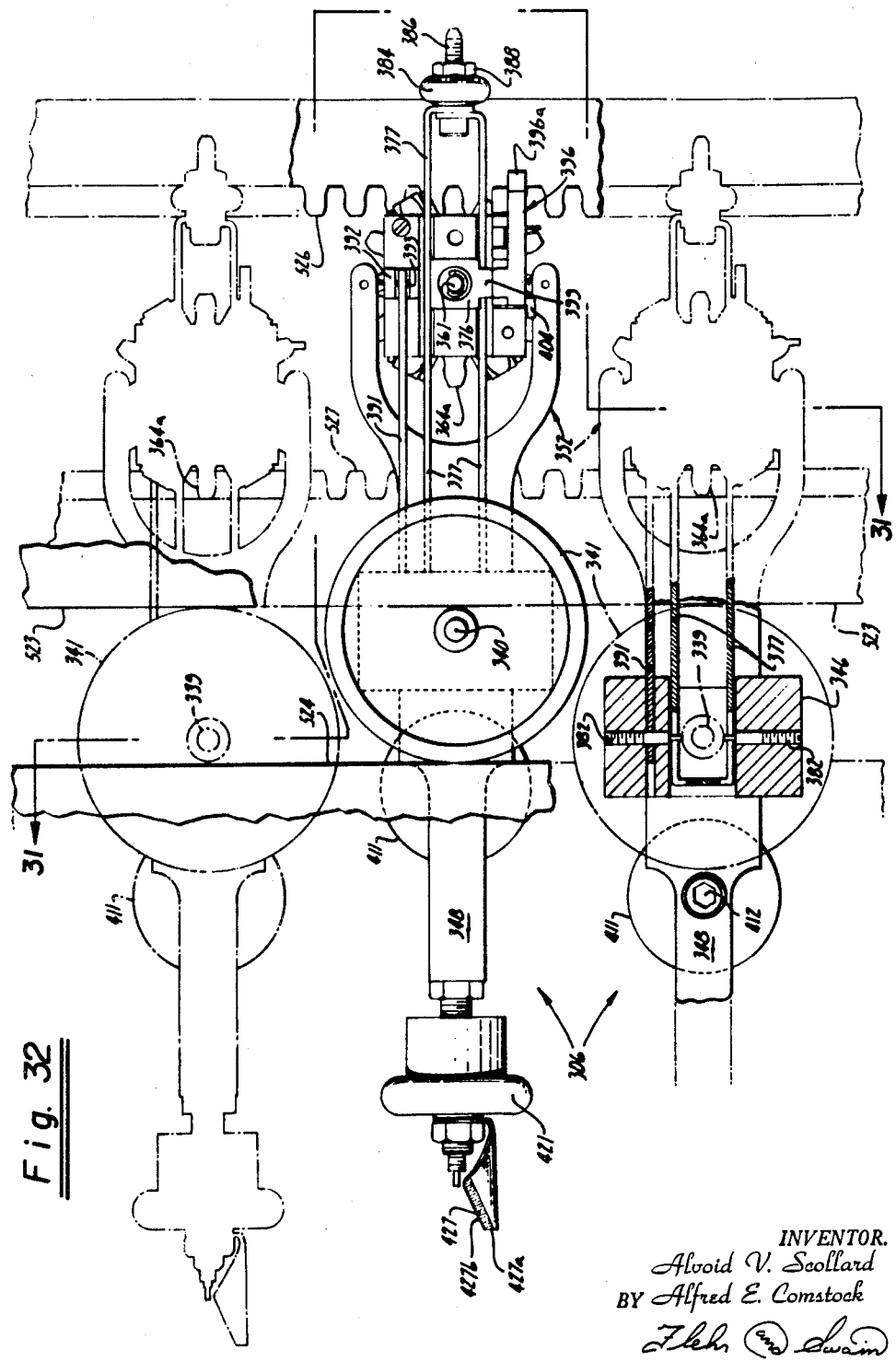
FIGURE 32 is a plan view in cross-section taken along the line 32—32 of FIGURE 31.

A parallel bar 391 (see FIGURES 31 and 32) is provided as a part of each of the scale beam assemblies to ensure that the eggs will be dropped in a proper manner as hereinafter described. The parallel bar 391 has one end pivotally mounted in a vertical mounting member 392 secured to the claw mounting block 353 by a suitable means such as screw 393. The parallel bar is pivotally mounted in the upper end of a slot provided in the mounting member 392 by a pin 394. The other end of the parallel bar 391 is connected to one of the pivots 382 utilized for pivotally mounting the latch lever 377 as shown in FIGURE 31. This parallel bar acts in a manner well known to those skilled in the art to provide a parallelogram arrangement so that the claws will be moved in a generally vertical direction as the scale beam pivots upwardly and downwardly.

Means is provided for locking or latching the claws 368 in an engaged position and consists of a latch arm 396 which is pivotally mounted on one side of the claw mounting block 353 by a pin 397. The latch arm is provided with an abutment 398 which is adapted to be engaged by a projection 399 provided on the latch block 376 as shown particularly in FIGURE 31 so that the latch block can be latched or locked in an uppermost position to thereby hold the depressor rod 361 in a raised position and to thereby lock the claw assembly 367 in a locked or engaged position.

Means is provided for yieldably urging the latch arm 396 into a position so that the abutment 398 can be engaged by the projection 399 on the latch block 376. Such means consists of a coil spring 401 having one end 402 engaging the latch arm 396 and the other end 403 engaging the claw mounting or gear block 353. A stop 404 is provided on the latch arm and is adapted to engage the claw block 353 to prevent the spring 401 from urging the latch arm beyond a predetermined position. The latch arm 396 is also provided with an upwardly extending extension 396a which is adapted to be engaged as hereinafter described.

Two different weights are provided on the scale beam, one of which may be called the pendulous range control weight and the other of which can be called the balance weight. The pendulous range control weight consists of a cylindrical block 411 (see FIGURES 13 and 26) threaded onto a screw 412 extending downwardly from the bottom of the beam 348 in a generally vertical direction. The position of the weight 411 can be shifted upwardly or downwardly as hereinafter described on the screen 348. The weight can then be locked in the desired position by the nut 413.

The balance weight consists of a cylindrical block 416 which is threaded on a threaded rod 417 threaded into the end of the scale beam 348 opposite the end on which the claw assembly 367 is mounted. The rod 417 is locked in position by a nut 418. The balance weight 416 can be locked in the desired position by the set screw 419 (FIGURE 13). A roller 421 of suitable material such as brass is rotatably mounted on the rod 417 between an inner nut 422 threaded on the rod and seated within a cylindrical recess 423 (see FIGURE 26) provided in the block 416. A washer 424 and a nut 426 are provided on the other side of the roller 421 and serve to hold the roller in place. A tip 427 is mounted between the washer 424 and the nut 426. The tip 427 is bent in such a manner that its outer extremity 427a lies in a generally horizontal plane in general alignment with the scale beam 348. The leading edge of this outer portion 427a is provided with a leading edge 427b which has a knife-like edge that is positioned within five-thousandths of an inch for weight grading as hereinafter described.

The roller 421 provided on each scale assembly 306 actually serves as a cam roller and travels in a cam track 430 mounted on the rear of the main framework 164. The cam track 430 is formed by a pair of spaced runners or rails 431 and 432. The upper rail 431 is formed by strap-like members and switch plates as hereinafter described. The upper rail 431 is supported by spacers 433 of various lengths (see FIGURE 11) affixed to the lower flange of the rear channel member 261 of the lower pair of channel members 261. The lower rail 432 is secured to the upper rail 431 in a predetermined spaced relationship by C-clamps 436 of various sizes. The upper and lower rails 431 and 432 are positioned so as to provide a continuous cam track 430 for the rollers 421 of the scale assemblies as the scale assemblies are moved by the endless chains 288 to which they are attached. The cam track 430 shifts in elevation as the scale beam assemblies progress through the different weighing stations as shown in the drawings, particularly FIGURE 11. The lower rail 432 from the first weighing station to the "peewee" or next to the last weighing station is inclined downwardly at a uniform angle, whereas the upper rail 431 is level in the weighing stations and is inclined downwardly between the weighing stations up to the "peewee" stations to provide track portions 430a of quarter width for weighing purposes as hereinafter described.

Each of the scale beam assemblies is provided with a pair of spring contact members 438 which are utilized during the candling operation as hereinafter described.

*Candling light assembly*

The candling light assembly 450 consists of a pair of endless chains 451 which are carried by two pairs of sprocket wheels 452 affixed to shafts 453 and 454. The shafts 453 and 454 are rotatably mounted upon the channel members 272 by pillow blocks 456. The pillow blocks, however, are constructed in a particular manner to insulate the candling light assembly 450 from the main frame 164. The pillow blocks 456 are insulated from the frame 164 by a block 457, a bushing 458 and a block 459 formed of insulating material which serve to support the pillow block 456 above the frame 164 and insulate the bolts 460 for securing the pillow blocks to the channel members 272 of the frame 164 from the channel members 272 as shown particularly in FIGURE 28.

A spur gear 461 is affixed to the shaft 453 and is driven by a spur gear 462. The spur gear 462 is affixed to a shaft 463 rotatably mounted on the frame members 272. A sprocket wheel 464 is affixed to the shaft 463. The sprocket wheel 464 is driven by an endless chain 466 which is driven by a sprocket wheel 467 mounted on the main drive shaft 181 of the transfer motion gear housing 166. A plurality of cross rods 471 are mounted between the pair of endless chains 451. The cross rods 471 actually form a part of the endless chains 451 in that they serve as a means for pivotally connecting the links 472 of the chain. The upper run of the chain 472 is supported by guides 473 which ride between the links. The guides 473 rest upon cross members 474 supported by insulating spacers 476 secured to the inturned flanges of the channel members 272 by suitable means such as bolts 477.

A plurality of candling lights 481 are carried by endless chains 451. Each candling light 481 consists of a ventilated lamp housing 482 which has a central opening 483. The lamp housing 482 is secured to a T-shaped mounting member 484 which has three rollers 486, 487 and 488 rotatably mounted on the lower side thereof. These rollers are arranged to provide a three point support. On one side, the rollers engage one of the cross rods 471 carried by the endless chains 451, and on the other side, they engage the adjacent rod 471 carried by the endless chains. The rollers 486, 487 and 488 are adapted to travel laterally of the rods so that the candling light can follow the scale assemblies during the candling operation as hereinafter described. A lamp 491 is mounted in a base 492 provided in the lamp housing 482. The outer portion of the lamp socket or base 492 is electrically connected to the lamp housing 482 and to the T-shaped member 484.

Figure 28:
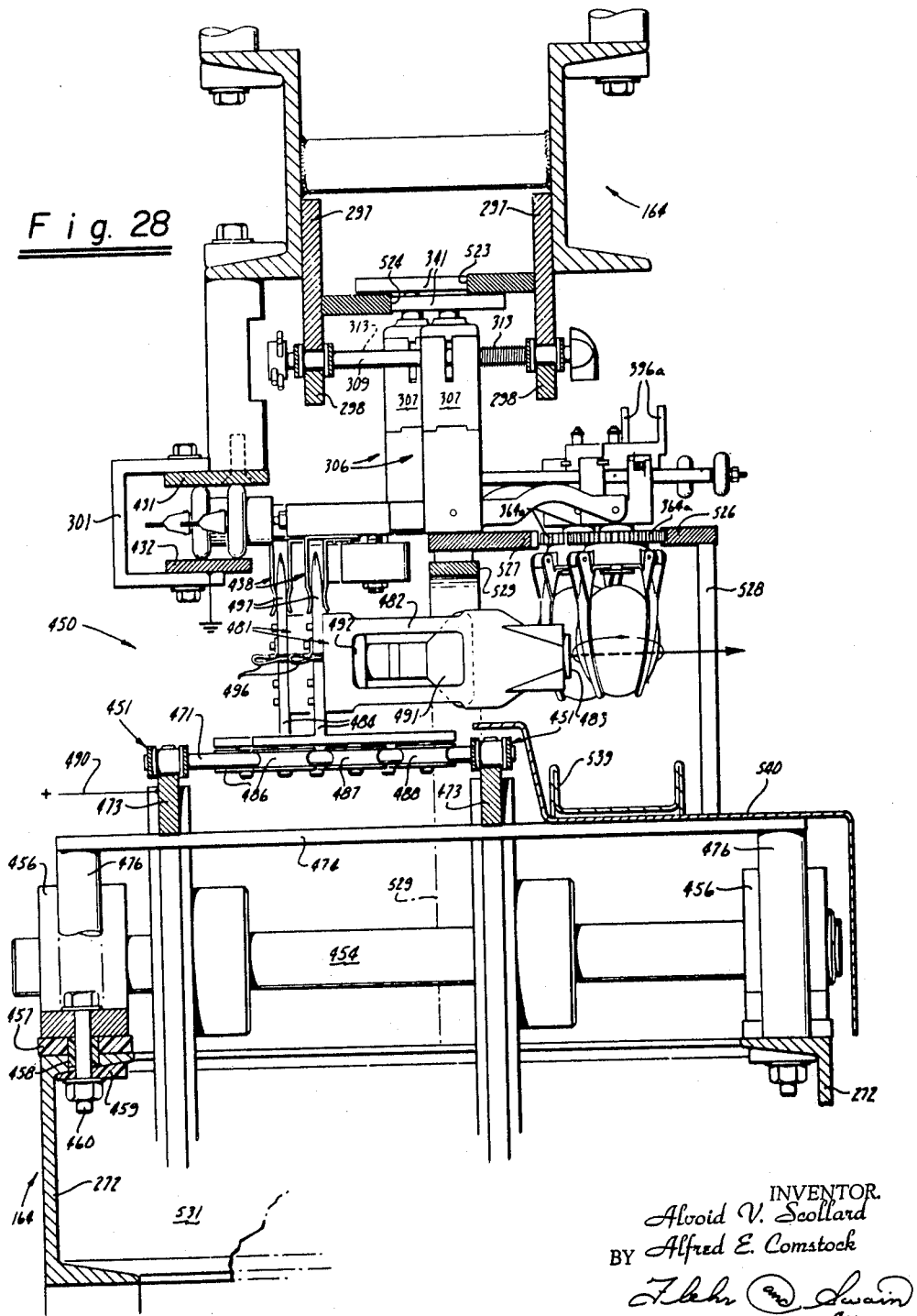
FIGURE 28 is a cross-sectional view taken along the line 28—28 of FIGURE 6 and shows the position of various parts of the machine while the eggs are in the candling station.

The circuitry is so arranged that the sprocket wheels 452, the endless chains 451, the shafts 453 and 454, the rollers 486, 487, 488, the T-shaped member 484, and the lamp housing 482 are all above ground, that is, they have one side which may be called the "hot" side of a circuit for energizing each of the lamps 491. For example, they can carry the positive side of a 24 volt D.-C. supply for the lamps connected by a conductor 490 to the D.-C. supply (see FIGURE 28). The center contact (not shown) in the base or lamp socket 492 is connected by a wire 496 to a wiper blade 497 of suitable material such as brass secured to the lamp housing 482 but insulated therefrom. These wiper blades 497 are adapted to engage the spring contact members 438 carried by the scale assemblies as shown in FIGURE 28 and serve to ground the center terminal of the lamp so that the lamp is energized during the time that the wiper blade 497 engages the spring contact members 438.

The lamp 491 can be of a type well known to those skilled in the art as being suitable for candling purposes. For example, it can have a silver reflective coating provided on the lamp to direct substantially all of the light from the lamp out through the central opening 483 in the lamp housing 482.

*Other operative assemblies*

Many safety devices are incorporated in our egg handling and grading machine to ensure that the machine will operate properly at all times.

As the scale assemblies begin to approach the lower run of the main conveyor, means 500 is provided on the upper run to ensure that each of the claw assemblies 367 is rotated so that one of the sides with the wider opening is facing the front of the machine. This means consists of a U-shaped member 501 (see FIGURE 15) mounted on the main frame 164 and which has mounted thereon a foam rubber pad 502 which extends longitudinally of the path of travel of the claw assemblies 367. The U-shaped member 501 is supported upon a pair of vertical members 503 supported on one of the upper channel members 261. The pad 502 is adapted to engage the claws 368 to cause the same to be rotated in a counter-clockwise direction as viewed in FIGURE 15 in the event they are not in a position in which one of the two wider openings or wider sides of the claw assemblies face the pad or the front of the machine. If the wide sides of the claw assemblies already face the pad 502, they will not be rotated thereby and will simply pass the pad. However, if one of the narrow sides of the claw assemblies is facing the pad, it will be rotated until one of the flat sides faces the pad so that the claw assembly no longer engages the pad.

Before the scale assemblies 367 reach the egg pickup station, they are unlatched by an unlatcher 506 affixed to one of the main frame members 261. The unlatcher is adapted to engage the latch arms 396 of the scale beam assemblies to unlatch the latching lever 377 to thereby release the depressor rod 361 in the event it has not been released previously.

Thereafter, each of the claw assemblies 367 is rotated through 90° by a two-toothed sector 508 mounted upon a bracket 509 secured to one of the channels 121 of the feeding conveyor. The claw assemblies 367 are rotated through these 90° so that one of the narrow sides is facing the incoming eggs in the feed-in conveyor. It has been found that this is the only position in which the eggs can be picked up by the claws 368 without the claws 368 striking each other, particularly if extra large or jumbo eggs are in adjacent pockets in the trays on the feed-in conveyor.

Immediately after the claw assemblies have been rotated through 90°, the depressor rods 361 are depressed by a spring member 511 secured to one of the C-clamps 301. This ensures that the claw assemblies 367 will be in a released position so that they can pass over the eggs raised into the claw assemblies in the egg pick-up station.

After the claws 368 have passed over the eggs, the claws are already to be latched into position. This is accomplished by a U-shaped latcher 512 which is affixed to the opposite sides of the in-feed conveyor and moves with the in-feed conveyor. Thus, when the eggs are raised into the claw asesmblies 367, the latcher 512 at the same time engages the rollers 384 provided on the ends of the latch levers 377 to raise the latch levers 377 and the blocks 276 carried thereby so that the ears 399 are raised over the abutments 398 of the latch arms 396 to lock the claw assemblies in egg retaining positions.

An egg booster assembly 514 is mounted on the rectangular frame 167 driven by the transfer motion gear assembly and consists of a substantially T-shaped platform 516 affixed to the frame 167 on the forward side thereof so that it is adapted to engage the claw assemblies after they have been filled with eggs. The platform 516 carries a plurality of upstanding spring members 517 which are provided with upper circular portions 517a that are adapted to engage the bottom portions of the eggs in the claw assemblies 367 as shown in FIGURES 12 and 15 to gently push the eggs upwardly into the claw assemblies to ensure that the eggs are firmly gripped within the claw assemblies before they pass into the candling station.

The cam track is provided with a portion 430b (see FIGURE 6) which raises the forward ends of the scale assemblies as the scale assemblies pass over the right-hand side of the egg feed-in conveyor 102 as shown in FIGURE 8. This prevents the conveyor 102 from striking the scale beam assemblies during its movement.

After the eggs have been picked up and after they have been nestled firmly within the claw assemblies 367 by the egg booster assembly 514, each of the scale assemblies continues to travel toward the candling station. Before reaching the candling station, each assembly engages a horizontal pin 521 (see FIGURE 17) mounted on one of the vertical spacers 434. Prior to engagement with the pin 521, the knobs 331 are all in a horizontal position and actually point in a direction opposite the direction of travel of the scale assemblies. As the scale assemblies are advanced, the pin 336 carried by the circular member 332 on each scale assembly strikes the pin 521 to cause rotation of the associated selector shaft of the scale beam assemblies in a clockwise direction as viewed from the front of the machine so that the knobs are all pointing upwardly or in a vertical direction thereafter. When the selector shafts are rotated to this position, the blocks 307 are free to travel to their extreme offset positions, or what in other words may be described as the good egg positions.

As soon as the selector shafts have been rotated, the cam wheels 341 carried by the blocks 307 of the scale assemblies engage two cam tracks 523 and 524 mounted upon the guide members 297. The cam tracks 523 and 524 are at two different elevations as shown in FIGURE 16 so that one cam track is engaged by the upper level of cam wheels and the other cam track 524 is engaged by the lower level of cam wheels 341.

As the cam wheels 341 engage the two tracks 523 and 524, the mounting blocks 307 and the scale beam assemblies supported thereon are urged in opposite directions against the force of the offset springs 313 as shown by the arrows in FIGURE 30. Every other block 307 is urged in one direction and the intervening blocks are urged in the opposite direction.

Alternate scale assemblies are urged in opposite directions because there is insufficient room in which to rotate the eggs during the candling operation with the close spacing provided between the scale assemblies. It is desired to normally provide such close spacing between the individual scale assemblies in order to keep the length of the machine down to a minimum length.

The means provided for rotating the claw assemblies containing the eggs consists of two racks 526 and 527 disposed within the candling station. The rack 526 is supported by a pair of posts 528 and the rack 527 is supported by U-shaped member 529. The posts 528 are mounted on the horizontal members 474, whereas the U-shaped member 529 is supported by horizontal members 531 connected to the channel members 272.

The two racks 526 and 527 lie in the same horizontal plane and are adapted to be engaged by the teeth 364a of the gear members 364 which form a part of the scale assemblies 367. Thus, as the scale assemblies 364 are advanced by the conveyor chains 288, the gear members will engage the racks so that the eggs in the claw assemblies engaging the rack 526 will be rotated in one direction and the eggs in the other claw assemblies engaging the rack 527 will be rotated in the opposite direction.

At the time the scale assemblies enter the candling station, they will pick up one of the travelling candling lights 481. Just before the candling lights 481 come into engagement with the scale beam assemblies, they are brought into a single line by a pair of guide members 536 mounted on a horizontal member 537 secured to the channel members 272. The guide members 536 serve to engage the wiper blades 497 of the light assemblies and serve to urge them from the right or the left toward the center position so that the candling lights 481 are in a mid-point position where they are adapted to engage the contact members 438 on the scale beam assemblies.

The candling lights 481 and the scale beam assemblies 367 move in a timed relationship so that during the time the scale beam assemblies are within the candling station 104, they carry with them a candling light 481 which can be called a travelling candling light. This makes it possible for the operator in the candling station to view the eggs under a candling light as the eggs pass through the candling station.

Figure 27:
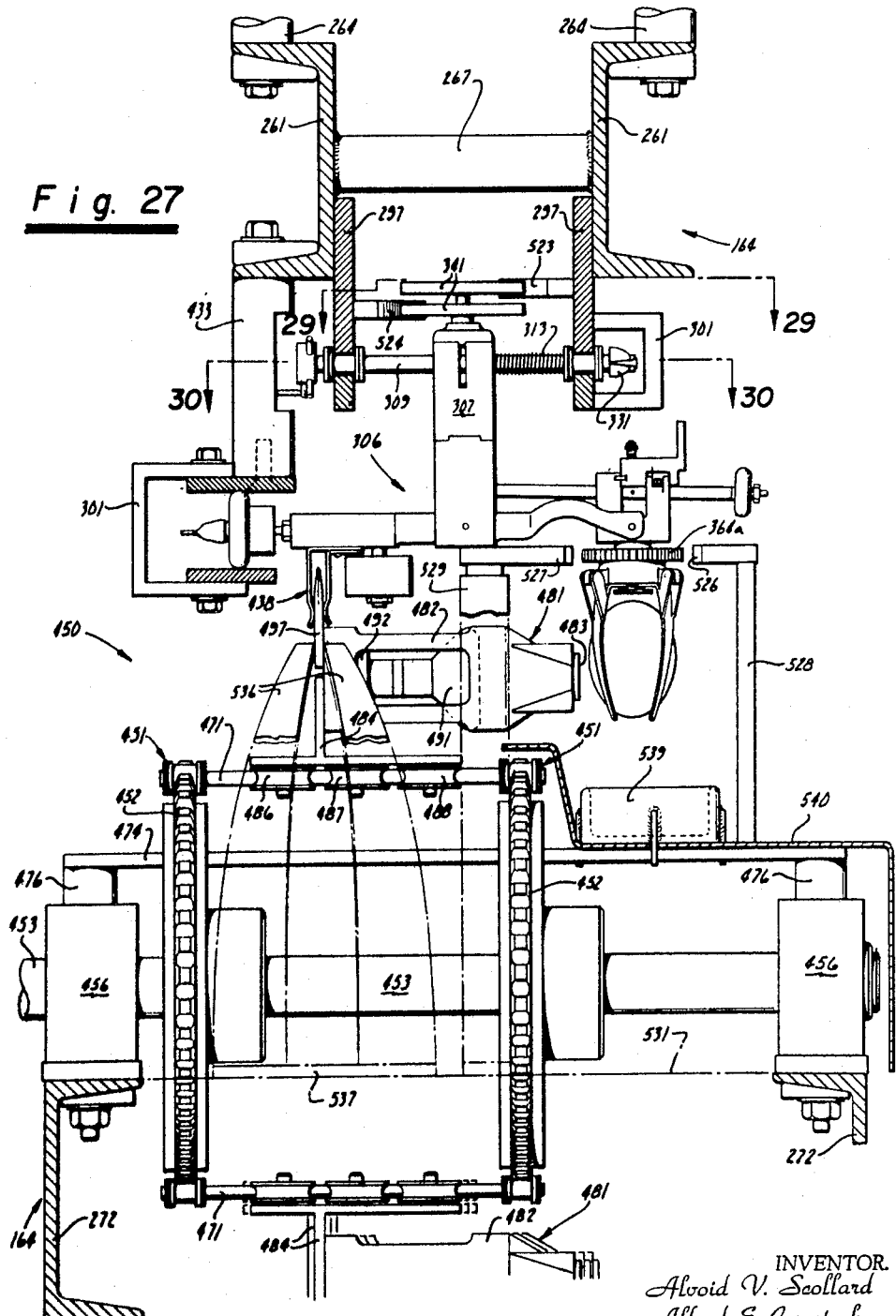
FIGURE 27 is a cross-sectional view taken along the line 27—27 of FIGURE 6 and shows the position of various parts of the machine just before the eggs enter the candling station.

A trough 539 (FIGURE 27) is mounted in the candling station and generally underlies the path of travel of the eggs through the candling station and serves to receive any eggs which may accidentally fall out of the claw assemblies during rotation of the claw assemblies with the eggs therein. A protective cover 540 underlies the trough 539 and covers certain of the moving parts of the candling light assembly 450.

The candling station 104 is provided with a relatively large canopy 541 which overlies that portion of the main conveyor utilized for the candling operation. The front of the canopy is provided with a cloth 542 of suitable color such as black which is adapted to be draped over and behind the operator in the candling station to facilitate the operator in viewing the eggs as they pass through the candling station.

The operator during the candling operation views the eggs and turns the knobs on the selector shafts to the desired positions. For all the good eggs, the knobs are left untouched. For blood eggs, the knobs are turned to face to the left. For commercial eggs, the knobs are turned so they face down; and for checked eggs, the knobs are turned so they face to the right.

Figure 35:
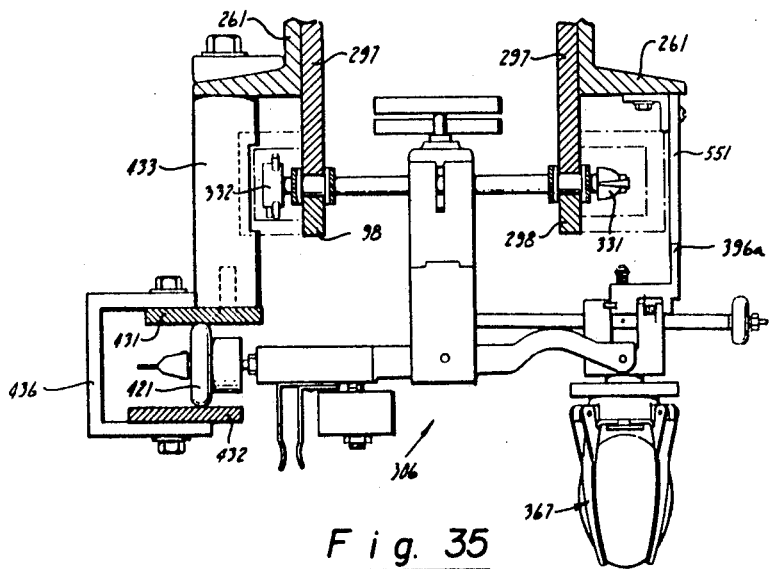
FIGURE 35 is a cross-sectional view taken along the line 35—35 of FIGURE 1 showing the position of the scale assemblies in the blood drop station.

Upon leaving the candling station, the scale or transport assemblies 367 shift to their preselected positions as determined by the candling operator as shown in FIGURES 33 and 34 and as described hereinafter in detail. The scale beam assemblies or transports can assume any of the following positions depending upon the position of the selector rod of the scale beam assembly:

(1) Full rear—good egg
(2) One half to the rear—commercial egg
(3) Central—blood egg
(4) One half forward—checked egg
(5) Full forward—good egg The blood eggs are discharged immediately after shifting of the scale assemblies. This discharge of the blood eggs, is accomplished by engagement of the latch arms 396 of all of the scale assemblies in the mid-point or central position with an unlatching bar 551 (see FIGURE 35) mounted on one of the channel members 261. As the latch arm 396 engages the unlatching member 551, the depressor rod 361 is released to permit a disk 363 carried by the depressor rod to be lowered to permit the claws 368 to swing outwardly due to the weight of the egg and to permit the eggs to drop out of the claw assembly 367 and into a blood drop chute 552 mounted on the channel member 272. The eggs as they drop into the blood chute 552 are broken and drop into a container 553.

The unlatching lever 551 is provided with an insulated portion 551a so that at the time the unlatching member 551 engages one of the latch arms 396, the portion 551a is grounded to energize a counter 556 mounted on the main framework of the machine just ahead of the candling station. This counter is a standard piece of equipment and can be of the type manufactured by Food Machinery & Chemical Corp.

Figure 37:
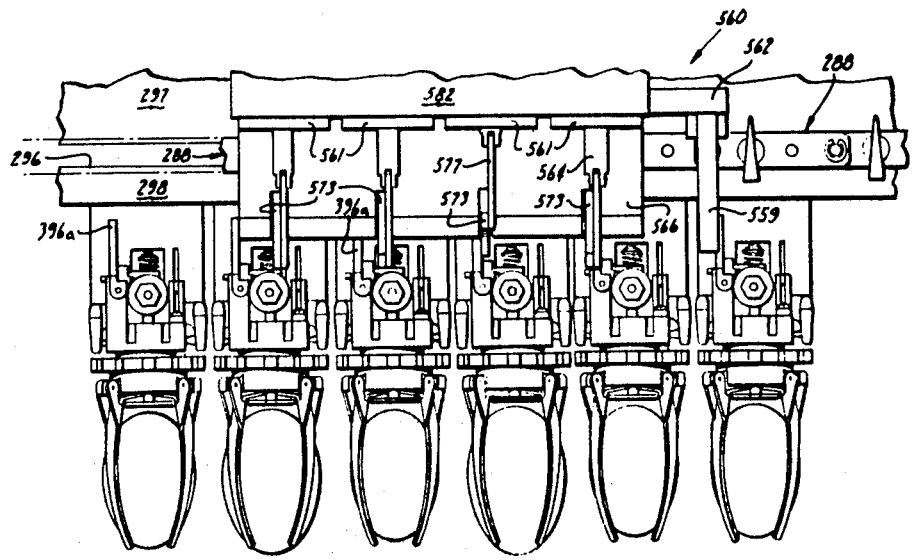
FIGURE 37 is a front elevational view looking along the line 37—37 of FIGURE 36.

Means is provided for dropping the eggs at the check drop station 107 and the commercial drop station 108. The means provided at both stations is identical, and for that reason only one will be described in detail. A portion of the means utilized in the commercial station is shown in FIGURE 37. The portion shown consists of a solenoid assembly 560. As hereinafter described, such solenoid assemblies normally consist of five solenoids 561 when used in the weighing stations. In the commercial and check stations, only four solenoids and a post 559 are utilized for reasons hereinafter described. The solenoids 561 are spaced longitudinally of the main conveyor and are mounted upon a plate 562 which is provided with openings 563 (see FIGURE 52) through which the plungers 564 of the solenoids extend downwardly. The solenoids can be identified as 501–505, respectively, as shown in the circuit diagrams in FIGURES 68 and 69. The plate 562 is affixed to a vertical plate 566 which is secured to a horizontal plate 567. The plate 567 is secured to the lower flange of one of the lower channel members 261 by suitable means such as cap screws 568. A reinforcing plate 569 is provided for securing the plate 566 to the plate 567. The solenoids 561 are also secured to the plate 566 by screws 571.

Unlatching levers 573 are provided for the solenoids 561 and are pivotally mounted in slots 574 in the plate 566 by pins 576. The front ends of the unlatching levers 573 are pivotally connected to interconnecting links 577 by pins 578 and the other ends of the interconnecting links 577 are pivotally connected to the plungers 564 of the solenoids by pins 579. The rear ends of the unlatching levers are formed with depending portions as shown, which are adapted to engage the latch arms 396 of the scale or transport assemblies. Means is provided for yieldably urging the rear ends of the unlatching levers 573 upwardly and consists of springs 581 having one end secured to the lever 573 as shown and having the other end secured to the plate 567. The set of four relays or five relays in the weighing stations is enclosed within a cover 582 mounted on the plates 562 and 567.

The unlatching lever 573 for the last solenoid or the solenoid 505 on the left-hand side, as viewed in FIGURES 37 and 55, is provided with a contact member 573a which is insulated from the lever 573 and connected to a conductor 583 that is connected to circuitry as hereinafter described. In the commercial and check stations, a post 559 is mounted on the plate 562 and takes the place of the first solenoid 501 as shown in FIGURE 37.

Figure 46:
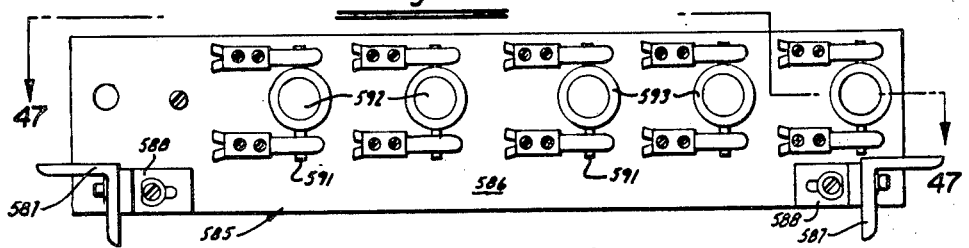
FIGURE 46 is a top plan view of the switch plate assembly utilized in the grading stations taken along the line 46—46 of FIGURE 44.
Figure 68:
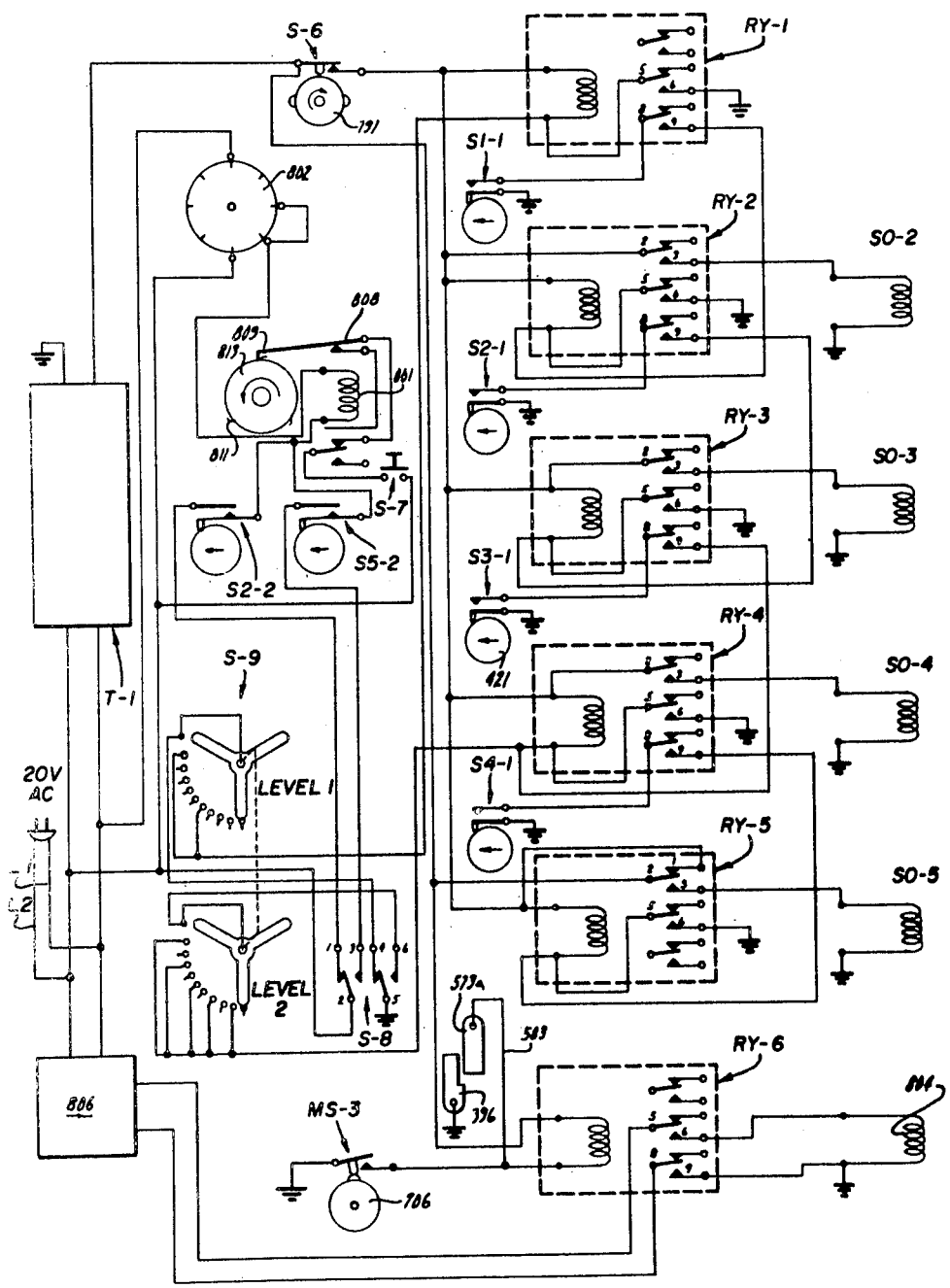
FIGURE 68 is a circuit diagram with certain parts schematically illustrated showing the operation of the commercial station.
Figure 69:
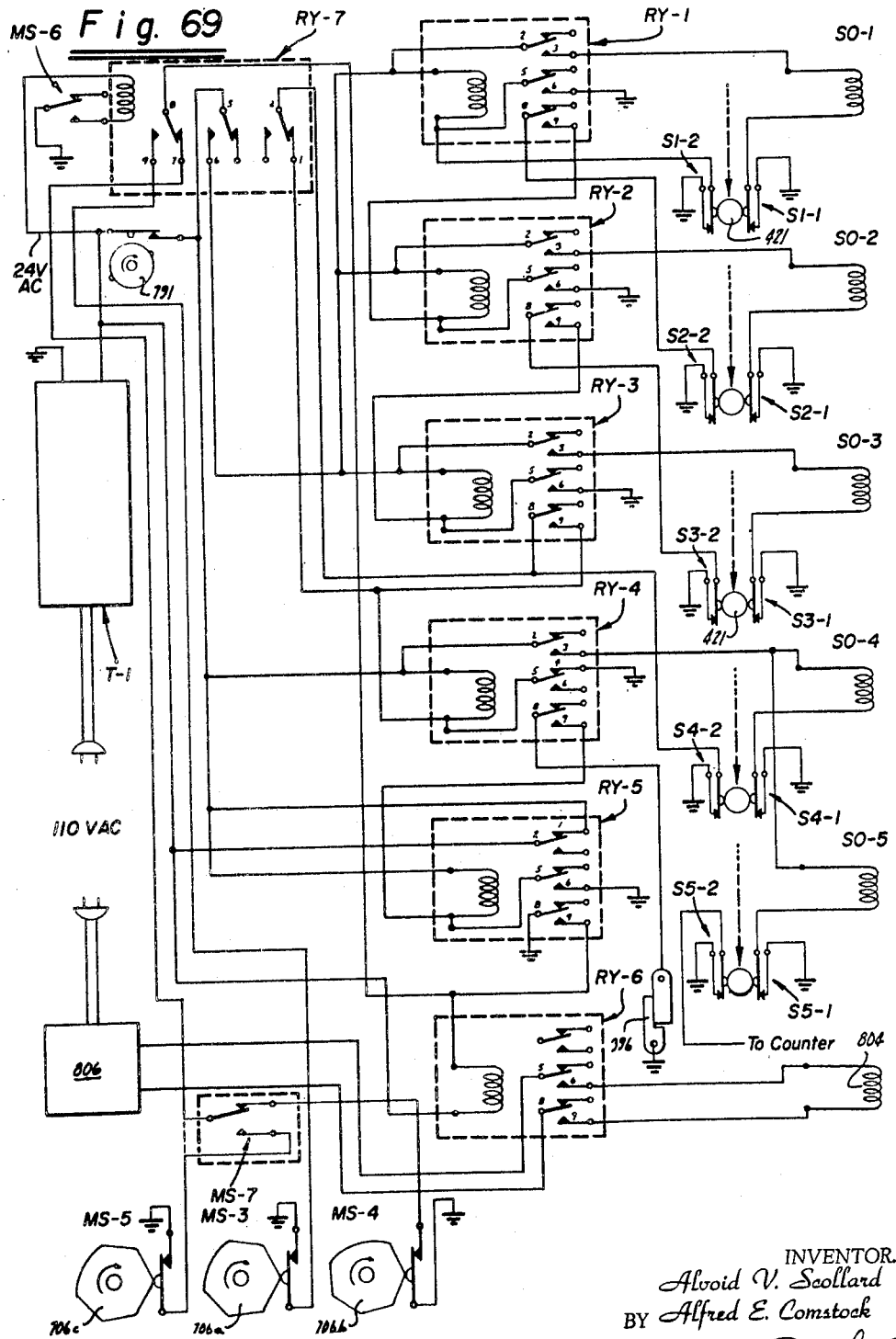
FIGURE 69 is a circuit diagram with certain parts schematically illustrated showing the operation of an egg weight grading station.

The means for dropping the eggs at the various stations also includes switch means in the form of a switch plate assembly 585 for operating the solenoid assembly 560. The switch plate assembly consists of five pairs of switches which may be identified as switches S1, S2, S3, S4 and S5 with the front contacts looking into the machine from the rear of the machine being identified as contacts S1-1 and the rear contacts being identified as S1-2, and so forth, as shown in FIGURES 46, 68 and 69. These switches are mounted on a plate 586. The plate 586 forms a part of the upper rail 431 of the cam track 430 for the rollers 421, as shown in FIGURE 44. The plate 586 is held in the proper horizontal position by vertical angles 587 secured to the outwardly turned flanges of a lower channel member 261 and by right angle brackets 588 secured to the plate 586 and to the vertical members 587.

Figure 50:
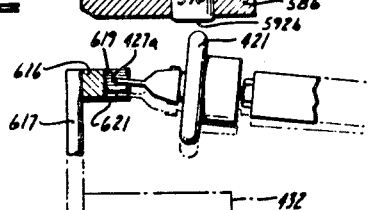
FIGURE 50 is a cross-sectional view taken along the line 50—50 of FIGURE 47.
Figure 49:
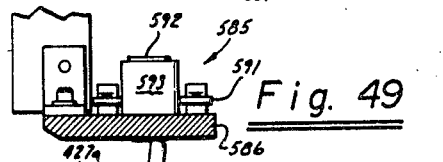
FIGURE 49 is a cross-sectional view taken along the line 49—49 of FIGURE 47.
Figure 47:
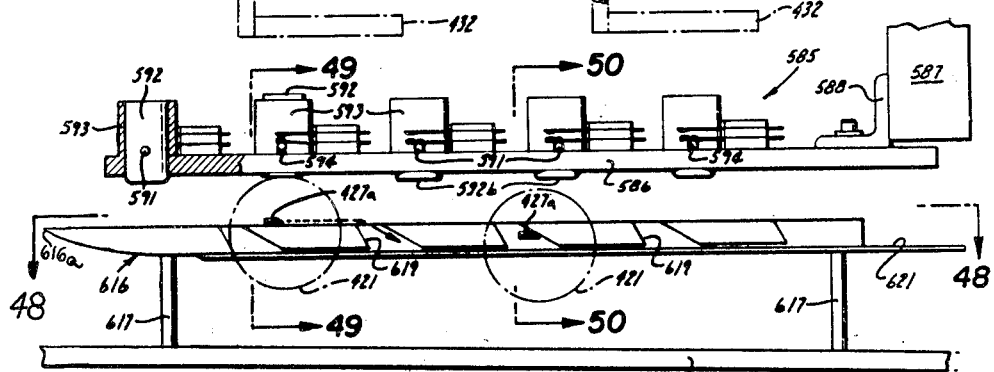
FIGURE 47 is a side elevational view of the slicer or splitter bar and the switch plate assembly taken along the line 47—47 of FIGURE 46.
Figure 48:
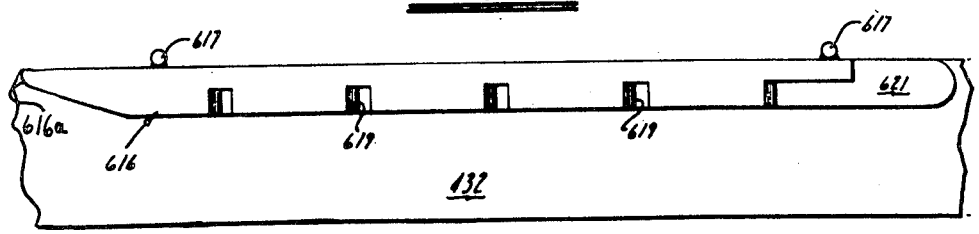
FIGURE 48 is a top plan view of the slicer bar looking along the line 48—48 of FIGURE 47.

The contacts of the switches S1-S5 are adapted to be operated by horizontally extending pins 591 of a suitable insulating material. The pins are carried by plungers 592 of suitable material such as brass which are slidably mounted in cylindrical housings 593 mounted upon the plate 586. The housings are provided with slots 594 on opposite sides thereof which accommodate the pins 591 and permit limited vertical movement of the plungers and pins. When the pins are resting against the plate 586, a portion of the plunger 592 extends below the lower surface of the plate 586, as shown particularly in FIGURES 36, 47 and 50. In the commercial and check stations, these portions are relatively narrow rectangular portions 592a as shown in FIGURE 36, whereas in the weighing stations these portions are rounded cylindrical portions 592b as shown in FIGURES 47 and 50. These portions 592a and 592b, as hereinafter described, are adapted to be engaged by the rollers 421 of the scale or transport assemblies which raise the plungers and the pins carried thereby to operate the switches S1-S5 for operating the solenoids SO-1—SO-5 as hereinafter described.

When the scale beam assemblies are passing through the commercial and check stations, the position of the rollers 421 and the scale assemblies is rather closely controlled by the cam track 430, that is, the rails 431 and 432 are positioned relatively close together so that there is no substantial vertical movement of the scale assemblies. As soon as the scale assemblies enter either the commercial or the check station, the rollers 421 come into contact with one of the plates 586 carrying the switches S1-S5 and the plungers 592. The narrow portions 592a are all in longitudinal alignment within each station and are positioned so that they will be engaged by the rollers 421 only if the scale assembly has been shifted to the position which corresponds to the position required for actuation in the station. For example, in the commercial drop station, only the scale assemblies 306 which are in the commercial egg position will have their rollers 421 engage the portions 592a of the plungers 592 as shown in FIGURE 38. Upward movements of plunger 592 cause operation of the associated switch and solenoid, as herein-after described, to cause the associated unlatching lever 573 to be lowered to engage the latch arm 396 of the scale assembly to drop the egg in the scale or transport assembly into a pocket in the egg tray immediately below. The rollers 421 of the scale or transport assemblies in any other lateral position will not affect the plungers and switches in the commercial and check stations, as shown in FIGURE 38.

The same thing will occur in the check station so that by the time the eggs have been passed through the commercial and check stations, all of the eggs of check and commercial grade have been dropped or discharged. Thereafter, the cam track 430 is inclined upwardly to facilitate weighing of the jumbo eggs first, as hereinafter described.

Figure 41:
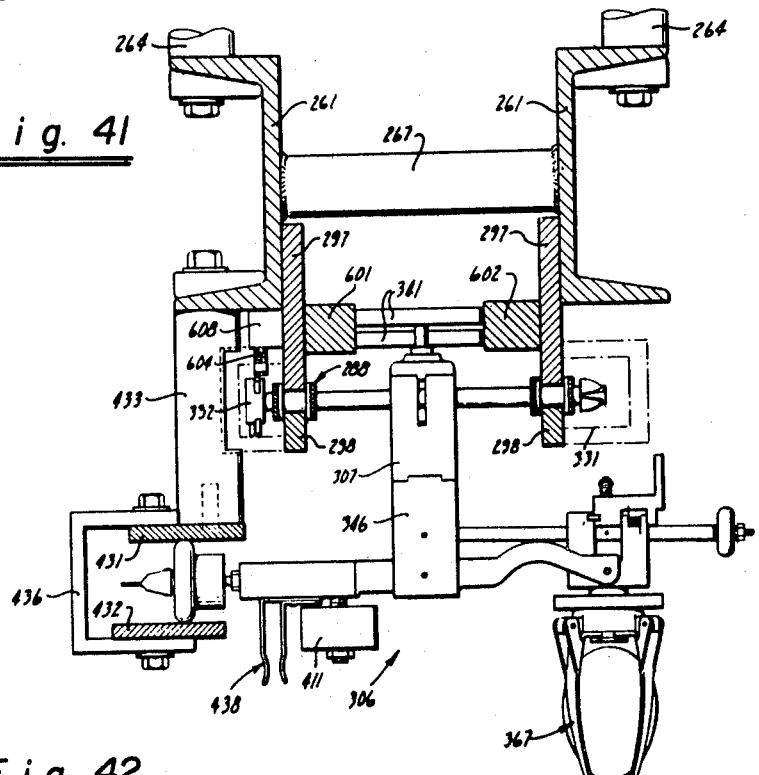
FIGURE 41 is a cross-sectional view taken along the line 41—41 of FIGURE 39.
Figure 42:
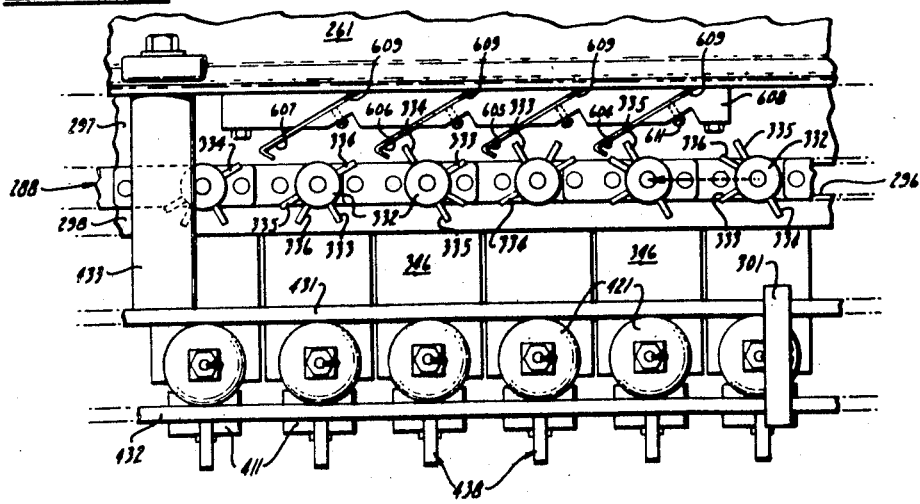
FIGURE 42 is a rear elevational view looking along the line 42—42 of FIGURE 40.
Figure 43:
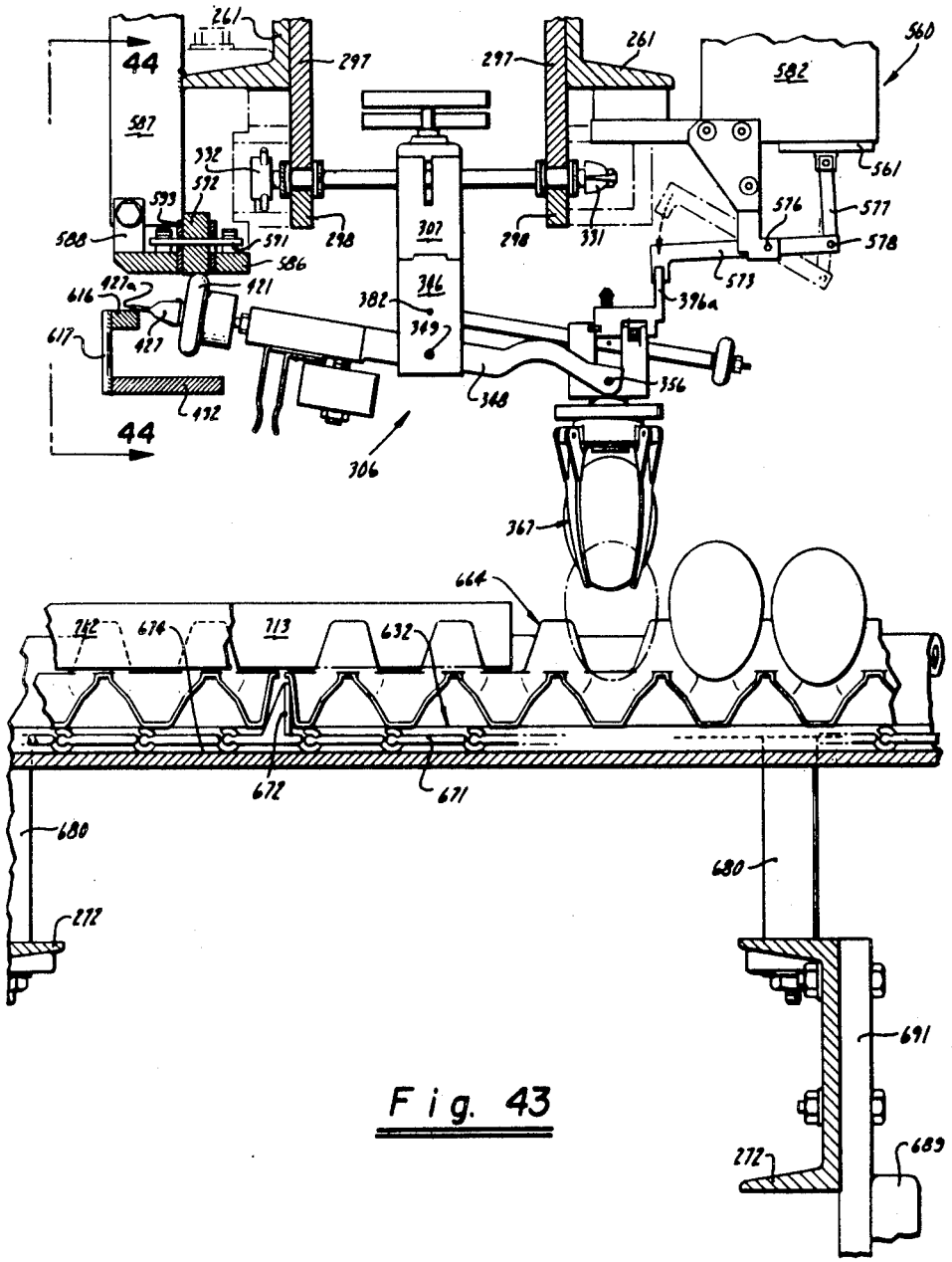
FIGURE 43 is a cross-sectional view taken along the line 43—43 of FIGURE 1 showing the operation of a scale assembly carrying an extra large egg white in the extra large section.

Upon moving out of the commercial station, the selector shafts 417 and 418 of the scale or transport assemblies are brought back to their mid-point positions by cams 601 and 602 mounted on members 297 as shown particularly in FIGURES 1 and 41. The selector shafts must be rotated because when the selector shafts are in certain positions, the mounting blocks 307 cannot be brought back to the central position. Thus, all of the selector shafts which are not in the blood position, that is, with the knobs facing to the left as viewed from the front of the machine or facing in a direction opposite the direction of travel of the lower run of the conveyor chains 288, are rotated by four latch members 604, 605, 606 and 607 mounted in a block 608 secured to the underside of the flange of one of the channels 261. The hook-like latch members 604–607 are mounted in inclined slots 609 provided in the mounting member 608 and are fastened therein by screws 611. The hook-like latch members 604 and 607 overlie the path of travel of the circular members 332 of the scale assemblies and are adapted to engage the pins 333–335 extending radially from the members 332. It will be noted from FIGURE 42 that the hook-like members will not engage any of the pins when the selector shafts are in the blood position because of the arrangement of the pins as is evident from FIGURE 42. Looking at FIGURE 42, the third circular member 332 from the left will be rotated through 90° by the latched member 606 engaging the pin 334. The third circular member 332 from the left as viewed in FIGURE 42 will be rotated through 180° to bring it to the blood position. First, it will be rotated 90° by the latch member 605 engaging the pin 333, and then another 90° by the latch member 606 engaging the pin 334. The fifth circular member 332 from the left will be rotated through 270° by the latch members. It is first rotated through 90° by the latch member 604 engaging the pin 335. Then, it will be rotated 90° by the latch member 605 engaging the pin 333 and through another 90° by the latch member 606 engaging the pin 334.

After all of the selector knobs 331 have been moved to the central or blood position, the scale or transport assemblies 367 can be readily moved to the central position by the cams 601 and 602.

*Weighing stations*

After the scale assemblies 306 have been returned to their central positions by the cams 601 and 602, the scale assemblies pass into the weighing stations. As they pass into the weighing stations, the cam track 430 for the rollers 421 is inclined upwardly, as hereinbefore described, so that the scale assemblies will be in a position to weigh the largest eggs first.

A slicer bar 616 is mounted in each of the weighing stations in general alignment with each switch plate assembly 585. The slicer bar is mounted upon a pair of posts 617 attached to the lower rail 432. The forward or leading edge 616a of the slicer bar is positioned in an exact location as hereinafter described and is more like a knife edge which is adapted to serve as a divider or slicer for the tips 427a carried by the scale assemblies.

As hereinafter described, when the egg in the scale assembly is sufficiently heavy, the tip 427a will pass above the slicer bar, whereas if the egg is too light, the tip 427a will pass below the slicer bar.

The slicer bar is provided with a plurality of downwardly inclined slots 619 spaced longitudinally of the slicer bar 616. One slot is provided for each of the plungers 592 in the switch plate assembly 585. The slots are disposed in the bar 616 so that the slot corresponding to the switch operated lies slightly beyond the plunger 592 utilized for actuating the switch. Thus, when the switch is operated and the solenoid is energized to release the egg from the claw assembly and the rear end of the scale beam assembly drops downwardly, the tip 427a will pass downwardly through the slot 619 so that the roller 421 of the scale assembly cannot thereafter actuate any of the succeeding switches on the plate 586.

As shown particularly in FIGURES 11 and 44, immediately before each of the slicer bars, the cam track 430 widens slightly to provide a portion 430a of the cam track which is substantially wider than the diameter of the rollers 421 so as to permit the balance beam of the scale assembly to swing slightly back and forth within the cam track to find a balance position. Thereafter, the scale assembly passes into the slicer bar 616 which determines whether the egg in the scale beam assembly is within the weight classification of the weighing station being entered.

It will be noted that the switch plate assemblies 585 and the associated splitter bar 616 in the weighing stations are positioned on progressively lower levels as can be seen from FIGURE 11. This is necessary because the eggs which are continued to be carried by the scale assemblies are progressively lighter eggs as the heavier eggs are dumped or discharged in the preceding weighing stations.

*Main conveyors and stub conveyors*

As explained previously, main conveyor assemblies 117 are provided or each of the our major egg weighing stations 110–113 which normally receive the major quantity of the eggs which are graded by the egg grader. As also explained previously, these four stations are for the extra large, large, medium and small eggs. Stub conveyors 116 are provided for the check, commercial, "jumbo," and "peewee" stations. Both types of conveyors are used as empty container feed-in conveyors and as filled container removal conveyors.

Each of the main conveyor assemblies 117 is comprised of three sections 631, 632 and 633 with each section being in the form of a U-shaped trough. The sections 631 and 633 are parallel with respect to each other and extend at right angles to the section 632 which is mounted between the claw assemblies 367 in the weighing station and supported upon the channel members 272.

The outer ends of the sections 631 and 633 are supported by a pedestal-like mount 634 which has mounted thereon a pair of side plates 636 affixed to opposite sides of the associated section 631 or 633 by cap screws 637. A collar 639 is mounted on the pedestal 634 and has mounted thereon a base 641. A gear motor 642 is mounted on the base and is provided with an output shaft 643 which drives a sprocket wheel 644. The sprocket 644 drives a chain 646 which drives a sprocket wheel 647. The sprocket wheel 647 is affixed to a shaft 648 rotatably mounted in brackets 649 secured to the sides of the conveyor section. A roller 651 of suitable material such as wood is affixed to the shaft 648 and is driven by the shaft.

An endless belt 652 of suitable material, such as plastic, is driven by the roller 651 and has its upper run passing over the top of the conveyor section 631 as shown in FIGURE 53. The belt 652 travels over another roller 653 rotatably mounted at the other end of the section 631.

Means is provided for tightening the belt 652 and consists of a roller 654 rotatably mounted between the support plates 636 and over which the lower run of the belt 652 passes. It also includes another roller 656 which overlies the lower run of the belt 652 and which is carried by a pair of pivotally mounted members 657. The members 657 and the roller 656 are adapted to be held in a belt tightening arrangement with respect to the belt 652 by a threaded rod 658 affixed to one of the members 657 and extending through a slot 659 in plate 636. A nut 661 is threaded on the threaded rod 658 and is adapted to clamp the member 657 and the roller 656 carried in a predetermined position with respect to the plate 636 to obtain the desired tension on the belt.

The in-feed section 631 of the main conveyor 117 is normally supplied with cartons or containers of a desired type by a suitable machine such as a conventional carton folding machine (not shown).

As hereinafter explained, the main conveyor 117 has been arranged so that it can accommodate three different types of egg containers. These three different types of egg containers are well known those those skilled in the art and are shown in FIGURES 62, 63 and 64. They consist of the molded tray 664 which is provided with receptacles for 30 eggs with 6 eggs in a row in one direction and 5 eggs in a row in the other direction. The other containers are two types of cartons which are also normally utilized in the egg industry. They consist of the molded carton 666 which is commonly called the "Case Ace" and the folded carton 667 which is commonly called the "Tri-Strut."

The conveyor belt 652 is adapted to supply any one of of these three different types of egg containers to the intermedite sections 632 of the conveyor.

Means is provided for advancing the egg containers in the second section 632 of the conveyor assembly 117 as they are delivered by the first section 631. It consists of an endless conveyor chain 671 which is provided with upstanding pusher members 672. The chain 671 rides in a longitudinal groove 674 provided in the bottom wall of the conveyor section 632 adjacent the left-hand side thereof as viewed in FIGURE 59. The chain 671 is driven by a sprocket wheel 676 which is affixed to a shaft 677. The shaft 677 is rotatably mounted in bearing assemblies 678 supported by members 679 affixed to the side walls of the conveyor section 632. The conveyor section 632 is supported upon the channel members 272 by support posts 680. The other end of the chain 671 passes over a sprocket wheel 681 fixed to a shaft 682 rotatably mounted on the section 632 (FIGURES 57 and 59).

Another sprocket wheel 683 is affixed to the shaft 677 and is utilized for driving the same. The sprocket 683 is driven by an endless chain 684. The chain 684 is driven by a sprocket 686. The sprocket 686 is mounted on a hollow tube 687 which is rotatably mounted on a main machine shaft 688. The main machine shaft 688 extends longitudinally of the main frame and is rotatably mounted in pillow blocks 689 secured to depending members 691 mounted on the channel member 272. A sprocket 693 is mounted on the end of the shaft 688 and is driven by an endless chain 694. The chain 694 is driven by a sprocket 696. The sprocket 696 is affixed to a shaft 697 which is coupled to the output shaft 237 from the transfer motion gear mechanism by a coupling 698.

The tubular member 687 is secured to one part 701 of a magnetic clutch 702 which is affixed to the channel member 272 by a bracket 703. The operation of the magnetic clutch 702 is such that when the clutch coil 804 is energized, the sprocket wheel 686 is rotated with the continuously rotating shaft 688 and stops rotating when the magnetic clutch 702 is de-energized. The magnetic clutch 702 is adapted to be energized at predetermined intervals as determined by cam member 706 mounted on the shaft 67. The cam member 706 is provided with three separate cam wheel portions 706a, 706b and 706c.

The cam wheel portions 706a, 706b and 706c are adapted to be engaged by three separate microswitches MS-3, MS-4 and MS-5, respectively, which are supported by a post 707 secured to the bottom of the conveyor section 632. The microswitches MS-3, MS-4 and MS-5 are provided for shutting off the conveyor drive for the egg containers so that they are stopped in a predetermined position below the scale assemblies to permit the eggs from the scale assemblies to be dropped into the proper pockets in the cartons or trays.

Means is provided in the second conveyor section 632 for ensuring the proper advance of the cartons or trays as they are delivered to section 632 by the continuously advancing belt 652. This means includes a pair of guide bars 712 and 713 which are mounted on opposite sides of the second conveyor section 632. They are adapted to overlie the trays to hold down the trays on the second conveyor section 632 so that they will be advanced by the pusher members 672. These guide members 712 and 713 also permit use of trays which have been slightly bent or are deformed.

A microswitch MS-6 has been mounted on the side of the conveyor section 632 and is provided with an operating arm 716 which is adapted to be operated by a tray as a tray passes beneath the same to select the proper microswitch of the microswitches MS-3, MS-4 and MS-5 operated by the cam member 706.

A pair of angle guide members 717 and 718 are mounted on the bottom wall of the conveyor section 632 and serve as guides for cartons of the molded and folded type. The guide member 717, as shown in FIGURE 53, extends in front of the belt 652 so that when cartons are supplied by the belt 652, the cartons will be stopped by the guide. The cartons when stopped in this manner will overlie the chain 671 so that the pusher members 672 can engage the cartons and advance the cartons. These same guide members 717 and 718 are used for guiding the molded or folded cartons. It will be noted that guide member 718 does not extend into the first conveyor section 631 so it does not interfere with the delivery of trays. The guide member 717 is so positioned that the edge of the tray can touch the side wall of the second conveyor section before the pocket portion of the tray touches the guide member 717.

A rod 721 overlies the conveyor section 632 and is provided for bending the lids of the folded cartons downwardly so that they can pass underneath the claw assemblies 367 during the filling operation. This rod 721 has one end secured to one side of the conveyor section 631 and has the other end affixed to one side of the conveyor section 632. The rod, as shown particularly in FIGURES 56 and 59, inclines downwardly and diagonally of the second conveyor section 632 so that as the carton is advanced up the conveyor section 632, its lid is bent down to the same level as the main body of the carton 667. An additional guide member 722 mounted on conveyor section 632 is provided for holding the main body of the carton down during the time the lid is urged downwardly by the rod 721 to prevent the carton from being tipped out from between the guide members 717 and 718.

A microswitch MS-7 is mounted on the rod 721 and is provided with an operating arm 724 which is adapted to engage the lid of the folded cartons. This microswitch MS-6 is utilized for selecting the proper microswitch MS-4 or MS-5 so that the cartons will be advanced in the proper manner. The spacing between the pockets in the molded carton is slightly different from that of the folded carton and, therefore, such sensing means must be provided. The microswitch MS-6 is particularly important in that it is utilized for operating a relay, hereinafter described, which determines whether five eggs will be dropped in a row or whether two eggs will be dropped in a row. The trays are loaded five eggs in a row, whereas the cartons are loaded two eggs in a row.

Figure 60:
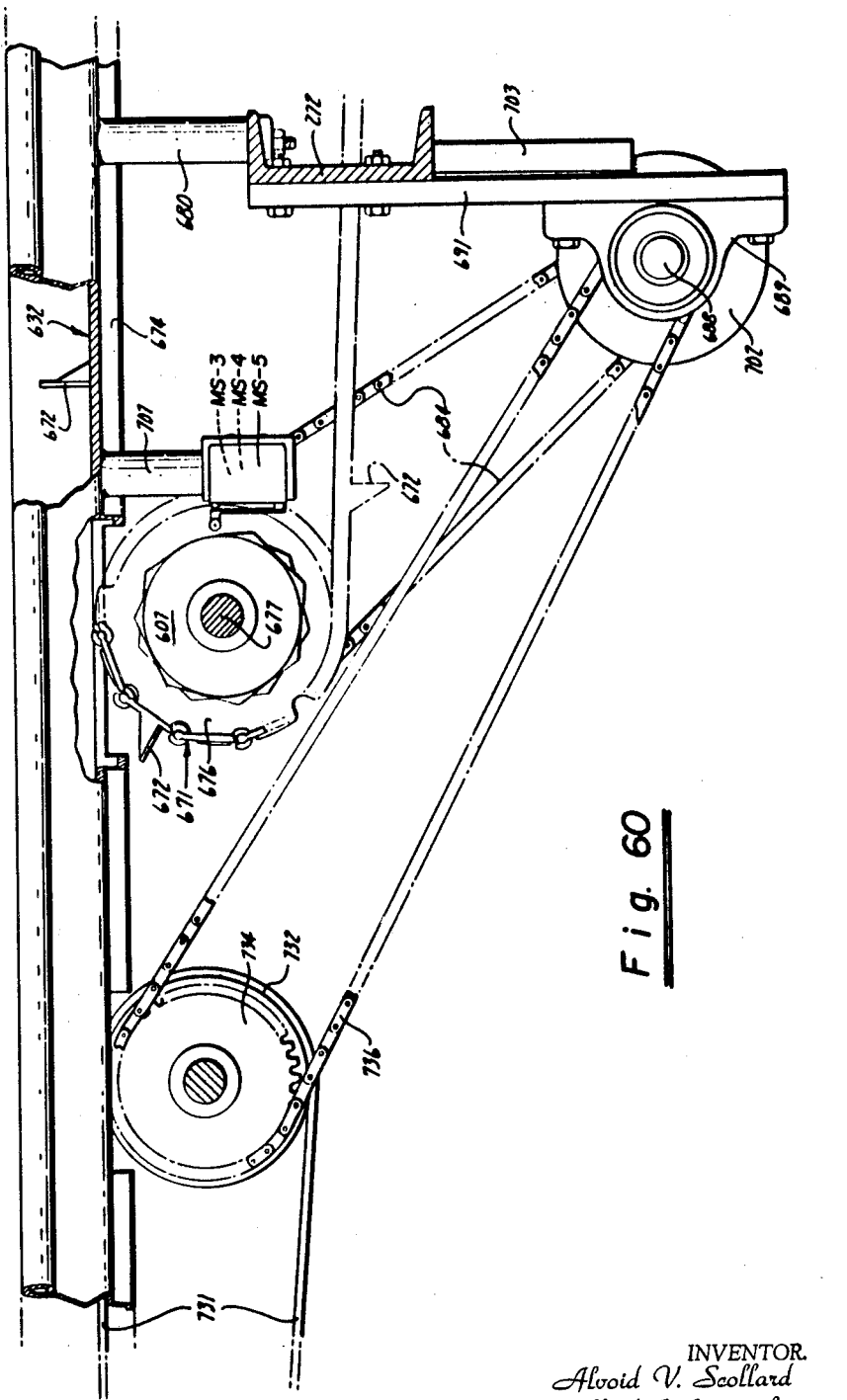
FIGURE 60 is a side elevational view looking along the line 59—59 of FIGURE 55.
Figures 65, 66:
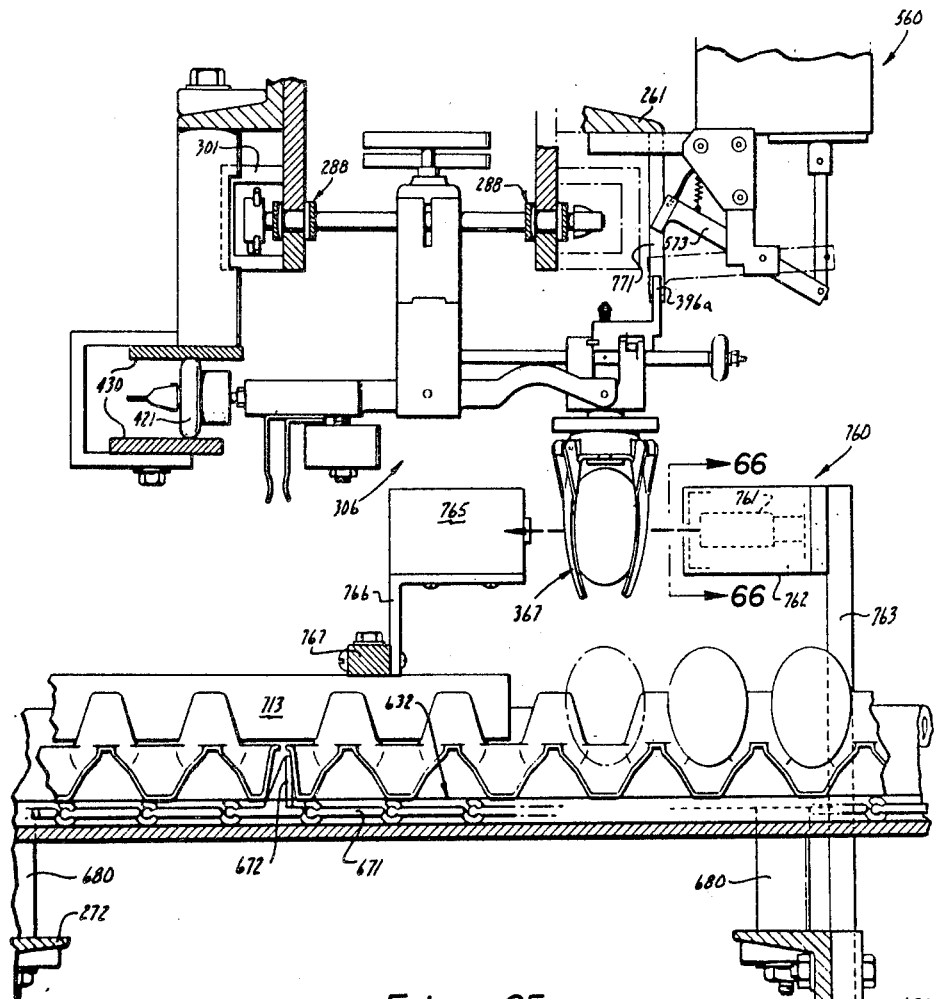
FIGURE 65 is a cross-sectional view taken along the line 65—65 of FIGURE 1 showing the "peewee" station.
FIGURE 66 is a view of the long housing in the "peewee" station looking along the line 66—66 of FIGURE 65.

After the cartons or trays have been filled with eggs, they are advanced onto a continuously moving belt 731 mounted in the forward portion of the conveyor section 632. The belt 731 is carried by rollers 732 and 733 rotatably mounted on the conveyor section 732. The roller 732 is driven by a sprocket wheel 734 driven by an endless chain 736. The chain 736 is driven by a sprocket 737 affixed to the shaft 688 (see FIGURES 60 and 61).

The belt 731 delivers the cartons or trays to the third conveyor section 633 which is also provided with a continuously moving belt 741 mounted upon rollers 742 and 743. The roller 743 is driven by a drive mechanism (not shown), as hereinafter described, which is identical to the drive mechanism utilized for driving the roller 651 on the first conveyor section 631. The outer or discharge end of the third conveyor section 633 is also supported by a pedestal-type mount of the same type utilized for supporting the incoming section 631 of the conveyor.

The main conveyor 117 which is shown for the "extra large" weighing station is substantially identical to the other conveyor assemblies 117 utilized in the "small," "medium" and "large" weighing stations.

The stud conveyors 116 which are utilized in the check and commercial stations and in the "jumbo" and "peewee" stations are substantially similar to the middle or second section 632 of the main conveyor assemblies 117. The stud conveyor 116 for the "jumbo" weighing station is shown in FIGURE 56. The other stub conveyors are substantially identical. As can be seen from FIGURE 56, the stub conveyor 116 differs from the second section 632 of the main conveyor 117 in that the lid holding down rod 721 and the hold-down bar 722 is omitted. Also, these conveyors are not provided with the guide members 717 and 718 because it is only intended that these stub conveyors carry the standard trays 664. However, it is readily apparent that, if desired, the stub conveyor 116 can be readily adapted for the use of cartons by some very simple additions.

The stub conveyors 116 are driven in the same manner that the middle or second sections 632 of the conveyor assemblies 117 are driven. However, in view of the fact that only one type of container will be used with these stub conveyors, it is only necessary that one cam wheel and one microswitch be provided.

However, it should be pointed out that the cam member 706 for the jumbo station is provided with cam surfaces so that only four jumbo eggs are dropped in a row rather than five eggs before the tray is advanced to another row. This is necessary because a special four-to-a-row tray is required for jumbo eggs as shown in FIGURE 74.

*Other operating parts*

A unique problem is posed by the "peewee" station because it is impossible for the scale assemblies 306 to determine whether there is a peewee egg in the claw assembly 367 or no egg in the claw assembly. Thus, in effect, the scale assemblies are unable to weigh any egg which is smaller than the small egg. It is not particularly desirable to weigh the peewee eggs since the peewees are normally sold for commercial use and are purchased by their total weight rather than the number of eggs. Means must, however, be provided for determining whether an egg is present in the claw assemblies 367 as they pass through the peewee station so that the trays in the stub conveyor 116 for the peewee station will not be advanced with empty pockets in them.

Figure 70:
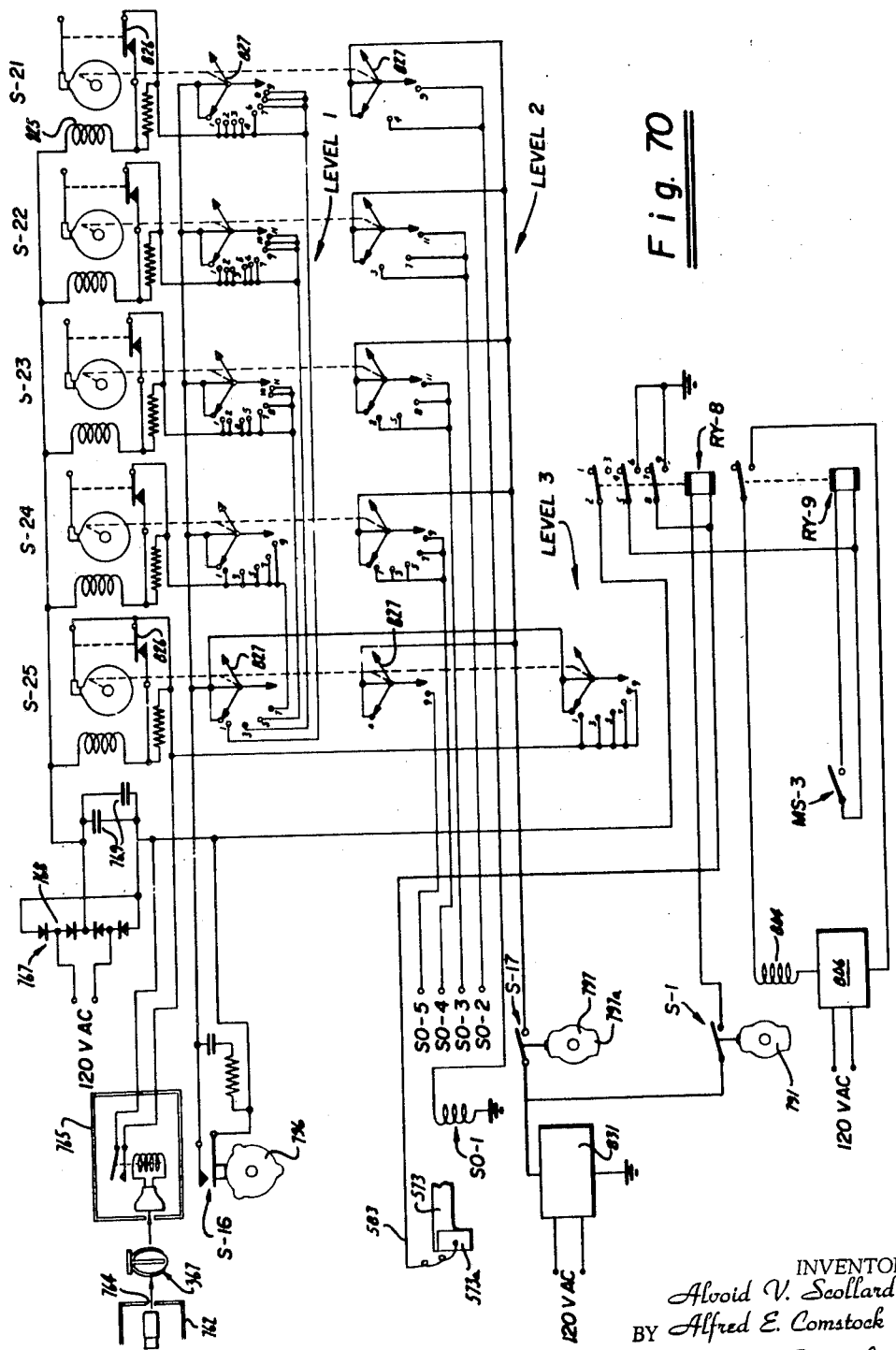
FIGURE 70 is a circuit diagram with certain parts schematically illustrated showing the operation of the "peewee" station.

Such means consists of photoelectric means 760 in the form of a lamp 761 which is mounted in a housing 762 carried by a support member 763 on the channel member 272. The housing 762 is provided with a long narrow slot 764 so that a relatively wide beam of light will be allowed to pass from the lamp 761. The photoelectric means includes a photoelectric relay 765 of a conventional type which is mounted upon a support member 766. The support member 766 is supported by another member 767 attached to the guide members 712 and 713. The lamp 761 and photoelectric relay 765 are mounted between the small and peewee stations in a line through which each of the claw assemblies 367 must pass. The photoelectric relay determines whether or not an egg is present in the claw assembly. Since the light beam from the lamp 761 is relatively wide with respect to the width of one of the claws 368 of the claw assembly, it is possible for the photoelectric cell to readily distinguish between an empty claw assembly and a full claw assembly. The photoelectric relay 765 is connected to circuitry shown in FIGURE 70 mounted in a control box 766 mounted on the stand 252. An unlatching member 771 is mounted on the main frame 161 and is provided for the purpose of unlatching any scale assemblies which for any reason may have remained unlatched.

A large control box 781 is mounted in the stand 252. This control box 781 contains the circuitry for the six weighing stations and the commercial and check stations. Additional circuitry for the commercial and check stations is contained in a box 782 mounted on the main frame 164. A large transformer T–1 for transforming the input voltage of 115 volts A.-C. to 24 volts A.-C. is utilized in the control circuitry and is mounted within the control box 781. One row 783 of six relays each identified as RY1–RY6 is provided for each of the six weighing stations and the two commercial and check stations.

A cam shaft 786 is rotatably mounted in the control box 781 and is driven by the main machine shaft 688 utilized for driving the conveyors. It is driven by an endless chain 787 which is driven by a sprocket 788 on the shaft 688. The chain 787 drives a sprocket 789 affixed to the shaft 786. The chain drive provides a 3 to 2 reduction in speed for the cam shaft 786. A plurality of cancelling cams 791 are mounted on the shaft 786. One of the cams 791 is provided for each of the six weighing stations and the two commercial check stations. A switch S6 is adapted to be operated by each of the cams. A pair of additional cams 796 and 797 are mounted on the cam shaft 786 for the "peewee" station and can be termed the pulse cam and the solenoid duration cam. These cams operate switches S16 and S17, respectively.

*Operation of the egg handling and grading machine*

The operation of our egg handling and grading machine is described in detail in copending application Serial No. 89,275, filed February 14, 1961, of which this is a division.

*Adjustable egg weight classifying means*

In FIGURES 71–76, we have shown adjustable egg weight classifying means suitable for use in our egg handling and grading apparatus which is adjustable while the egg handling and grading apparatus is operating. With the egg weight classifying means hereinbefore described, it was necessary to stop the operation of the machine before any adjustments could be made in the positioning of the switch plate assembly 585 and the slicer or splitter bar assembly 616.

The adjustable egg weight classifying means 900, as shown in FIGURES 71–76, consists of an elongate horizontal bar 901 which is affixed to the lower channel 261 of the main framework. As shown in the drawings, the bar 901 is fastened to spacers 902 by cap screws 903. The spacers 902 are secured to the channels 261 by cap screws 904. The bar 901 is provided with slots 906 which permits adjustment longitudinally of the main conveyor so that the egg weight classifying means 900 can be properly positioned.

An arcuate member 907 is affixed to each end of the bar 901 by suitable means such as cap screws 908. Each of the arcuate members 907 is provided with a portion 907a which extends outwardly away from the main conveyor assembly 101 and a portion 907b which extends longitudinally of the main conveyor assembly 101 and at right angles to portion 907a. Portion 907a, therefore, serves as a reinforcing web for the member 907.

Three rollers 911, 912 and 913 engage the portion 907a on each of the arcuate members 907. Each act of three rollers is mounted upon a bracket 916 by bolts 917 which are provided with a spacer 918. Two of the rollers, rollers 911 and 912, are disposed on one side of the portion 907b and ride in a groove 914 provided therein. The grooves 914 define an arcuate path for controlling the movement of the rollers 911 and 912 in a generally vertical direction. The other roller of the three rollers, roller 913, serves as a retaining roller and is disposed on the other side of the portion 907b and is so mounted that the rollers 911 and 912 are maintained in continuous engagement with the groove 914.

A rod 921 is mounted between the brackets 916 and has its ends affixed to the brackets. The rod extends longitudinally of the conveyors at right angles to the brackets. A splitter bar assembly 922 which includes a splitter bar 923 substantially identical to the splitter bar 616 is mounted between the brackets 916 parallel to the rod 921 and extends longitudinally of the conveyor. The splitter bar 923 is provided with a knife-like forward edge 923a and with down slots 924 in the same manner as the splitter bar 616. A reinforcing bar 926 is mounted between brackets 916 and is spaced below the splitter bar 923 a predetermined distance by spacers 927. A strap 928 is secured to the lower side of the splitter bar 923 by a screw 929 and rests upon the reinforcing bar 926.

A switch plate assembly 931 substantially identical to the switch plate assembly 585 is affixed between the brackets 916 parallel to and below the rod 921 and parallel to and above the splitter bar 923. This switch plate assembly 931 like switch plate assembly 585 includes a switch plate 932 in which are mounted plungers 933. The plungers 933 are adapted to be engaged by the rollers 421 of the scale assemblies 306 to operate the switches on the switch plate 932 in the same manner that the switch plate assemblies 585 are operated. Means is provided for maintaining a predetermined spacing between the switch plate assembly 931 and the splitter bar assembly 922 and consists of spacers 936.

Means is also provided for causing the entire assembly carried between the brackets 916 including the splitter bar assembly 922 and the switch plate assembly 931 to ride up and down on the arcuate tracks 914 provided on the arcuate members 907 and consists of a shaft 941 which is threaded into the rod 921 and extends at right angles thereto. The shaft 941 is rotatably mounted in a U-shaped support member 942. The U-shaped support member 942 is mounted between a pair of spaced blocks 943 secured to the bar 901 by cap screws 944. The U-shaped member 942 is swingably or pivotally mounted between the blocks 943 by a shaft 946 which is rotatably mounted in the blocks 943 and in the end portions of the U-shaped member 942. A bevel gear 947 is affixed to the shaft 941 and is driven by a bevel gear 948 affixed to the shaft 946. The shaft 946 is connected to a universal joint 949. The universal joint is connected to an extension shaft 951 extending in an upwardly inclined direction toward the end of the machine. The shaft 951 is rotatably mounted in a plate 952 supported upon the framework of the machine. A knob 953 is fixed to the end of the shaft 951 and is used for manually rotating the extension shaft 951 and thereby raising and lowering the assembly carried on the brackets 916 by the threading and unthreading of the shaft 941 into and out of the rod 921.

Figure 71:
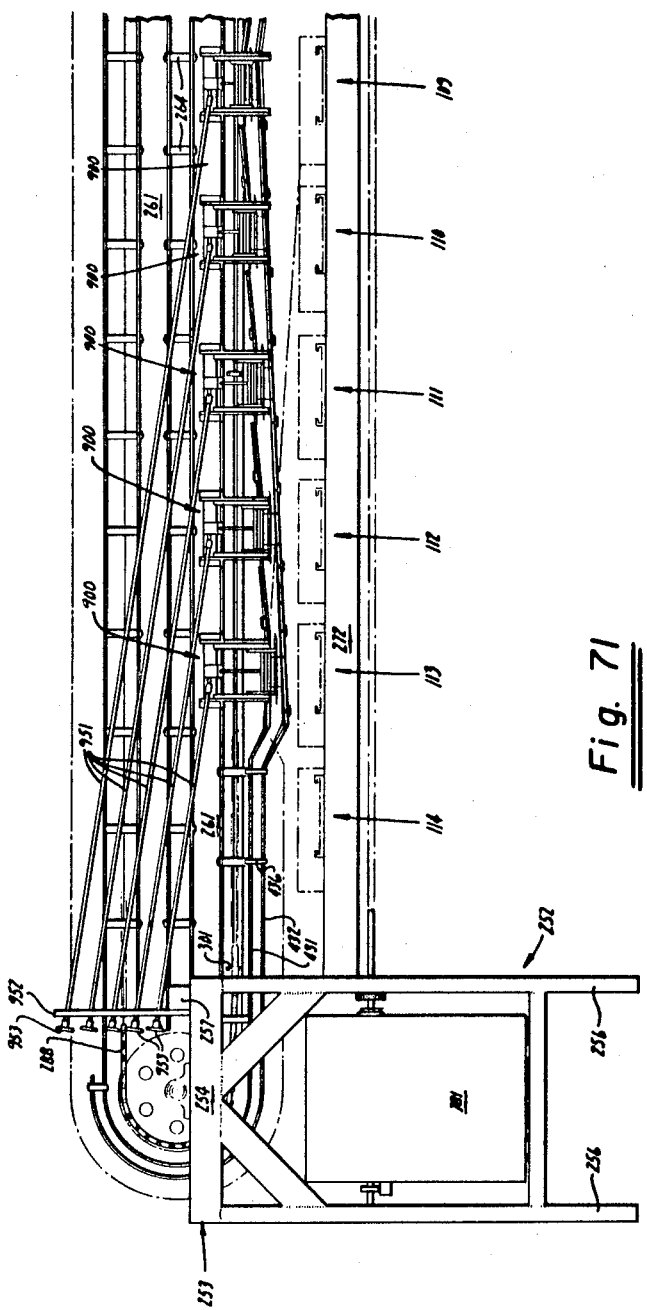
FIGURE 71 is a rear elevational view similar to FIGURE 11 showing the use of adjustable weight classifying means.
Figure 72:
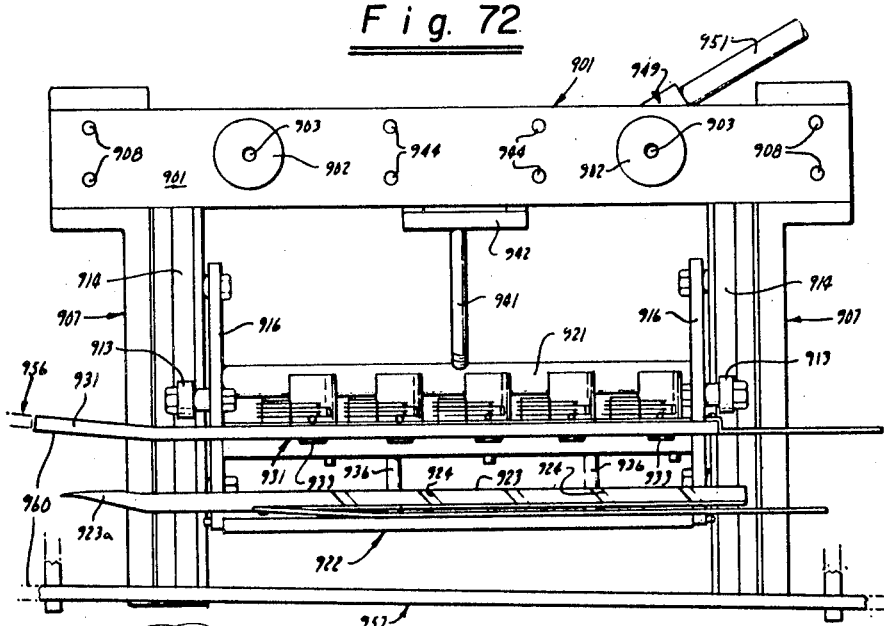
FIGURE 72 is a front elevational view of one of the grading stations taken along the line 72—72 of FIGURE 74 showing in detail the adjustable means of FIGURE 67.
Figure 73:
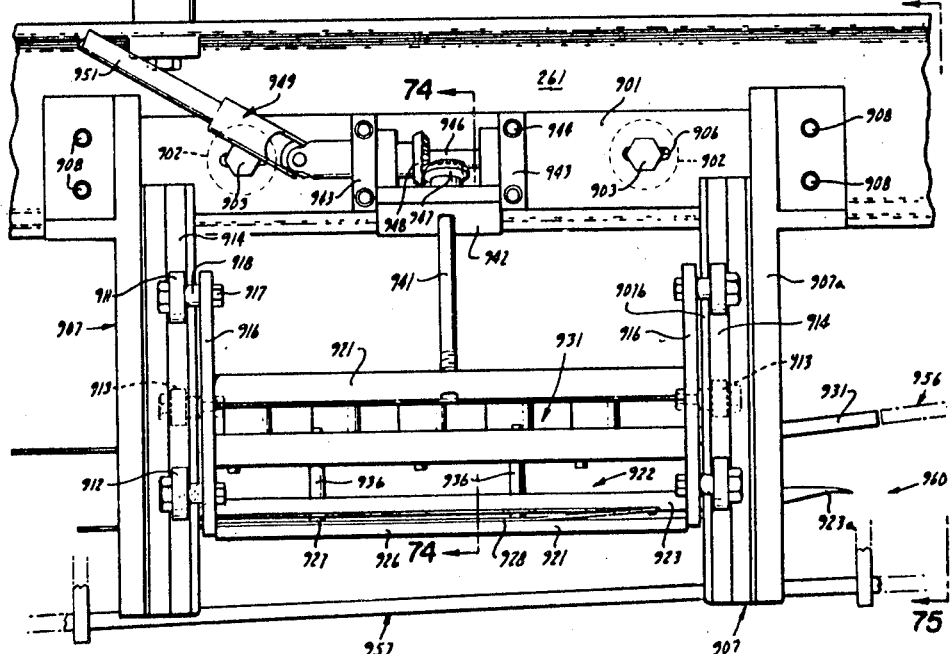
FIGURE 73 is a rear elevational view looking along the line 73—73 of FIGURE 75.

As can be seen from FIGURE 71, one of the adjustable egg classifying means is provided at each of the weighing stations. As can be seen from these drawings in FIG- URES 71–76, each of the egg classifying means is arranged so that the switch plates 931 form a part of the upper rail or runner 956. Separate members are provided as a part of the adjustable egg weight classifying means to form the lower runner or rail 957 to form the cam track 960 for the rollers 421 of the scale assemblies 306.

The upper and lower runners 956 and 957 forming the cam track 960 must be made of a material that will accommodate a slight bending of the same as the splitter bar assembly 922 and the switch plate assembly 931 are raised and lowered as hereinafter described.

Operation of our egg handling and grading machine utilizing such an adjustable egg weight classifying means is substantially identical to the operation hereinbefore described and is described in detail in copending application Serial No. 89,275, filed February 14, 1961, of which this is a division.

*Additional embodiment of weighing station*

Another embodiment of circuitry and solenoid assembly for causing eggs to be discharged from the scale beam assemblies in proper positions is shown in FIGURES 77, 78, and 79. The solenoid assembly 976 is shown particularly in FIGURES 77 and 78 and consists of a plurality of solenoids (normally five in number), identified SO–1, SO–2, etc., which are mounted on a plate 978 secured to the lower channel member 261. Each solenoid is provided with a plunger 979 which is pivotally connected to a link 981. The line 981 is pivotally connected to an unlatching lever 982. The unlatching lever 982 is pivotally mounted in an elongate slot 983 by a pin 984. The lower extremity of the unlatching lever is provided with a rectangular cut-out 986 for a purpose hereinafter described. Means is provided for yieldably urging the unlatching lever into an out-of-the-way position and consists of a spring 987 which has one end secured to the unlatching lever 982 below the pivot point 984 by a pin 988 and the other end secured to a pin 989 provided on the plate 978.

A pair of posts 991 extends downwardly from the plate 978 at right angles thereto and carries a longitudinally extending bar 992. A contact member 993 is provided on the bar 992 for each of the solenoids and is adapted to be engaged by the tip 386 of the scale assembly 306 as the scale assembly passes through the weighing station as hereinafter described.

Operation of the solenoid assembly 976 can now be described in conjunction with the circuit diagram shown in FIGURE 79 is described in copending application Serial No. 89,275, filed February 14, 1961, of which this is a division

*Conveyor modification*

A modified conveyor construction is shown in FIGURES 80 and 81 which is particularly adapted for use with our egg handling and grading machine. In place of the belt 731 provided on each of the main conveyors 117, a pair of belts 1001 and 1002 are provided. As can be seen particularly from FIGURE 81, the belt 1001 is substantially narrower than the belt 1002. In addition, the belt 1001 travels in a direction which is substantially perpendicular to the longitudinal axis of the main frame of the egg handling and grading machine, whereas the belt 1002 travels at a substantial angle from a line perpendicular to the longitudinal axis of the main frame.

The belts 1001 and 1002 are arranged in this manner so that the cartons as they are packed by the machine will travel on one conveyor belt and the trays will travel on another conveyor belt as hereinafter described. The belts 1001 and 1002 can be driven in any suitable manner. For example, they can be driven by a chain 1002 driven by a sprocket 1004 connected to the shaft 688. The chain 1003 drives a sprocket 1006 which drives a roller 1008 which drives the belt 1001. A roller 1011 which drives the belt 1002 is connected to the roller 1008 by a universal joint 1012.

A pair of additional conveyor belts 1016 and 1017 are provided and arranged so that the belt 1016 receives the cartons from the belt 1001 and the belt 1017 receives the trays from the belt 1002. These belts can be driven in any suitable manner as, for example, they can be driven by an independent source of power such as provided for the belts 741 and 652 hereinbefore described.

For the stub conveyors 116, an additional belt 1021 is provided. This belt 1021 may be driven by suitable means such as an independent drive (not shown) similar to that hereinbefore described for the belts 731 and 652. Additional conveyor belts 1022, 1023 and 1024 are provided and arranged at right angles to the main conveyors 117 and the stub conveyors 116 to receive the trays and cartons therefrom as shown particularly in FIGURE 80. Two additional conveyor belts (not shown) are provided below the belts 1023 and 1024 for receiving the cartons from the medium and small weighing stations. The belts 1023 and 1024 receive the cartons from the extra large and large weighing stations.

During operation of our egg handling and grading machine, the trays as they are filled by the stub conveyors 116 will be supplied to the large conveyor 1022 which underlies the conveyors 1023 and 1024 to supply the trays to the packing station (not shown). In much the same manner, the trays will be supplied to the conveyor 1022 by the main conveyors. The trays, after they are filled, are moved onto the belts 1001 and 1002. However, since a substantially greater portion of the surface of the tray rests upon the wider belt 1002, the belt 1002 will carry the trays and deliver them onto the belts 1017 which deliver them to the belt 1022. The belt 1022 carries the trays to the packing station. Thus, it can be seen that the belt 1002 will carry the trays off to the left, as viewed in FIGURE 80, and deliver them to the belts 117 as shown in FIGURE 81.

When cartons are filled on the main conveyors, these cartons will be supplied to the belts 1001. They will not come in contact with the wider belt 1002, and for that reason they will be delivered to the belt 1016. The belts are arranged as shown in FIGURE 80 so that the cartons containing the large and extra large eggs are delivered to the two top belts 1023 and 1024 after which they are delivered to the packing station. The cartons from the medium and small stations are delivered to two additional small belts similar to the belts 1023 and 1024 positioned below the belts 1023 and 1024 which also deliver the cartons to the packing station.

From the foregoing, it can be seen that we have provided a conveyor construction in which the trays and cartons are separated so that they can be delivered automatically to different locations in a packing station even though the trays and cartons may be filled in the same weighing stations.

It is apparent from the foregoing that we have provided a new and improved egg handling and grading apparatus which greatly facilitates the handling and grading of eggs. The handling is accomplished with a minimum of personnel. After the eggs are placed in the machine, they are handled solely by the machine and need not be touched by the operators of the machine at any time. The eggs are always kept under control; in other words, in captive positions. At no time are they rolled or are they able to touch each other. This serves to reduce breakage of eggs to a minimum. The eggs are removed from the trays while in a vertical position and are maintained in this vertical position during their passage through our egg handling and grading machine and are deposited in the cartons or trays in this same vertical position. In the candling station, the egg is rotated in such a manner that the yolk revolves at the same speed as the shell of the egg so that it is possible to determine whether or not the yolk of the egg has moved out of its normal position to thereby determine the true character of the egg. The candling operation is arranged in such a manner that the operator can view five or six eggs simultaneously and view them continuously for a substantial period of time so that the quality or character of the egg can be correctly determined.

Although our machine has been described primarily with the handling and grading of eggs, it is readily apparent that the machine can be adapted with little difficulty to the classification and sorting of other types of articles such as fruit, nuts and the like.

We claim:

1. In a machine for handling eggs, means for delivering eggs to an egg discharge station, conveyor means mounted in the egg discharge station, the conveyor being adapted to accommodate either egg trays or egg cartons, the egg trays having five rows of six eggs each and the egg cartons having two rows of six eggs each, means for feeding cartons or trays to the conveyor, means for advancing the cartons or trays into the egg discharge station, means for causing the discharge of eggs, and means mounted on the conveyor adapted to be engaged by the cartons or trays for sensing whether cartons or trays are being advanced by the conveyor and connected to said means for causing the discharge of eggs to cause the eggs to be discharged in the discharge station in a proper manner to fill cartons or trays as the cartons or trays are advanced.

2. A machine as in claim 1 wherein said means mounted on the conveyor for sensing whether trays or cartons are being advanced by the conveyor includes a single unitary cam wheel having raised portions thereon spaced in accordance with the pockets in the trays and cartons.

3. A machine as in claim 1 wherein said means for advancing the trays or cartons includes an endless chain having upstanding lugs together with separate means for moving the cartons or trays from the discharge station, said last named means including an endless belt.

4. In a machine for handling eggs, means for delivering a plurality of eggs in sequence to an egg discharge station, conveyor means mounted in the egg discharge station for advancing two different types of cartons and one type of tray into the egg discharge station, said conveyor including an endless chain having upstanding lugs for engaging the trays and cartons for advancing the same, means for supplying trays or cartons to the conveyor, means mounted on the conveyor and engageable by the carton or trays sensing whether one type of carton or another type of carton or a tray is being advanced by the conveyor and means operated by said sensing means for causing the discharge of eggs from the egg discharge station in rows with the eggs being dropped in sequence along spaced points transversely of the conveyor and means operated by the egg discharging means for causing the advance of the cartons or trays to the next row of pockets when a row of pockets has been filled and means for removing the trays and cartons from the egg discharge station when they have been filled.

5. A machine as in claim 4 wherein said means for advancing the endless chain includes unitary cam means having cam portions spaced in accordance with the spacing between the rows of pockets in the cartons and the trays.

6. In a machine for handling articles of a type in which the articles are adapted to be packed in two different types of containers, one type of container having a width substantially greater than the width of the other container, a packing station, means for transporting articles into the packing station, means for advancing both types of containers through the packing station individually and one by one in succession, means for causing the articles transported into the packing station to be deposited in the container in the packing station as it is advanced through the packing station, a pair of conveyor belts for receiving and removing the containers from the packing station as they are advanced through the packing station and for separating the wider containers from the narrow containers, one of the conveyor belts having a path of travel angled laterally with respect to the path of travel of the other conveyor belt, one of said conveyor belts having a width substantially greater than the width of the other conveyor belt, the upper surfaces of said wider and narrower conveyor belts lying in a common plane, said conveyor belts being positioned with respect to said packing station and to the containers as they are advanced through so that a substantially greater portion of the bottom surface of the wider container rests upon the wider belt than rests upon the narrower belt as the wider container is advanced through the packing station and so that a substantially greater portion of the bottom part of the narrower container rests upon the narrower belt than upon the wider belt as the narrower container is advanced through the packing station whereby the wider containers are carried away from the packing station and travel upon said wider belt and whereby said narrower containers are carried away from the packing station by the narrower belt, said pair of conveyor belts serving as the sole means for separating the wider containers from the narrower containers.

7. Apparatus as in claim 6 wherein said conveyor belts are endless conveyor belts.

References Cited by the Examiner

UNITED STATES PATENTS

| | | | |
|---|---|---|---|
| 2,507,489 | 5/1950 | Buttery et al. | 53—249 |
| 2,636,603 | 4/1953 | Feick et al. | 209—80 X |
| 2,821,302 | 1/1958 | Fowler et al. | 209—74 X |
| 2,970,418 | 2/1961 | Mulvany et al. | 53—251 |
| 2,982,064 | 5/1961 | Hopkinson | 53—76 |
| 2,993,592 | 7/1961 | Mumma | 53—246 X |
| 3,029,571 | 4/1962 | Douthit | 53—66 |

TRAVIS S. McGEHEE, *Primary Examiner.*

WHITMORE A. WILTZ, FRANK E. BAILEY,
*Examiners.*